United States Patent
Fukata et al.

(10) Patent No.: US 9,726,883 B2
(45) Date of Patent: Aug. 8, 2017

(54) THREE-DIMENSIONAL OBJECT DETECTION DEVICE AND FOREIGN MATTER DETECTION DEVICE

(71) Applicants: Nissan Motor Co., Ltd., Yokohama-shi, Kanagawa (JP); Clarion Co., Ltd., Saitama-shi, Saitama (JP)

(72) Inventors: Osamu Fukata, Commerce Township, MI (US); Yasuhisa Hayakawa, Yokohama (JP); Masayuki Takemura, Hitachi (JP); Akira Utagawa, Hitachinaka (JP); Masahiro Kiyohara, Hitachinaka (JP); Shoji Muramatsu, Hitachi (JP); Kota Irie, Sagamihara (JP)

(73) Assignees: Nissan Motor Co., Ltd, Yokohama (JP); Clarion Co., Ltd., Saitama (JP)

( * ) Notice: Subject to any disclaimer, the term of this patent is extended or adjusted under 35 U.S.C. 154(b) by 413 days.

(21) Appl. No.: 14/410,580

(22) PCT Filed: Jul. 12, 2013

(86) PCT No.: PCT/JP2013/069140
§ 371 (c)(1),
(2) Date: Dec. 23, 2014

(87) PCT Pub. No.: WO2014/017317
PCT Pub. Date: Jan. 30, 2014

(65) Prior Publication Data
US 2015/0323785 A1 Nov. 12, 2015

(30) Foreign Application Priority Data
Jul. 27, 2012 (JP) .................................. 2012-166532

(51) Int. Cl.
*G06K 9/40* (2006.01)
*H04N 7/18* (2006.01)
(Continued)

(52) U.S. Cl.
CPC ..... *G02B 27/0006* (2013.01); *G06K 9/00825* (2013.01); *G06T 1/0007* (2013.01);
(Continued)

(58) Field of Classification Search
CPC ........................... H04N 5/2171; H04N 1/4097
See application file for complete search history.

(56) References Cited

U.S. PATENT DOCUMENTS

| 8,503,728 | B2 | 8/2013 | Takahashi |
| 2002/0048411 | A1* | 4/2002 | Takayama ................ G06K 9/40 382/275 |

(Continued)

FOREIGN PATENT DOCUMENTS

| EP | 2 400 315 A1 | 12/2011 |
| EP | 2 879 113 A1 | 6/2015 |

(Continued)

*Primary Examiner* — Joseph Ustaris
*Assistant Examiner* — Rebecca Volentine
(74) *Attorney, Agent, or Firm* — Global IP Counselors, LLP

(57) ABSTRACT

A three-dimensional object detection has an image capturing device, an image conversion unit, a three-dimensional object detection unit, a three-dimensional object assessment unit, first and second foreign matter detection units and a controller. The image capturing device captures images rearward of a vehicle. The three-dimensional object detection unit detects three-dimensional objects based on image information. The three-dimensional object assessment unit assesses whether or not a detected three-dimensional object is another vehicle. The foreign matter detection units detect whether or not foreign matter has adhered to a lens based on (Continued)

the change over time in luminance values for each predetermined pixel of the image capturing element and the change over time in the difference between an evaluation value and a reference value. The controller outputs control commands to the other means to suppress the assessment of foreign matter as another vehicle when foreign matter has been detected.

26 Claims, 35 Drawing Sheets

(51) Int. Cl.
| | | |
|---|---|---|
| G06K 9/00 | (2006.01) | |
| G02B 27/00 | (2006.01) | |
| G06T 1/00 | (2006.01) | |
| H04N 5/225 | (2006.01) | |
| H04N 5/217 | (2011.01) | |
| H04N 1/409 | (2006.01) | |
| G08G 1/16 | (2006.01) | |
| G06T 7/73 | (2017.01) | |
| G06T 7/254 | (2017.01) | |

(52) U.S. Cl.
CPC .............. *G06T 7/254* (2017.01); *G06T 7/73* (2017.01); *G08G 1/166* (2013.01); *G08G 1/167* (2013.01); *H04N 1/4097* (2013.01); *H04N 5/2171* (2013.01); *H04N 5/225* (2013.01); *H04N 7/18* (2013.01); *G06T 2207/10016* (2013.01); *G06T 2207/20224* (2013.01); *G06T 2207/30261* (2013.01)

(56) References Cited

U.S. PATENT DOCUMENTS

| | | | | |
|---|---|---|---|---|
| 2003/0227378 | A1* | 12/2003 | Nakai | G06K 9/00805 340/435 |
| 2006/0115121 | A1* | 6/2006 | Saka | G06T 7/0002 382/104 |
| 2007/0263902 | A1* | 11/2007 | Higuchi | G05D 1/0246 382/104 |
| 2008/0192984 | A1* | 8/2008 | Higuchi | G08G 1/16 382/104 |
| 2009/0087022 | A1* | 4/2009 | Fukuda | H04N 5/2171 382/100 |
| 2009/0303339 | A1* | 12/2009 | Kudo | H04N 5/2171 348/222.1 |
| 2010/0074554 | A1* | 3/2010 | Gyotoku | G02B 27/0006 382/275 |
| 2011/0080494 | A1* | 4/2011 | Mori | H04N 5/2171 348/222.1 |
| 2011/0234761 | A1* | 9/2011 | Yumiba | B60R 1/00 348/46 |
| 2011/0310245 | A1* | 12/2011 | Tsuchiya | G01S 11/12 348/135 |
| 2013/0141542 | A1 | 6/2013 | Tsuchiya et al. | |
| 2013/0300869 | A1* | 11/2013 | Lu | H04N 7/18 348/148 |
| 2014/0232869 | A1* | 8/2014 | May | H04N 7/18 348/148 |

FOREIGN PATENT DOCUMENTS

| | | |
|---|---|---|
| JP | 11-42988 A | 2/1999 |
| JP | 2008-219063 A | 9/2008 |
| JP | 2012-3662 A | 1/2012 |
| WO | 2009/057410 A1 | 5/2009 |
| WO | 2012/023412 A1 | 2/2012 |

* cited by examiner

THREE-DIMENSIONAL OBJECT DETECTION DEVICE AND FOREIGN MATTER DETECTION DEVICE

CROSS-REFERENCE TO RELATED APPLICATIONS

This application is a U.S. National stage application of International Application No. PCT/JP2013/069140, filed Jul. 12, 2013, which claims priority to Japanese Patent Application No. 2012-166532 filed in Japan on Jul. 27, 2012.

BACKGROUND

Field of the Invention

The present invention relates to a three-dimensional object detection device.

Background Information

A rearward monitoring method for a vehicle, in which the rearward view from a traveling host vehicle is captured, nearby vehicles in the rearward direction of the host vehicle or in a adjacent lane are detected, and a driver is made aware of such vehicles, is known wherein the degree of risk is assessed based on the relative positional relationships of the vehicles in the rearward direction of the host vehicle or in the adjacent lanes and, if the degree of risk has become high, other in-vehicle sound output is lowered and a warning sound indicating that the degree of risk has become high is outputted (see Japanese Laid-Open Patent Application No. 1999-42988).

SUMMARY

A problem has existed in that, when another vehicle traveling in an adjacent lane next to the lane in which the host vehicle is traveling is detected as an obstacle using an image capturing the rearward view from the host vehicle, if foreign matter such as dirt, rainwater, snow, or other the like adheres to the lens of the camera, the image of this foreign matter is errantly misidentified as the image of another vehicle traveling in an adjacent lane.

The problem to be solved by the present invention is to provide a foreign matter detection device that detects foreign matter adhering to the camera lens with a high degree of precision and a three-dimensional object detection device that prevents errant detection of images of foreign matter adhering to the camera lens as images of other vehicles and detects other vehicles traveling in adjacent lanes next to the lane in which the host vehicle is traveling with a high degree of precision.

The present invention solves the problem by detecting whether or not foreign matter has adhered to the camera lens based on the change over time in the luminance value for each predetermined pixel in an image capturing element and the change over time in the difference between the value for evaluation and a reference value and, if a state in which foreign matter has adhered is detected, controlling processing to assess whether a three-dimensional object is present so as to suppress assessment of the detected three-dimensional object as another vehicle.

In the present invention, if foreign matter adhering to the lens is detected, control is applied so that assessment results indicating that another vehicle traveling in an adjacent lane next to the lane in which the host vehicle is traveling become more difficult to output, and therefore errant detection of an image of the foreign matter adhering to the lens as an image of another vehicle traveling in an adjacent lane next to the lane in which the host vehicle is traveling can be prevented. As a result, it is possible to provide a foreign matter detection device for detecting foreign matter that has adhered to the lens of the camera with a high degree of precision, and a three-dimensional object detection device and a three-dimensional object detection method for detecting another vehicle traveling in an adjacent lane next to the lane in which the host vehicle is traveling can be detected with a high degree of precision.

BRIEF DESCRIPTION OF THE DRAWINGS

Referring now to the attached drawings which form a part of this original disclosure.

DETAILED DESCRIPTION OF THE EMBODIMENTS

Figure 1:
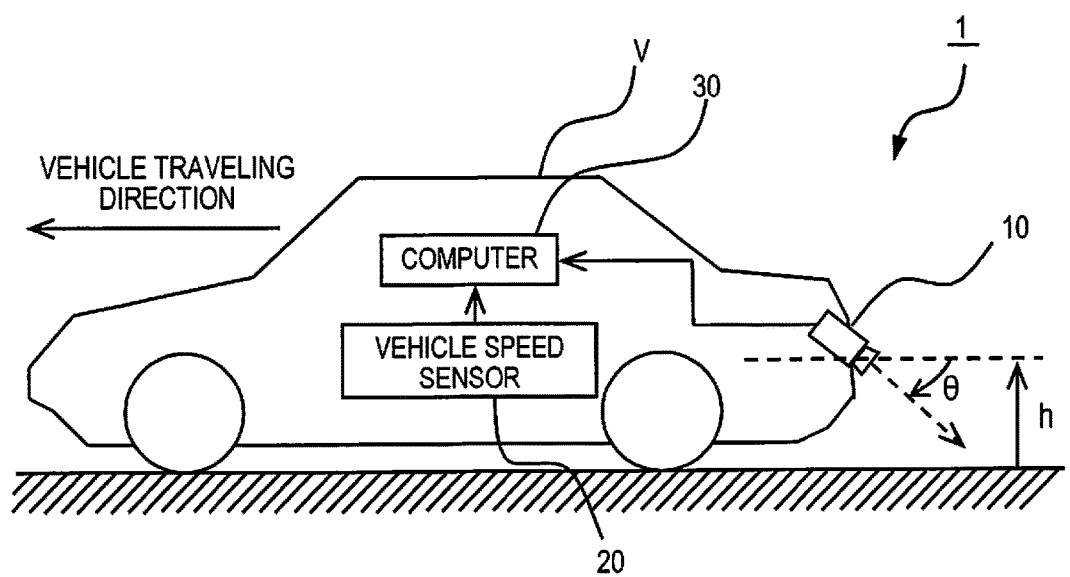
FIG. 1 is a schematic overview of a vehicle according to an embodiment in which the three-dimensional object detection device of the present invention has been applied.

FIG. 1 is a schematic overview of a vehicle according to an embodiment in which the three-dimensional object detection device 1 and the foreign matter detection device of the present invention has been applied. The three-dimensional object detection device 1 of the present example is a device for detecting, as an obstacle, another vehicle to which the driver of a host vehicle V should pay attention while driving, for example, a vehicle that the host vehicle V may come into contact with when changing lanes. Specifically, the three-dimensional object detection device 1 of the present example detects other vehicles that are traveling in an adjacent lane next to the lane in which the host vehicle is traveling (hereinafter referred to simply as "adjacent lane"). Moreover, the three-dimensional object detection device 1 of the present example can calculate the travel distance and traveling speed of the other detected vehicles. Thus, the example described below represents an example in which the three-dimensional object detection device 1 is mounted in the host vehicle V and, from among three-dimensional objects detected in the surroundings of the host vehicle, detects another vehicle traveling in an adjacent lane next to the lane in which the host vehicle V is traveling. As shown in FIG. 1, the three-dimensional object detection device 1 of the present example is provided with a camera 10, a vehicle speed sensor 20, and a computer 30.

The camera 10 is attached to the host vehicle V so that the optical axis is at an angle θ downward from the horizontal in a location at a height h at the rear of the host vehicle V, as illustrated in FIG. 1. From this position, the camera 10 captures a predetermined area of the surrounding environment of the host vehicle V. The camera 10 is provided with a lens 11 that causes images to be formed. In the present embodiment, there is one camera 10 provided to detect three-dimensional objects rearward of the host vehicle V, but for other applications, other cameras may also be provided, for example, to acquire images of the surroundings of the vehicle. The vehicle speed sensor 20 detects the travel speed of the host vehicle V and calculates the vehicle speed from a wheel speed detected by, for example, a wheel speed sensor for detecting the rotational speed of a wheel. The computer 30 detects three-dimensional objects rearward of the host vehicle and calculates the travel distances and traveling speeds of such three-dimensional objects in the present example.

Figure 2:
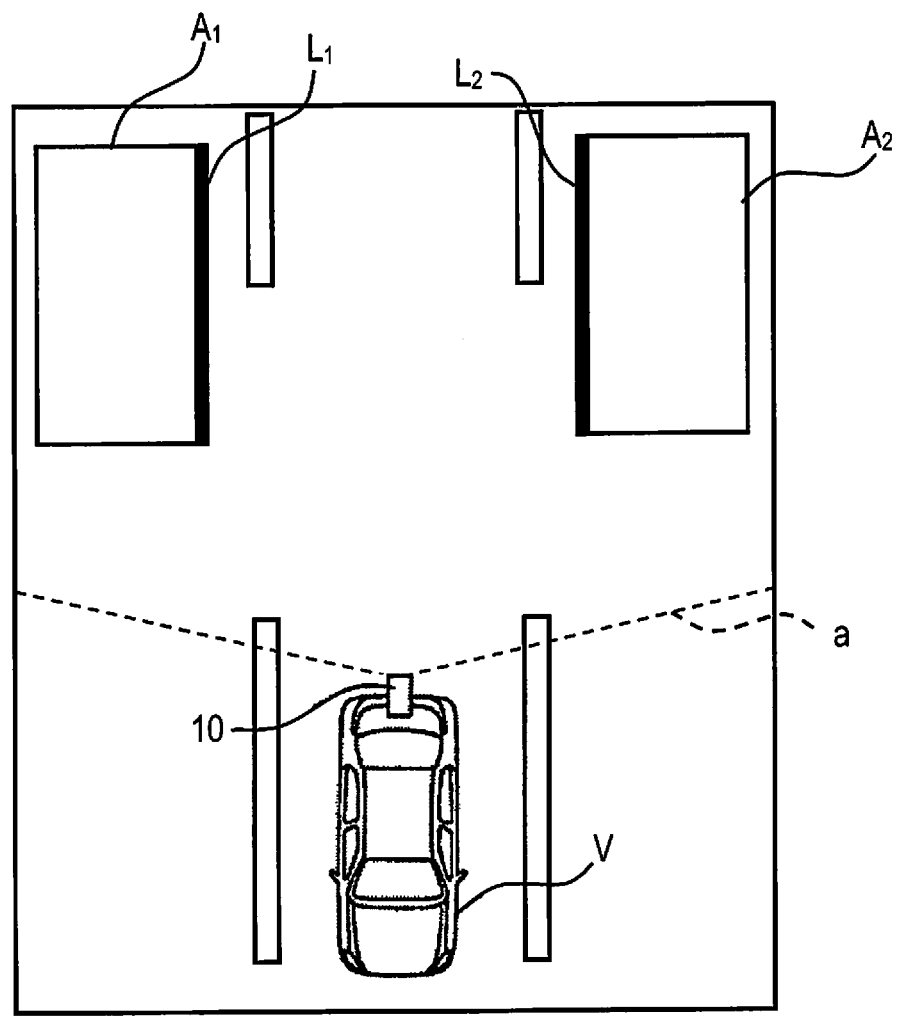
FIG. 2 is a plan view illustrating the traveling state of the vehicle in FIG. 1.

FIG. 2 is a plan view illustrating the traveling state of the host vehicle V in FIG. 1. As shown in FIG. 2, the camera 10 captures a rearward view from the host vehicle at a predetermined view angle a. At this time, the view angle a of the camera 10 is set to a view angle that allows the left and right lanes to be captured in addition to the lane in which the host vehicle V is traveling.

Figure 3:
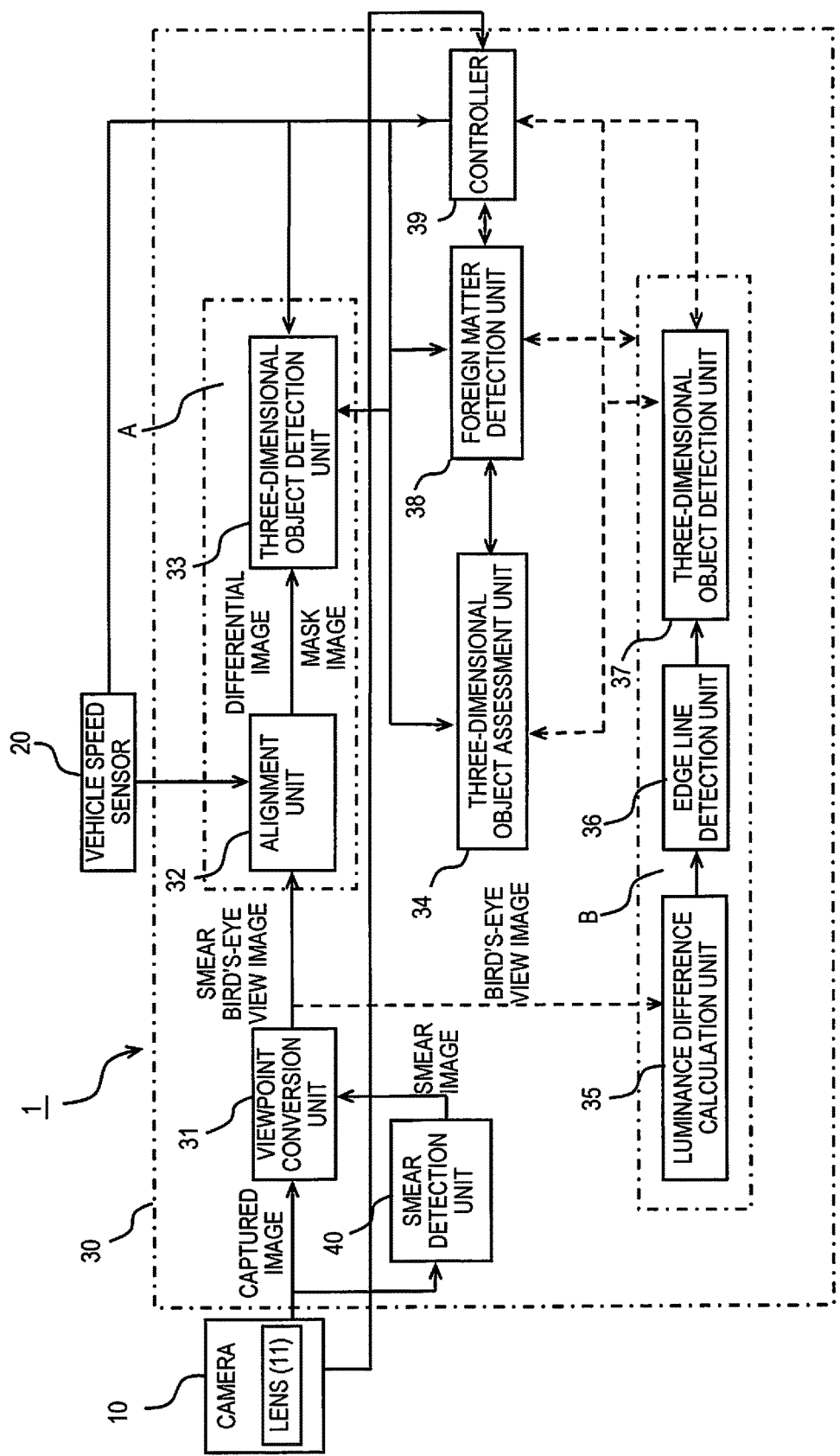
FIG. 3 is a block diagram illustrating the details of the computer in FIG. 1.

FIG. 3 is a block view illustrating the details of the computer 30 in FIG. 1. The camera 10 and the vehicle speed sensor 20 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, a three-dimensional object assessment unit 34, a foreign object detection unit 38, a controller 39, and a smear detection unit 40. The computer 30 of the present embodiment is a configuration relating to a three-dimensional object detection block A using differential waveform information. The computer 30 of the present embodiment can also have a configuration relating to a three-dimensional object detection block B using edge information. In this case, in the configuration illustrated in FIG. 3, the block configuration A, comprising the alignment unit 32 and the three-dimensional object detection unit 33, can be configured in place of the block configuration B, comprising a luminance difference calculation unit 35, an edge line detection unit 36, and a three-dimensional object detection unit 37, surrounded by a dashed line. Of course, it is also possible to provide both the block configuration A and the block configuration B and have detection of three-dimensional objects using differential waveform information and detection of three-dimensional objects using edge information both be carried out. If the block configuration A and the block configuration B are provided, either the block configuration A or the block configuration B can be activated, for example, in accordance with environmental factors such as brightness. These configurations will be described below.

Detection of Three-Dimensional Objects Using Differential Waveform Information

The three-dimensional object detection device 1 of the present embodiment detects three-dimensional objects present in a right-side detection area or a left-side detection area rearward of the host vehicle based on image information acquired by the monocular camera 10 that captures an image of the rearward direction of the host vehicle.

Captured image data of a predetermined area obtained by capturing carried out by the camera 10 is inputted into the viewpoint conversion unit 31 and the viewpoint conversion unit 31 converts the inputted captured image data into bird's-eye view image data in a bird's-eye view state. A "bird's-eye view state" is a state of viewing from a viewpoint of an imaginary camera that is looking down from above, e.g., directly vertically downward. This viewpoint conversion can be carried out, for example, in the manner described in Japanese Laid-Open Patent Application No. 2008-219063. The reason that captured image data is converted to bird's-eye view image data is that, if this technique is used, a planar object and a three-dimensional object can be differentiated based on the principle that vertical edges distinctive of a three-dimensional object are converted to a straight-line group that passes through a specific fixed point by viewpoint conversion to bird's-eye view image data. The result of image conversion processing by the viewpoint conversion unit 31 is also used in detection of three-dimensional objects using edge information, described below.

Figure 4:
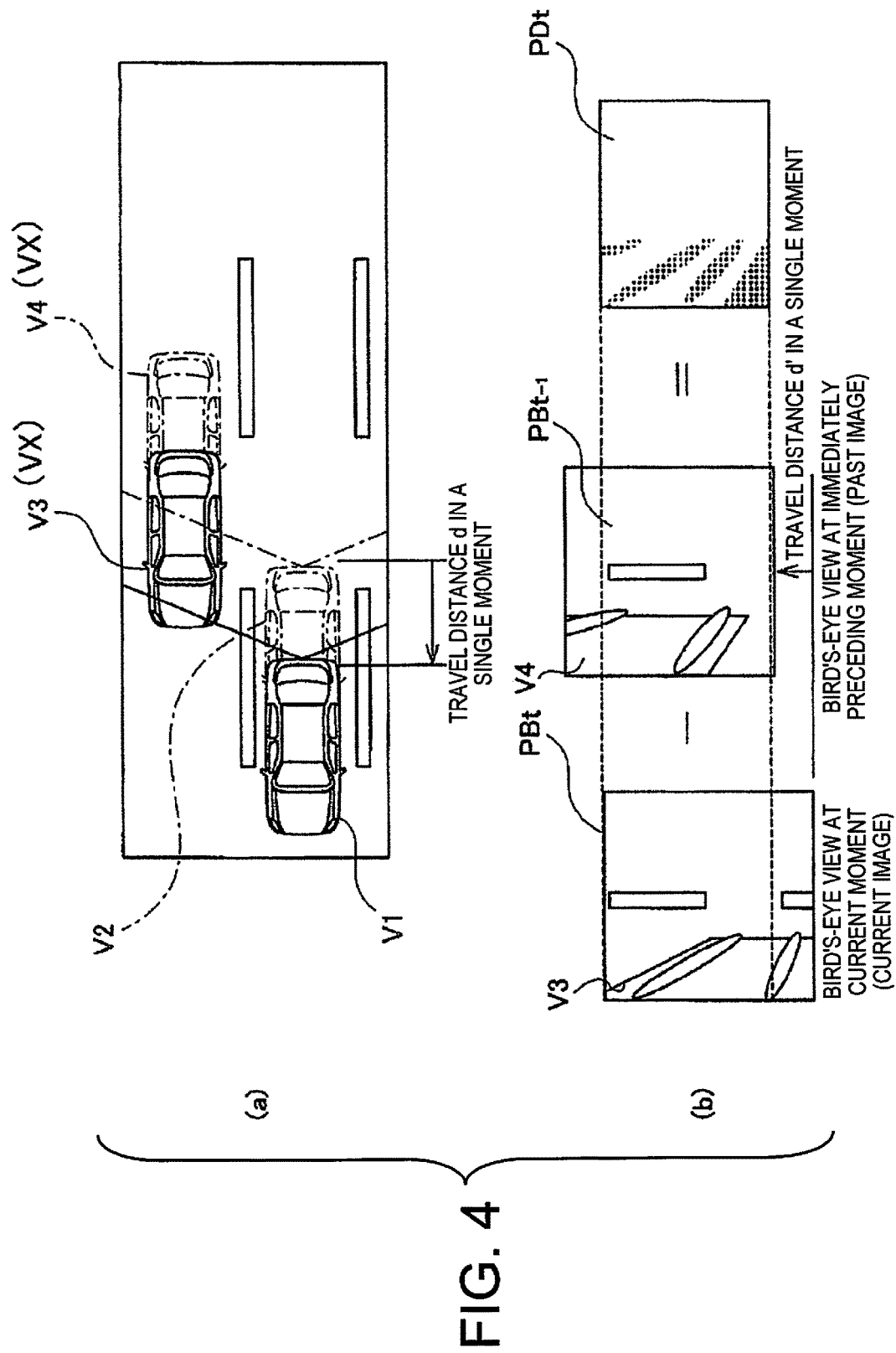
FIG. 4 is an explanatory view for describing a general overview of the processing of the alignment unit in FIG. 3, with part (a) of FIG. 4 being a plan view illustrating the movement state of the vehicle, and part (b) of FIG. 4 being an image illustrating a general overview of alignment.

The bird's-eye view image data obtained by viewpoint conversion carried out by the viewpoint conversion unit 31 is sequentially inputted into the alignment unit 32, and the positions of the bird's-eye view image data inputted at different points in time are aligned. FIG. 4 consists of views describing a general overview of the processing of the alignment unit 32. Part (a) of FIG. 4 is a plan view illustrating the movement state of the host vehicle V and part (b) of FIG. 4 is an image illustrating a general overview of alignment.

As illustrated in part (a) of FIG. 4, the host vehicle V at the current moment is positioned at V1 and the host vehicle V at a single moment prior is positioned at V2. Another vehicle VX is positioned rearward of the host vehicle V and is travelling parallel to the host vehicle V, the other vehicle VX at the current moment is positioned at V3, and the other vehicle VX at a single moment prior is positioned at V4. Furthermore, the host vehicle V has moved a distance d in the single moment. "A single moment prior" may be a predetermined duration before the current moment (for example, one control cycle) or may be a time an arbitrary amount of time in the past.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but collapse occurs in the position of the other vehicle VX in position V3. The white lines drawn on the road surface are also similarly rectangular and relatively accurate in a planar view in the bird's-eye view image $PB_{t-1}$ at a single moment prior, but collapse occurs in the position of the other vehicle VX in position V4. As previously described, vertical edges of a three-dimensional object (including edges that stand erect in three-dimensional space from the road surface in addition to vertical edges in the strict sense) appear as a straight-line group along the direction of collapsing due to the processing for converting the viewpoint to bird's-eye view image data, but because a planar image on the road surface does not include vertical edges, such collapsing does not occur even when the viewpoint has been converted.

The alignment unit 32 aligns bird's-eye view images $PB_t$ and $PB_{t-1}$ such as those described above in terms of data. When this is carried out, the alignment unit 32 offsets the bird's-eye view image $PB_{t-1}$ at a single moment prior to match the position with the bird's-eye view image $PB_t$ at the current moment. The left-side image and the center image in part (b) of FIG. 4 illustrate a state having an offset by the travel distance d'. This offset amount d' is the amount of movement, in the bird's-eye view image data, that corresponds to the actual travel distance d of the host vehicle V illustrated in part (a) of FIG. 4 and is decided based on a signal from the vehicle speed sensor 20 and the duration of time from the single moment prior to the current moment.

After alignment, the alignment unit 32 obtains the difference between the bird's-eye view images $PB_t$ and $PB_{t-1}$ and generates data for a differential image $PD_t$. Here, the pixel value of the differential image $PD_t$ may represent the absolute value of the differences in pixel values of the bird's-eye view images $PB_t$ and $PB_{t-1}$. In order to accommodate variations in the luminance environment, when the absolute value exceeds a predetermined threshold value p, the value may be set to "1" and when the absolute value does not exceed the threshold value, the value may be set to "0." The image on the right side of part (b) of FIG. 4 is the differential image $PD_t$. This threshold value p may be set in advance or may be changed in accordance with a control command generated by the controller 39, to be described hereinafter.

Returning to FIG. 3, the three-dimensional object detection unit 33 detects a three-dimensional object based on the data for the differential image $PD_t$ illustrated in part (b) of FIG. 4. At this time, the three-dimensional object detection unit 33 of the present example calculates the travel distance of the three-dimensional object in real space. The three-dimensional object detection unit 33 first generates a differential waveform when the three-dimensional object is detected and the travel distance is to be calculated. The travel distance of the three-dimensional object per unit of time is used to calculate the traveling speed of the three-dimensional object. The traveling speed of the three-dimensional object may be used to assess whether or not the three-dimensional object is a vehicle.

In generating the differential waveform, the three-dimensional object detection unit 33 of the present embodiment sets a detection area in the differential image $PD_t$. The three-dimensional object detection device 1 of the present example detects, as an object to be detected, another vehicle VX to which the driver of the host vehicle V should pay attention, and in particular, another vehicle VX that is traveling in a lane adjacent to the lane in which the host vehicle V is traveling and with which the host vehicle V may come into contact when changing lanes. Accordingly, in the present example, in which three-dimensional objects are detected based on image information, two detection areas are set, to the left and right of the host vehicle V, in the images obtained by the camera 10. Specifically, in the present embodiment, rectangular detection areas A1, A2 are set to the left and right rearward of the host vehicle V, as illustrated in FIG. 2. Another vehicle VX detected in these detection areas A1, A2 is detected as an obstacle traveling in an adjacent lane next to the lane in which the host vehicle V is traveling. Such detection areas A1, A2 may be set from positions relative to the host vehicle V, or may be set with the positions of white lines as a reference. If the areas are set with the position of the white lines as a reference, the three-dimensional object detection device 1 may, for example, use known white line recognition techniques.

The three-dimensional object detection unit 33 recognizes the borders of the set detection areas A1, A2 on the host vehicle V side (side along the traveling direction) as ground lines L1, L2 (FIG. 2). Generally, a "ground line" denotes a line at which a three-dimensional object is in contact with the ground, but in the present embodiment, a ground line is not a line of contact with the ground, but is rather set in the manner described above. Even in such a case, the difference between the ground line according to the present embodiment and an original ground line determined from the position of another vehicle VX is not exceedingly great as determined by experience, and there is no problem in actuality.

Figure 5:
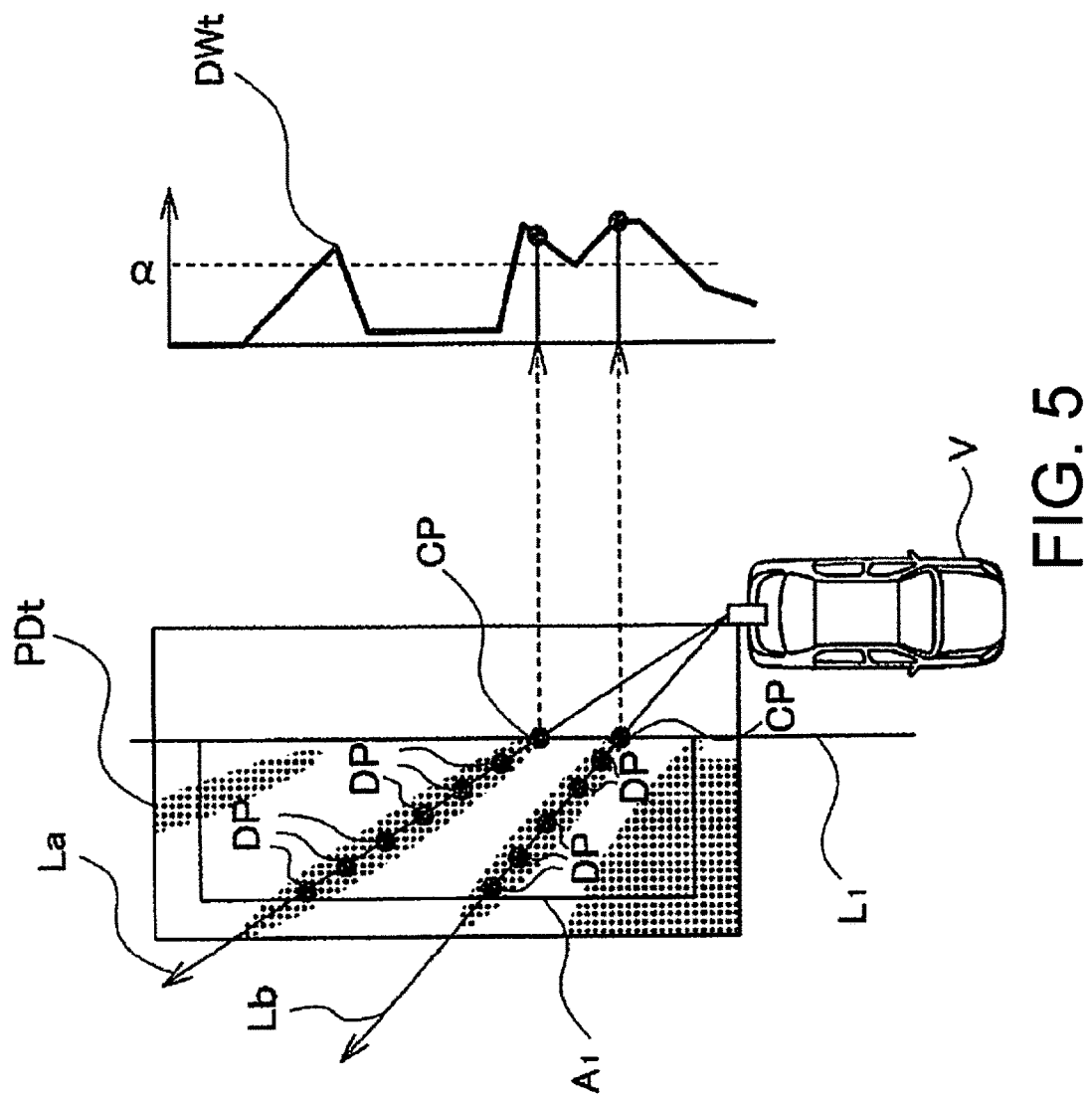
FIG. 5 is a schematic view illustrating the manner in which a differential waveform is generated by the three-dimensional object detection unit in FIG. 3.

FIG. 5 is a schematic view illustrating the manner in which the differential waveform is generated by the three-dimensional object detection unit 33 illustrated in FIG. 3. As illustrated in FIG. 5, the three-dimensional object detection unit 33 generates a differential waveform $DW_t$ from the portions of the differential image $PD_t$ (drawing on the right in part (b) of FIG. 4) that correspond to the detection areas A1, A2 calculated by the alignment unit 32. In this case, the three-dimensional object detection unit 33 generates the differential waveform $DW_t$ along the direction of collapsing of the three-dimensional object due to viewpoint conversion. In the example illustrated in FIG. 5, only the detection area A1 will be described for the sake of convenience, but a differential waveform is also generated for the detection area A2 using the same procedure.

To provide a more specific description, the three-dimensional object detection unit 33 defines a line La in the direction of collapsing of the three-dimensional object in the differential image $PB_t$ data. The three-dimensional object detection unit 33 then counts the number of difference pixels DP indicating a predetermined difference on the line La. Here, if the pixel values in the differential image $PB_t$ are the absolute values of the differences in the pixel values in the bird's-eye view images $PB_t$, $PB_{t-1}$, the difference pixels DP indicating the predetermined difference are pixels exceeding the predetermined threshold value, and if the pixel values of the differential image $PB_t$ are represented as "0" or "1," the difference pixels DP indicating the predetermined difference are pixels indicating "1."

The three-dimensional object detection unit 33 counts the number of difference pixels DP and then determines the crossing point CP of the line La and the ground line L1. The three-dimensional object detection unit 33 correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction of collapsing of the three-dimensional object, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generates the differential waveform $DW_t$ as illustrated in the drawing on the right in FIG. 5.

As illustrated in the drawing on the left in FIG. 5, the distance of overlaps of the detection area A1 with the line La and the line Lb in the direction of collapsing of the three-dimensional object differ. Thus, if the detection area A1 is filled with difference pixels DP, the number of difference pixels DP on the line La will be greater than the number on the line Lb. Thus, if the three-dimensional object detection unit 33 decides the vertical-axis position from the count of difference pixels DP, normalization is applied based on the distances of overlap between the lines La, Lb in the direction of collapsing of the three-dimensional object and the detection area A1. To give a specific example, in the drawing on the left in FIG. 5, there are six difference pixels DP on the line La and five difference pixels DP on the line Lb. Thus, in deciding the vertical-axis position from the counts in FIG. 5, the three-dimensional object detection unit 33 applies normalization by dividing the counts by the distance of overlap or the like. In this way, as shown in the differential waveform $DW_t$, the values in the differential waveform $DW_t$ corresponding to the lines La, Lb in the direction of collapsing of the three-dimensional object will be roughly the same.

After the differential waveform $DW_t$ is generated, the three-dimensional object detection unit 33 calculates the travel distance using a comparison with the differential waveform $DW_{t-1}$ at a single moment prior. That is to say, the three-dimensional object detection unit 33 calculates the travel distance from the variation over time in the differential waveforms $DW_t$, $DW_{t-1}$.

Figure 6:
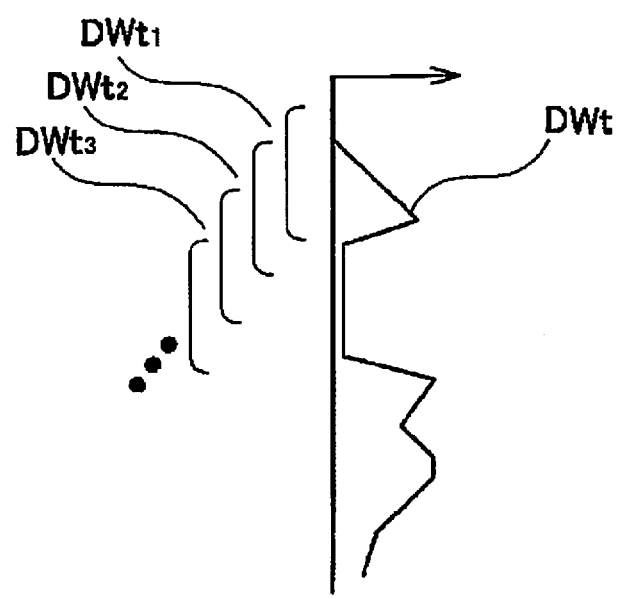
FIG. 6 is a view illustrating small areas divided by the three-dimensional object detection unit in FIG. 3.

To explain in detail, the three-dimensional object detection unit 33 divides the differential waveform $DW_t$ into a plurality of small areas $DW_{t1}$ to $DW_{tn}$ (where n is an arbitrary integer of 2 or greater), as illustrated in FIG. 6. FIG. 6 is a view illustrating the small areas $DW_{t1}$ to $DW_{tn}$ divided by the three-dimensional object detection unit 33.

The small areas $DW_{t1}$ to $DW_{tn}$ are divided so as to be mutually overlapping, for example, as illustrated in FIG. 6. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 6) of the differential waveform) for each of the small areas $DW_{t1}$ to $DW_{tn}$. Here, the offset amount is determined from the difference (distance in the horizontal-axis direction) between the differential waveform $DW_{t-1}$ at a single moment prior and the differential waveform DIM at the current moment. In this case, when the three-dimensional object detection unit 33 moves the differential waveform $DW_{t-1}$ at a single moment prior in the horizontal-axis direction for each of the small areas $DW_{t1}$ to $DW_{tn}$, the three-dimensional object detection unit 33 assesses the position (the position in the horizontal-axis direction) in which the error from the differential waveform $DW_t$ at the current moment is at a minimum, and determines as the offset amount the movement amount in the horizontal-axis direction at the position in which the error from the original position of the differential waveform $DW_{t-1}$ is at a minimum. The three-dimensional object detection unit 33 then counts the offset amount determined for each of the small areas $DW_{t1}$ to $DW_{tn}$ and forms a histogram.

Figure 7:
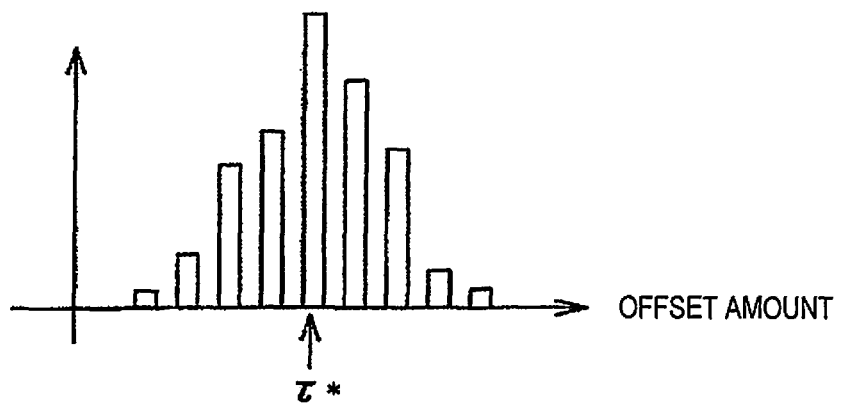
FIG. 7 is a view illustrating an example of a histogram obtained by the three-dimensional object detection unit in FIG. 3.

FIG. 7 is a view illustrating an example of the histogram obtained by the three-dimensional object detection unit 33. As illustrated in FIG. 7, some amount of variability occurs in the offset amount, which is the travel distance at which the error between the small areas $DW_{t1}$ to $DW_{tn}$ and the differential waveform $DW_{t-1}$ at a single moment prior is at a minimum. Accordingly, the three-dimensional object detection unit 33 forms the offset amounts, including the variability, into a histogram and calculates the travel distance from the histogram. At this point, the three-dimensional object detection unit 33 calculates the travel distance of the three-dimensional object from the maximum in the histogram. In other words, in the example illustrated in FIG. 7, the three-dimensional object detection unit 33 calculates the offset amount indicating the maximum of the histogram as the travel distance $\tau^*$. The travel distance $\tau^*$ is the relative travel distance of the other vehicle VX in relation to the host vehicle V. Accordingly, when the absolute travel distance is to be calculated, the three-dimensional object detection unit 33 calculates the absolute travel distance based on the obtained travel distance $\tau^*$ and a signal from the vehicle speed sensor 20.

Figure 8:
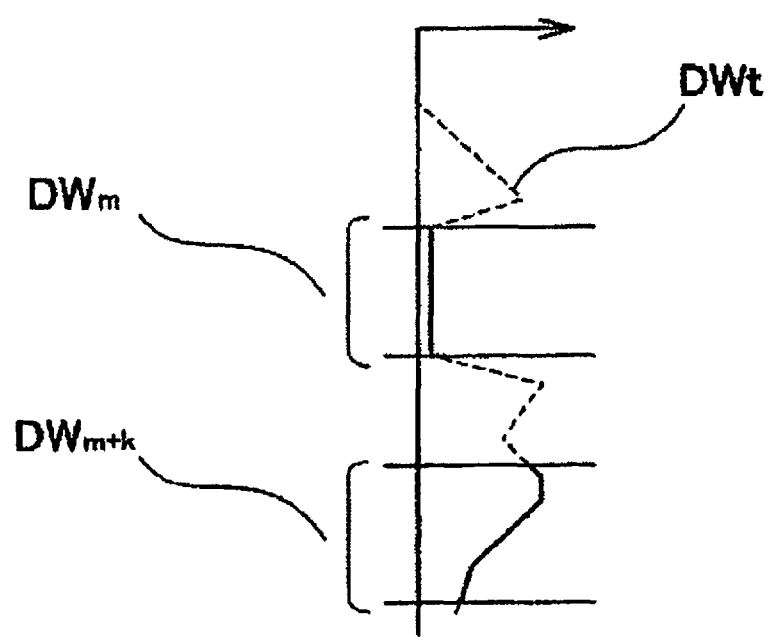
FIG. 8 is a view illustrating weighting used by the three-dimensional object detection unit in FIG. 3.

When generating the histogram, the three-dimensional object detection unit 33 may apply weighting to each of the plurality of small areas $DW_{t1}$ to $DW_{tn}$, count the offset amounts determined for each of the small areas $DW_{t1}$ to $DW_{tn}$ in accordance with the weighting, and generate the histogram. FIG. 8 is a view illustrating weighting by the three-dimensional object detection unit 33.

As illustrated in FIG. 8, the small area $DW_m$ (where m is an integer in the range 1 to n−1) is flat. That is to say, the difference between the maximum and the minimum value for the number of pixels indicating the predetermined difference is small for the small area $DW_m$. The three-dimensional detection unit 33 reduces the weighting for this kind of small area $DW_m$. This is because the flat small area $DW_m$ lacks a characteristic and there is a high possibility that an error will be magnified when the offset amount is calculated.

Meanwhile, the small area $DW_{m+k}$ (where k is an integer equal to n−m or less) has abundant undulation. That is to say, the difference between the maximum and the minimum values for the number of pixels indicating the predetermined difference is large in the small area $DW_{m+k}$. The three-dimensional detection unit 33 increases the weighting for this kind of small area $DW_{m+k}$. This is because the small area $DW_{m+k}$ abundant in undulation is characteristic and there is a high possibility that the offset amount will be accurately calculated. By applying this kind of weighting, the precision of calculation of travel distances can be enhanced.

The differential waveform $DW_t$ is divided into a plurality of small areas $DW_{t1}$ to $DW_{tn}$ in the present embodiment in order to enhance the precision for calculating the travel distance, but division into the small areas $DW_{t1}$ to $DW_{tn}$ is not required when the precision for calculating travel distance is not as necessary. In this case, the three-dimensional object detection unit 33 calculates the travel distance from the offset amount of the differential waveform $DW_t$ when the error between the differential waveform $DW_t$ and the differential waveform $DW_{t-1}$ is at a minimum. In other words, the method for determining the offset amount between the differential waveform $DW_{t-1}$ at a single moment prior and the differential waveform $DW_t$ at the current moment is not limited to the details described above.

Returning to FIG. 3, the computer 30 is provided with a smear detection unit 40. The smear detection unit 40 detects areas where smears have occurred from captured image data obtained by image capture using the camera 10. Smearing is a whiteout phenomenon that occurs in CCD image sensors and the like, and therefore the smear detection unit 40 may be omitted when using a camera 10 with a CMOS image sensor or the like in which smears do not occur.

Figure 9:
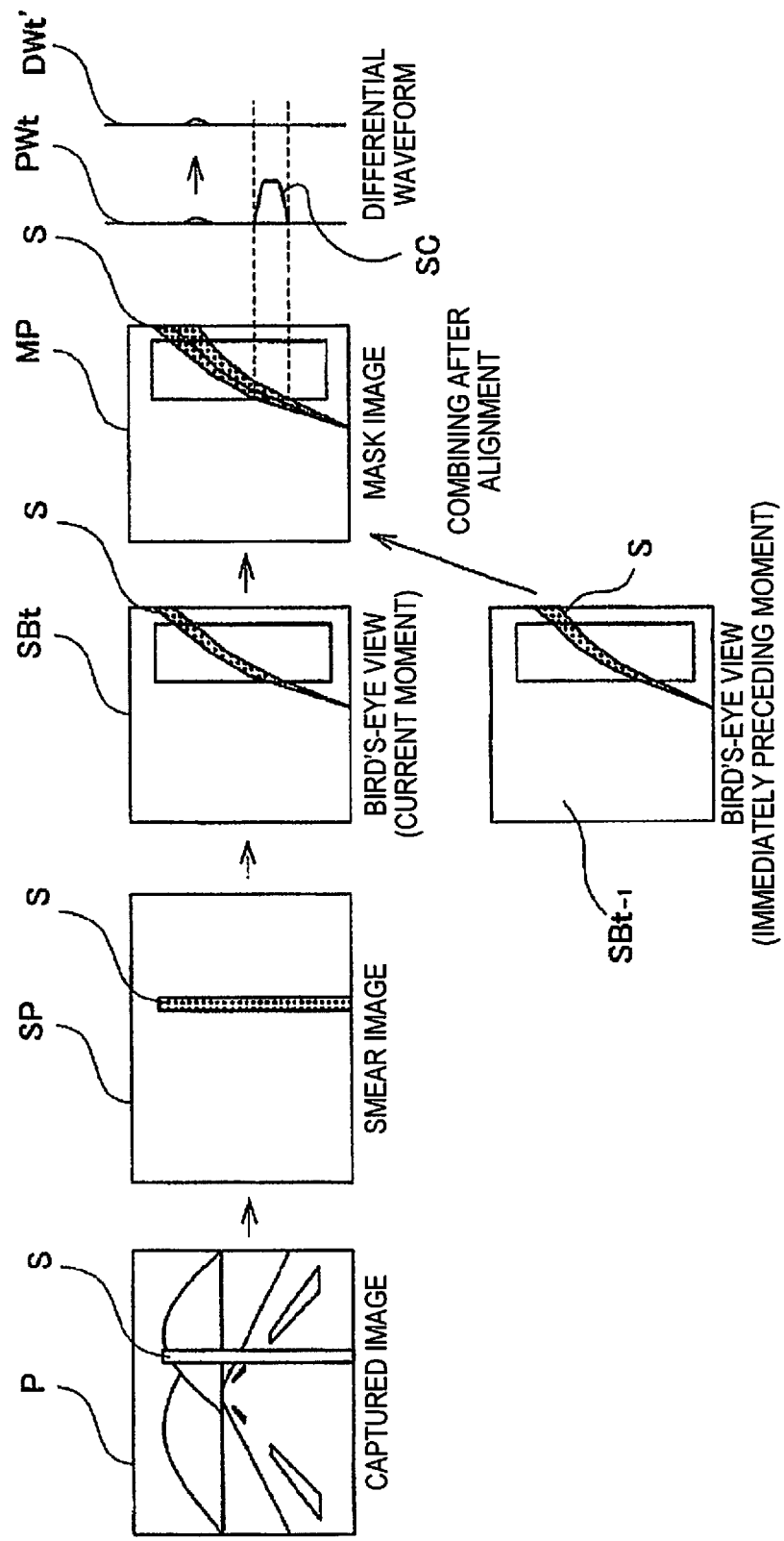
FIG. 9 is a view illustrating processing by the smear detection unit in FIG. 3 and processing by same to calculate a differential waveform.

FIG. 9 is an image view for describing processing by the smear detection unit 40 and processing to calculate the differential waveform $DW_t$ thereby. First, it is assumed that data for a captured image P in which a smear S is present is inputted into the smear detection unit 40. At this time, the smear detection unit 40 detects the smear S from the captured image P. There are various methods for detecting the smear S, but, for example, in the case of a common charge-coupled device (CCD) camera, the smear S occurs only downward in the image from the light source. Consequently, in the present embodiment, a search is performed from the bottom of the image to the top of the image for an area that has luminance values at or above a predetermined value and is vertically continuous, and this area is identified as a smear S.

The smear detection unit 40 generates smear image SP data in which the pixel value is set to "1" for locations where the smear has occurred and other locations are set to "0." After this data is generated, the smear detection unit 40 sends the smear image SP data to the viewpoint conversion unit 31. The viewpoint conversion unit 31, into which the smear image SP data has been inputted, applies viewpoint conversion to this data to convert the data to a bird's-eye view state. In this way, the viewpoint conversion unit 31 generates smear bird's-eye view image $SB_t$ data. After this data is generated, the viewpoint conversion unit 31 sends the smear bird's-eye view image $SB_t$ data to the alignment unit 32. The viewpoint conversion unit 31 also sends smear bird's-eye view image $SB_{t-1}$ data from a single moment prior to the alignment unit 32.

The alignment unit 32 executes alignment of the smear bird's-eye view images $SB_t$, $SB_{t-1}$. The specifics of alignment are the same as those when alignment of the bird's-eye view images $PB_t$, $PB_{t-1}$ is executed in data. After alignment, the alignment unit 32 takes the logical sum of the areas in which smears S occurred in the smear bird's-eye view images $SB_t$, $SB_{t-1}$. In this way, the alignment unit 32 generates mask image MP data. After generating this data, the alignment unit 32 sends the mask image MP data to the three-dimensional object detection unit 33.

The three-dimensional object detection unit 33 sets the frequency distribution count to zero for locations corresponding to the areas in which smears S occurred in the mask image MP. That is to say, if a differential waveform $DW_t$ such as that illustrated in FIG. 9 is generated, the three-dimensional object detection unit 33 sets the count SC due to smears S to zero and generates a corrected differential waveform $DW_t'$.

The three-dimensional object detection unit 33 in the present embodiment determines the traveling speed of the host vehicle V (camera 10) and determines the offset amount for a stationary object from the determined traveling speed. After the offset amount of the stationary object has been determined, the three-dimensional object detection unit 33 ignores the offset amount that corresponds to the stationary object within the maximum of the histogram and calculates the travel distance of the three-dimensional object.

Figure 10:
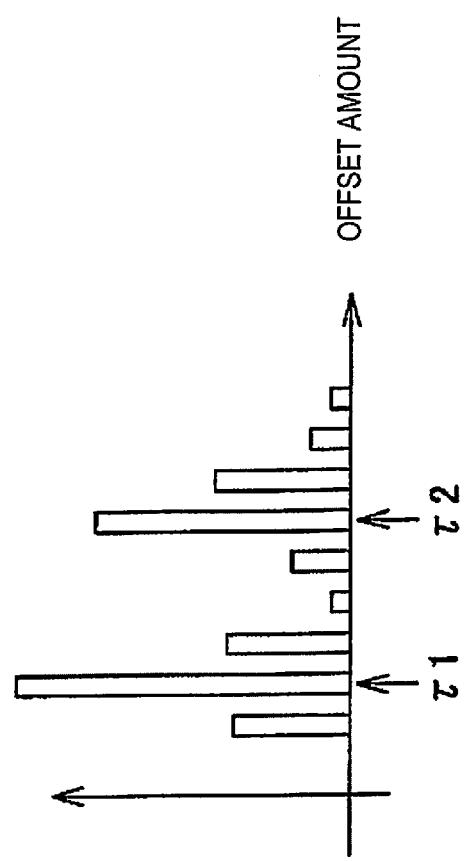
FIG. 10 is a view illustrating another example of a histogram obtained by the three-dimensional object detection unit in FIG. 3.

FIG. 10 is a view illustrating another example of the histogram obtained by the three-dimensional object detection unit 33. When a stationary object other than the other vehicle VX is present within the view angle of the camera 10, two maxima τ1, τ2 appear in the resulting histogram. In this case, one of the two maxima r1, r2 is the offset amount of the stationary object. Consequently, the three-dimensional object detection unit 33 determines the offset amount for the stationary object from the traveling speed, ignores the maximum that corresponds to the offset amount, and calculates the travel distance of the three-dimensional object using the remaining maximum.

Even when the offset amount corresponding to the stationary object is ignored, it is conceivable that there may be a plurality of other vehicles VX present within the view angle of the camera 10 when there is a plurality of maxima. However, a plurality of other vehicles VX being present within the detection areas A1, A2 occurs very rarely. Accordingly, the three-dimensional object detection unit 33 stops calculating the travel distance.

Figure 11:
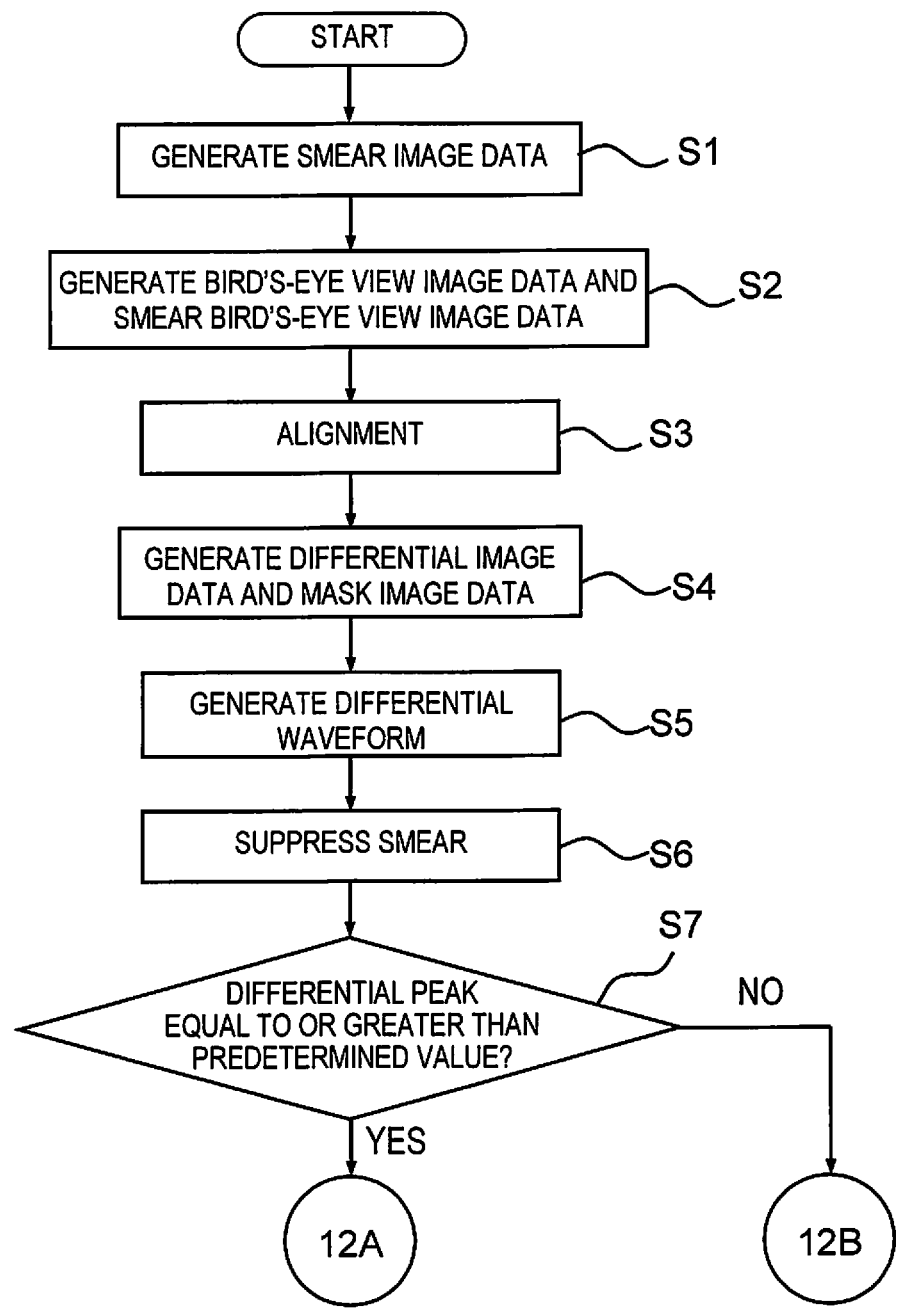
FIG. 11 is a first part of a flowchart illustrating the three-dimensional object detection method using differential waveform information, the method being executed by the viewpoint conversion unit, the alignment unit, the smear detection unit, and the three-dimensional object detection unit in FIG. 3.
Figure 12:
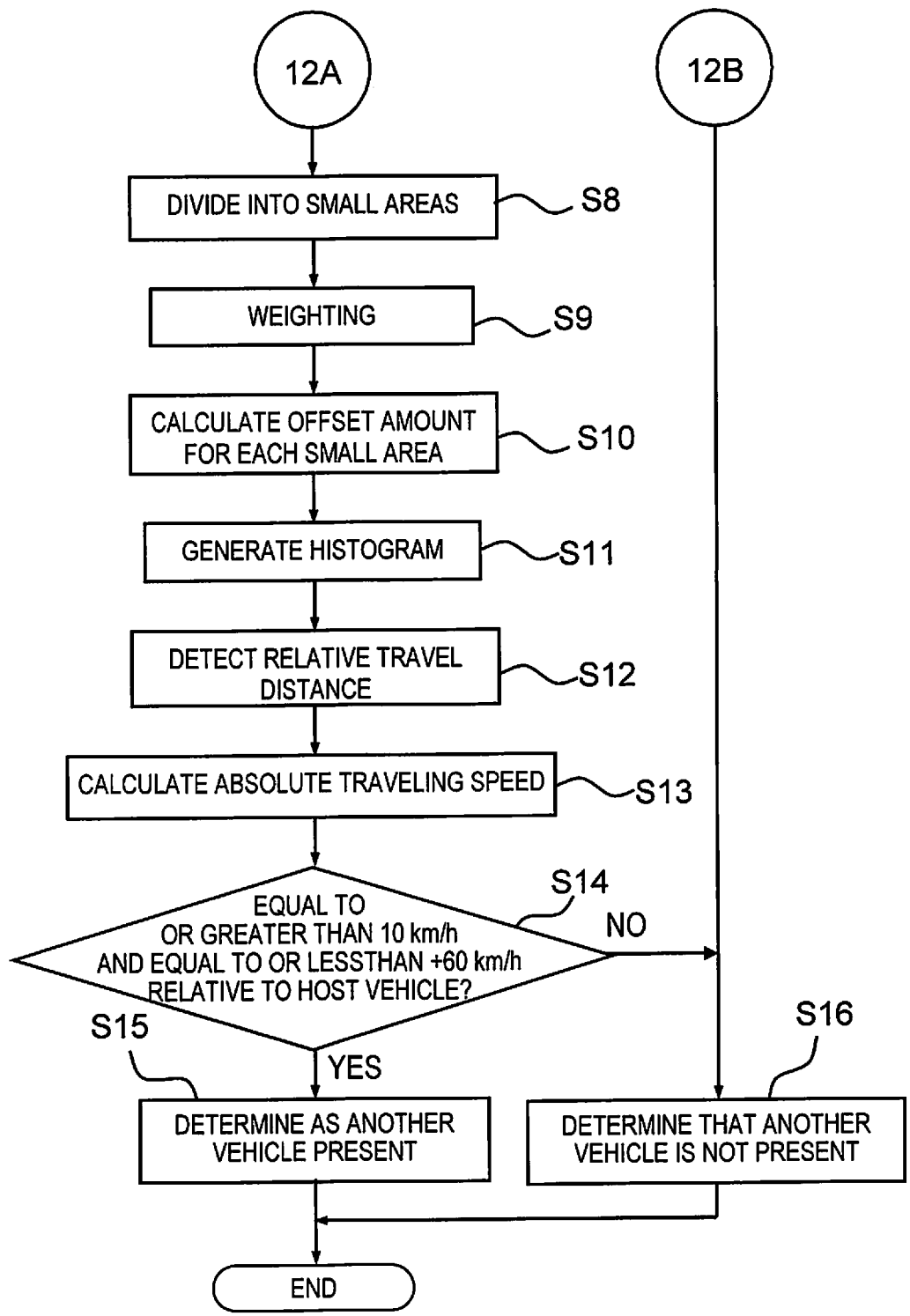
FIG. 12 is a second part of a flowchart illustrating the three-dimensional object detection method using differential waveform information, the method being executed by the viewpoint conversion unit, the alignment unit, the smear detection unit, and the three-dimensional object detection unit in FIG. 3.

Next, the three-dimension object detection procedure using differential waveform information will be described. FIG. 11 and FIG. 12 are flowcharts showing the three-dimensional object detection procedure of the present embodiment. As shown in FIG. 11, first, captured image P data from the camera 10 is inputted into the computer 30 and a smear image SP is generated by the smear detection unit 40 (S1). Next, the viewpoint conversion unit 31 generates bird's-eye view image $PB_t$ data from the captured image P data from the camera 10 and generates smear bird's-eye view image $SB_t$ data from the smear image SP data (S2).

Then, the alignment unit 33 aligns the bird's-eye view image $PB_t$ data and the bird's-eye view image $PB_{t-1}$ data from a single moment prior and aligns the smear bird's-eye view image $SB_t$ data and the smear bird's-eye view image $SB_{t-1}$ data from a single moment prior (S3). After this alignment, the alignment unit 33 generates differential image $PD_t$ data and generates mask image MP data (S4). After this, the three-dimensional object detection unit 33 generates a differential waveform $DW_t$ from the differential image $PD_t$ data and the differential image $PD_{t-1}$ data from a single moment prior (S5). After generating the differential waveform $DW_t$, the count number pertaining to the areas in which smears S have occurred is set to zero, suppressing effects due to smears (S6).

After this, the three-dimensional object detection unit 33 assesses whether or not the peak of the differential waveform $DW_t$ is equal to or greater than a first threshold value α. (S7). This first threshold value α can be set in advance and changed in accordance with control commands from the controller 39 illustrated in FIG. 3, but the details of this will be described below. At this point, if the peak of the differential waveform $DW_t$ is not equal to or greater than the first threshold value α, i.e., if there is hardly any difference, there is considered to be no three-dimensional object present in the captured image P. Consequently, if it is assessed that the peak of the differential waveform $DW_t$ is not equal to or greater than the first threshold value α(S7: NO), the three-dimensional object detection unit 33 assesses that there is no three-dimensional object present and that there is no other vehicle VX present as an obstacle (FIG. 12: S16). This completes the processing shown in FIG. 11 and FIG. 12.

On the other hand, if the peak of the differential waveform $DW_t$ is assessed to be equal to or greater than the first threshold value α(S7: YES), the three-dimensional object detection unit 33 assesses that a three-dimensional object is present and divides the differential waveform $DW_t$ into a plurality of small areas $DW_{t1}$ to $DW_{tn}$ (S8). Next, the three-dimensional object detection unit 33 weights the small areas $DW_{t1}$ to $DW_{t1}$ (S9). After this, the three-dimensional object detection unit 33 calculates the offset amount for each of the small areas $DW_{t1}$ to $DW_{tn}$ (S10) and adds the weighting to generate a histogram (S11).

Then the three-dimensional object detection unit 33 calculates the relative travel distance, which is the travel distance of the three-dimensional object with respect to the host vehicle V based on the histogram (S12). Next, the three-dimensional object detection unit 33 calculates the absolute traveling speed of the three-dimensional object from the relative travel distance (S13). At this point, the three-dimensional object detection unit 33 calculates the relative traveling speed by temporal differentiation of the relative travel distance and adds the speed of the host vehicle detected by the vehicle speed sensor 20 to calculate the absolute traveling speed.

After this, the three-dimensional object detection unit 33 assesses whether or not the absolute traveling speed of the three-dimensional object is at least 10 km/h and whether or not the relative traveling speed of the three-dimensional object with respect to the host vehicle V is +60 km/h or less (S14). If both conditions are fulfilled (S14: YES), the three-dimensional object detection unit 33 assesses that the three-dimensional object is another vehicle VX (S15). This completes the processing shown in FIG. 11 and FIG. 12. On the other hand, if either condition is not fulfilled (S14: NO), the three-dimensional object detection unit 33 assesses that there is no other vehicle VX present (S16). This completes the processing shown in FIG. 11 and FIG. 12.

In the present embodiment, the rearward side from the host vehicle V is the detection areas A1, A2 and emphasis is placed on the detection of another vehicle VX traveling in an adjacent lane next to the lane in which the host vehicle is traveling, the vehicle VX being a vehicle to which attention should be paid during travel of the host vehicle V, and emphasis is placed, in particular, on whether or not there is a possibility that the host vehicle V may come into contact when changing lanes. This is in order to assess whether or not there is a possibility that the host vehicle V may come into contact with another vehicle VX traveling in an adjacent lane next to the lane in which the host vehicle is traveling if the host vehicle V changes lanes. For this reason, the processing of step S14 is executed. That is to say, if it is presumed that the system of the present embodiment is operated on a highway, if the speed of the three-dimensional object is less than 10 km/h, even if another vehicle VX is present, there is not likely to be a problem, because the other vehicle VX is slow and will be located behind the host vehicle V when a lane change occurs. Similarly, if the relative traveling speed of the three-dimensional object with respect to the host vehicle V exceeds +60 km/h (i.e., if the three-dimensional object is moving at a high speed more than 60 km/h greater than the speed of the host vehicle), there is not likely to be a problem, because the other vehicle VX will have moved ahead of the host vehicle V when a lane change occurs. Consequently, it can be said that an assessment is made in step S14 as to whether there is another vehicle VX that will become a problem when a lane change occurs.

The assessment in step S14 of whether the absolute traveling speed of the three-dimensional object is 10 km/h or greater and whether the relative traveling speed of the three-dimensional object with respect to the host vehicle is +60 km/h or less has the following effects. For example, the absolute traveling speed of a stationary object may be detected to be several km/h due to an attachment error in the camera 10. Accordingly, assessing whether the speed is 10 km/h or greater makes it possible to reduce the possibility that the stationary object will be assessed to be another vehicle VX. Also, the relative speed of three-dimensional object with respect to the host vehicle may be detected to be in excess of +60 km/h due to noise. Accordingly, determining whether the relative speed is +60 km/h or less makes it possible to reduce the possibility of errant detection due to noise.

Furthermore, instead of the processing in step S14, it may also be assessed whether the absolute traveling speed is non-negative or not 0 km/h. Moreover, because emphasis is placed on whether or not there is a possibility of contact if the host vehicle V changes lanes in the present embodiment, if another vehicle VX is detected in step S15, a warning sound may be issued to the driver of the host vehicle, a display constituting a warning may be generated by a predetermined display means, or the like.

In this way, with the three-dimensional object detection procedure using differential waveform information in the present example, the number of pixels in the differential image $PD_t$ data indicating a predetermined difference are counted along the direction of collapsing of the three-dimensional object due to viewpoint conversion to generate a frequency distribution, and thereby generating a differential waveform $DW_t$. Here, the pixels indicating the predetermined difference in the differential image $PD_t$ data are pixels that have changed in images taken at different points in time, i.e., the pixels can be considered locations where a three-dimensional object is present. Accordingly, in locations where a three-dimensional object is present, the number of pixels along the direction of collapsing of the three-dimensional object is counted to generate a frequency distribution, and thereby generating the differential waveform $DW_t$. In particular, because the number of pixels is counted along the direction of collapsing of the three-dimensional object, the differential waveform $DW_t$ is generated from information on the height direction with respect to the three-dimensional object. Then, the travel distance of the three-dimensional object is calculated from the change over time in the differential waveform $DW_t$, which includes height-direction information. Accordingly, because the detection locations before the change over time and the detection locations after the change over time are designated so as to include height-direction information, the locations are more likely to be the same location on the three-dimensional object than if only single-point motion is considered, and therefore the travel distance is calculated from the change over time in the same location, making it possible to improve the precision of the calculation of travel distance.

Moreover, the frequency distribution count is set to zero for locations corresponding to areas where smears S have occurred in the differential waveform $DW_t$. In this way, waveform parts generated by smears S in the differential waveform $DW_t$ are removed, making it possible to prevent errant recognition of smears S as three-dimensional objects.

Moreover, the travel distance of the three-dimensional object is calculated from the offset amount of the differential waveform $DW_t$ when the error in the differential waveform $DW_t$ generated at a different time is minimized. Accordingly, the travel distance is calculated from the offset amount in the one-dimensional information of a waveform and calculation costs can be suppressed when calculating the travel distance.

Moreover, the differential waveform $DW_t$ generated at a different time is divided into a plurality of small areas $DW_{t1}$ to $DW_{tn}$, and a plurality of waveforms representing different locations on the three-dimensional object are obtained thereby. Moreover, the travel distance of the three-dimensional object is calculated by determining the offset amount when the error in the waveform is minimized for each of the small areas $DW_{t1}$ to $DW_{tn}$ and counting the offset amounts determined for each of the small areas $DW_{t1}$ to $DW_{tn}$ to generate a histogram. Accordingly, the offset amount is determined for each location on the three-dimensional object, the travel distance is determined from a plurality of offset amounts, and the precision of calculation of the travel distance can be enhanced.

Moreover, weighting is applied to each of the plurality of small areas $DW_{t1}$ to $DW_{tn}$ and the offset amounts determined for each of the small areas $DW_{t1}$ to $DW_{tn}$ are counted according to the weighting to generate a histogram. Accordingly, by increasing weighting for characteristic areas and decreasing weighting for areas without a characteristic, travel distance can be still more suitably calculated. Consequently, the precision of calculation of travel distance can be enhanced still further.

Moreover, for the small areas $DW_{t1}$ to $DW_{tn}$ of the differential waveform $DW_t$, the greater the difference between the maximum and the minimum value of the count of number of pixels indicating the predetermined difference, the larger the weighting is made. Accordingly, the weighting is greater in areas having large characteristic undulations, in which the difference between the maximum and the minimum value is great, and the weighting is smaller in flat areas, in which undulations are small. It is easier to accurately determine offset amounts, from a shape perspective, in areas having large undulations than in flat areas, and therefore by making the weighting greater for areas for which the difference between the maximum and the minimum value is large, the precision of calculation of travel distance can be further enhanced.

Moreover, the travel distance of the three-dimensional object is calculated from the maximum of the histogram obtained by counting the offset amounts determined for each of the small areas $DW_{t1}$ to $DW_{tn}$. Accordingly, even if there is variation in the offset amounts, a travel distance having greater accuracy can be calculated from this maximum.

Moreover, the offset amount for a stationary object is determined and this offset amount is ignored, and therefore reductions in the precision of calculation of the travel distance of the three-dimensional object due to stationary objects can be prevented. Moreover, because the offset amount corresponding to the stationary object is ignored, if there is a plurality of maxima, calculation of the travel distance of the three-dimensional object is stopped. Accordingly, it is possible to prevent calculation of errant travel distances, such as those that have a plurality of maxima.

In the embodiment described above, the vehicle speed of the host vehicle V is assessed based on a signal from the vehicle speed sensor 20, but no limitation is imposed thereby, and speed may also be estimated from a plurality of images from different points in time. In this case, the vehicle speed sensor becomes unnecessary and the configuration can be simplified.

Moreover, in the embodiment described above, the captured image from the current moment and the image from at a single moment prior are converted to bird's-eye view, a differential image $PD_t$ is generated by aligning the converted images, and the differential waveform $DW_t$ is generated by evaluating the generated differential image $PD_t$ along the direction of collapsing (the direction in which the three-dimensional object collapses when the captured images are converted to bird's-eye views), but no limitation is imposed thereby. For example, a configuration may be used in which only the image from a single moment prior is converted to a bird's-eye view, the converted bird's-eye view, after being aligned, is re-converted to an image equivalent to the captured image, a differential image is generated using this image and the image from the current moment, and the generated differential image is evaluated along a direction equivalent to the direction of collapsing (i.e., the direction to which the direction of collapsing was converted in the captured image) to generate the differential waveform $DW_t$. That is to say, if it is possible to align the image from the current moment and the image from at a single moment prior, generate a differential image $PD_t$ from the difference between the aligned images, and evaluate the differential image $PD_t$ along the direction of collapsing of the three-dimensional object if the differential image $PD_t$ were converted to a bird's-eye view, it may not be necessary to generate the bird's-eye view.

Detection of Three-Dimensional Objects Using Edge Information

Figure 13:
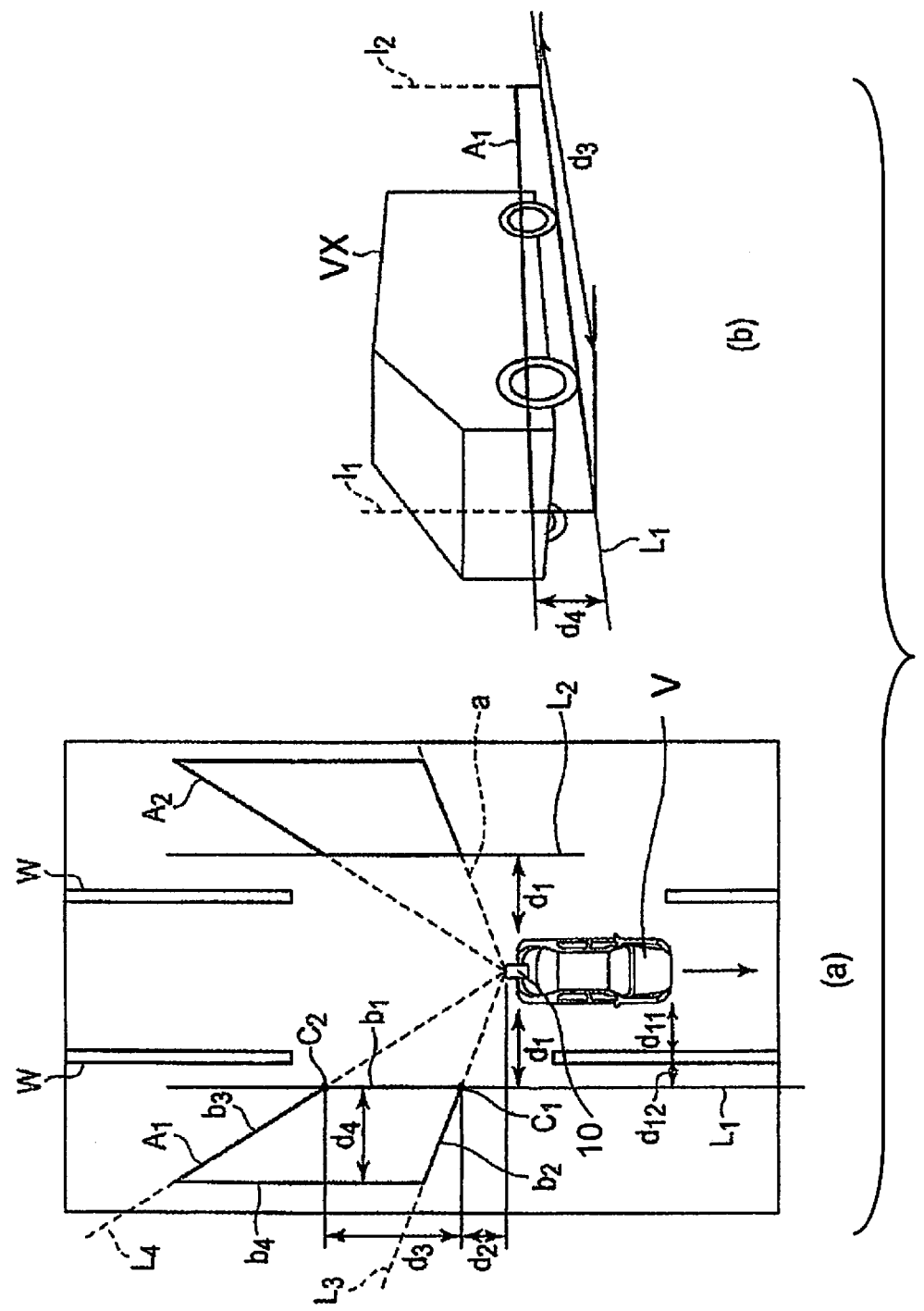
FIG. 13 is a view illustrating the travel state of the vehicle (three-dimensional object detection using edge information) in FIG. 1, with part (a) of FIG. 13 being a plan view illustrating the positional relationships among the detection areas, and part (b) of FIG. 13 being a perspective view illustrating the positional relationships among the detection areas in real space.

Next, the three-dimensional object detection block B, which may be operated in place of the three-dimensional object detection block A illustrated in FIG. 3, will be described. The three-dimensional object detection block B detects three-dimensional objects using edge information configured by a luminance difference calculation unit 35, an edge line detection unit 36, and a three-dimensional object detection unit 37. FIG. 13 illustrates the capture range, etc. of the camera 10 in FIG. 3, part (a) of FIG. 13 indicates a plan view, and part (b) of FIG. 13 indicates a perspective view in real space rearward of the host vehicle V. As illustrated in part (a) of FIG. 13, the camera 10 has a predetermined view angle a and the rearward view from the host vehicle V included in this predetermined view angle a is captured. The view angle a of the camera 10, as in the case illustrated in FIG. 2, is set so as to include in the capture range of the camera 10 not only the lane in which the host vehicle V is traveling but also the adjacent lanes.

The detection areas A1, A2 in the present example are trapezoids as seen in a plan view (bird's-eye view) and the positions, sizes, and shapes of these detection areas A1, A2 are decided based on distances $d_1$ to $d_4$. The detection areas A1, A2 illustrated in FIG. 13 are not limited to being trapezoids, and may also be rectangles or the like as seen from a bird's-eye view, as illustrated in FIG. 2.

Here, the distance d1 is the distance from the host vehicle V to the ground lines L1, L2. The ground lines L1, L2 are the lines at which a three-dimensional object present in a lane adjacent to the lane in which the host vehicle V is traveling is in contact with the ground. In the present embodiment, the object is to detect another vehicle VX or the like (including two-wheeled vehicles and the like) traveling behind the host vehicle V in a lane adjacent to the lane of the host vehicle V to the left or right. Accordingly, the distance d1, which becomes the position of the ground lines L1, L2 of the other vehicle VX, can be decided so as to be substantially fixed based on the distance d11 from the host vehicle V to a white line W and the distance d12 from the white line W to the position in which another vehicle VX is predicted to travel.

The distance d1 is not limited to being decided in a fixed manner and may be variable. In this case, the computer 30 recognizes the position of the white line W in relation to the host vehicle V using white line recognition or another technique, and the distance d11 is decided based on the position of the recognized white line W. The distance d1 is thereby variably set using the decided distance d11. In the present embodiment described below, the position at which the other vehicle VX is travelling (the distance d12 from the white line W) and the position at which the host vehicle V is travelling (the distance d11 from the white line W) are for the most part certain, and therefore the distance d1 is decided in a fixed manner.

The distance d2 is a distance from the rear of the host vehicle V in the direction of advancement of the vehicle. This distance d2 is decided so that at least the detection areas A1, A2 are accommodated within the view angle a of the camera 10. In the present embodiment in particular, the distance d2 is set so as to be in contact with a partitioned range within the view angle a. The distance d3 indicates the length of the detection areas A1, A2 in the direction of advancement of the vehicle. The distance d3 is decided based on the size of the three-dimensional object to be detected. In the present embodiment, the object to be detected is another vehicle VX or the like, and therefore the distance d3 is set to a length that includes the other vehicle VX.

The distance d4 is a distance representing a height set so that the tires of the other vehicle VX or the like are included in real space, as illustrated in part (b) of FIG. 13. In a bird's-eye view image, the distance d4 is the length illustrated in part (a) of FIG. 12. The distance d4 may also be a length that does not include further adjacent lanes adjacent to the left and right adjacent lanes in a bird's-eye view image (i.e., lanes two lanes away). The reason for this is that when the lanes two lanes away from the lane of the host vehicle V are included, it is no longer possible to distinguish whether another vehicle VX is present in the adjacent lanes to the left and right of the lane in which the host vehicle V is traveling, or whether another vehicle VX is present in a lane two lanes away.

As described above, the distances d1 to d4 are decided, and in this way the position, size, and shape of the detection areas A1, A2 are decided. More specifically, the position of the top side b1 of each of the trapezoidal detection areas A1, A2 is decided by the distance d1. The starting position C1 of the top side b1 is decided by the distance d2. The end position C2 of the top side b1 is decided by the distance d3. The lateral side b2 of each of the trapezoidal detection areas A1, A2 is decided by a straight line L3 extending from the camera 10 toward the starting position C1. Similarly, the lateral side b3 of each of the trapezoidal detection areas A1, A2 is decided by a straight line L4 extending from the camera 10 toward the end position C2. The position of the lower side b4 of each of the trapezoidal detection areas A1, A2 is decided by the distance d4. In this manner, the areas surrounded by the sides b1 to b4 are the detection areas A1, A2. The detection areas A1, A2 are regular squares (rectangles) in real space rearward of the host vehicle V, as illustrated in part (b) of FIG. 13.

Returning to FIG. 3, captured image data of a predetermined area captured by the camera 10 is inputted into the viewpoint conversion unit 31. The viewpoint conversion unit 31 converts the viewpoint of the inputted captured image data into bird's-eye view image data in a bird's-eye view state. A bird's-eye view state is a state of viewing from the viewpoint of an imaginary camera that is looking down from above, e.g., directly vertically downward (or slightly inclined downward). This viewpoint conversion can be carried out, for example, in the manner described in Japanese Laid-Open Patent Application No. 2008-219063.

The luminance difference calculation unit 35 calculates luminance differences in the bird's-eye view image data, on which viewpoint-conversion was performed by the viewpoint conversion unit 31, in order to detect the edges of a three-dimensional object included in the bird's-eye view image. The luminance difference calculation unit 35 calculates, for each of a plurality of positions along a virtual vertical line extending vertically in real space, the luminance difference between two pixels near each position. The luminance difference calculation unit 35 is capable of calculating the luminance difference by a method in which a single virtual vertical line extending vertically in real space is set or a method in which two virtual vertical lines are set.

Described below is the specific method for setting two virtual vertical lines. The luminance difference calculation unit 35 sets, on the bird's-eye view image on which viewpoint-conversion has been performed, a first virtual vertical line that corresponds to a line segment extending vertically in real space, and a second virtual vertical line that is different from the first virtual vertical line and corresponds to the line segment extending vertically in real space. The luminance difference calculation unit 35 determines the luminance difference between a point on the first virtual vertical line and a point on the second virtual vertical line in continuous fashion along the first virtual vertical line and the second virtual vertical line. The operation of the luminance difference calculation unit 35 is described in detail below.

Figure 14:
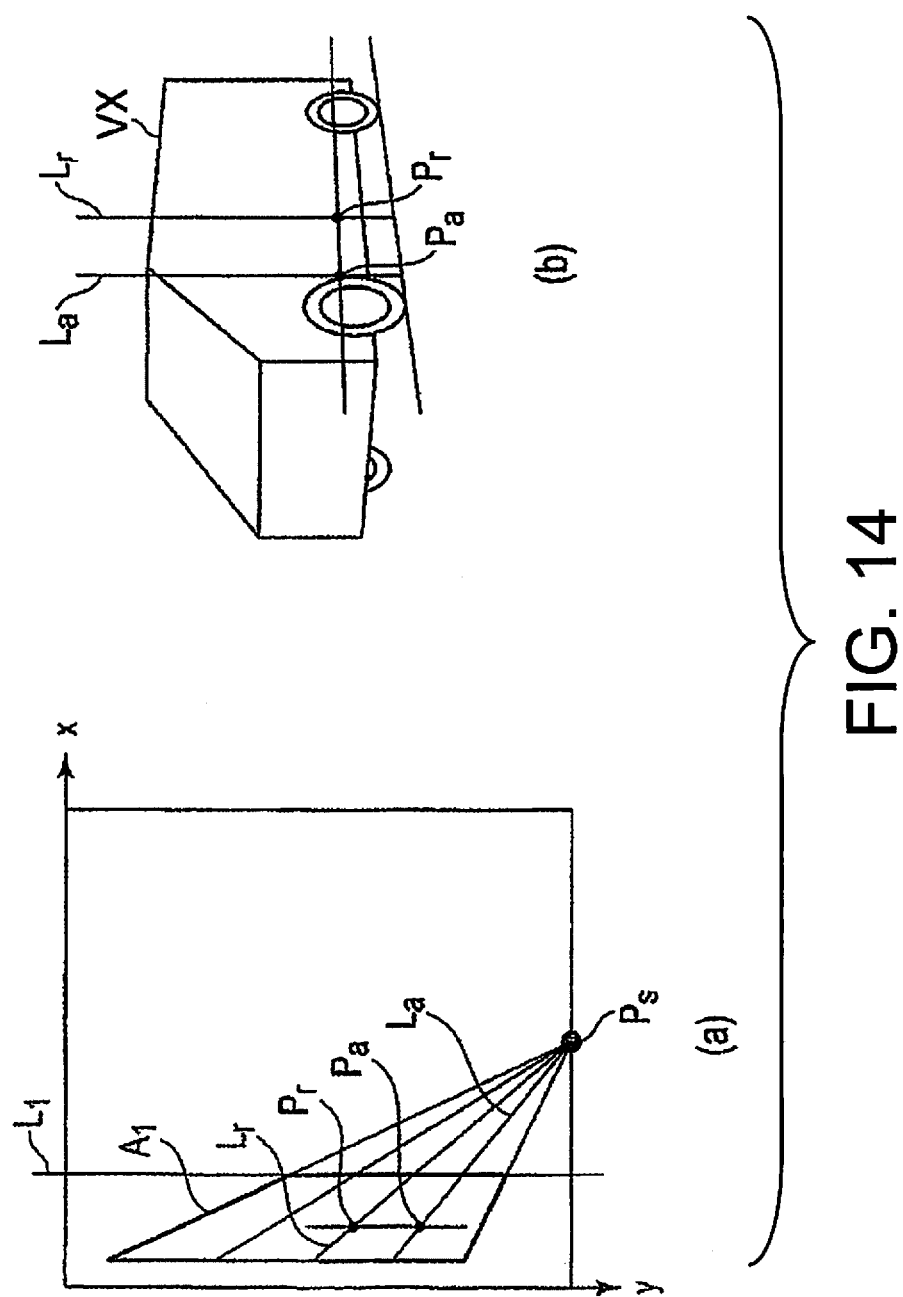
FIG. 14 is a view for describing the operation of the luminance difference calculation unit in FIG. 3, with part (a) of FIG. 14 being a view illustrating the positional relationships among the attention line, reference line, attention point, and reference point in the bird's-eye view image, and part (b) of FIG. 14 being a view illustrating the positional relationships among the attention line, the reference line, the attention point, and the reference point in real space.

The luminance difference calculation unit 35 sets a first virtual vertical line La (hereinafter referred to as "attention line La") that corresponds to a line segment extending vertically in real space and that passes through the detection area A1, as illustrated in part (a) of FIG. 14. The luminance difference calculation unit 35 also sets a second virtual vertical line Lr (hereinafter referred to as "reference line Lr") that is different from the attention line La, corresponds to the line segment extending vertically in real space, and passes through the detection area A1. Here, the reference line Lr is set to a position at a distance from the attention line La by a predetermined distance in real space. The lines that correspond to the line segments extending vertically in real space are lines that spread out in the radial direction from the position Ps of the camera 10 in a bird's-eye view image. These lines spreading out in the radial direction are lines that follow the direction of collapsing of the three-dimensional object when converted to a bird's-eye view.

The luminance difference calculation unit 35 sets an attention point Pa on the attention line La (a point on the first virtual vertical line). The luminance difference calculation unit 35 sets a reference point Pr on the reference line Lr (a point on the second virtual vertical line). The attention line La, the attention point Pa, the reference line Lr, and the reference point Pr have the relationship in real space illustrated in part (b) of FIG. 14. It is apparent from part (b) of FIG. 14 that the attention line La and the reference line Lr are lines extending vertically in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is permissible.

The luminance difference calculation unit 35 determines the luminance difference between the attention point Pa and the reference point Pr. If the luminance difference between the attention point Pa and the reference point Pr is great, there is considered to be an edge present between the attention point Pa and the reference point Pr. Accordingly, the edge line detection unit 36 illustrated in FIG. 3 detects an edge line based on the luminance difference between the attention point Pa and the reference point Pr.

Figure 15:
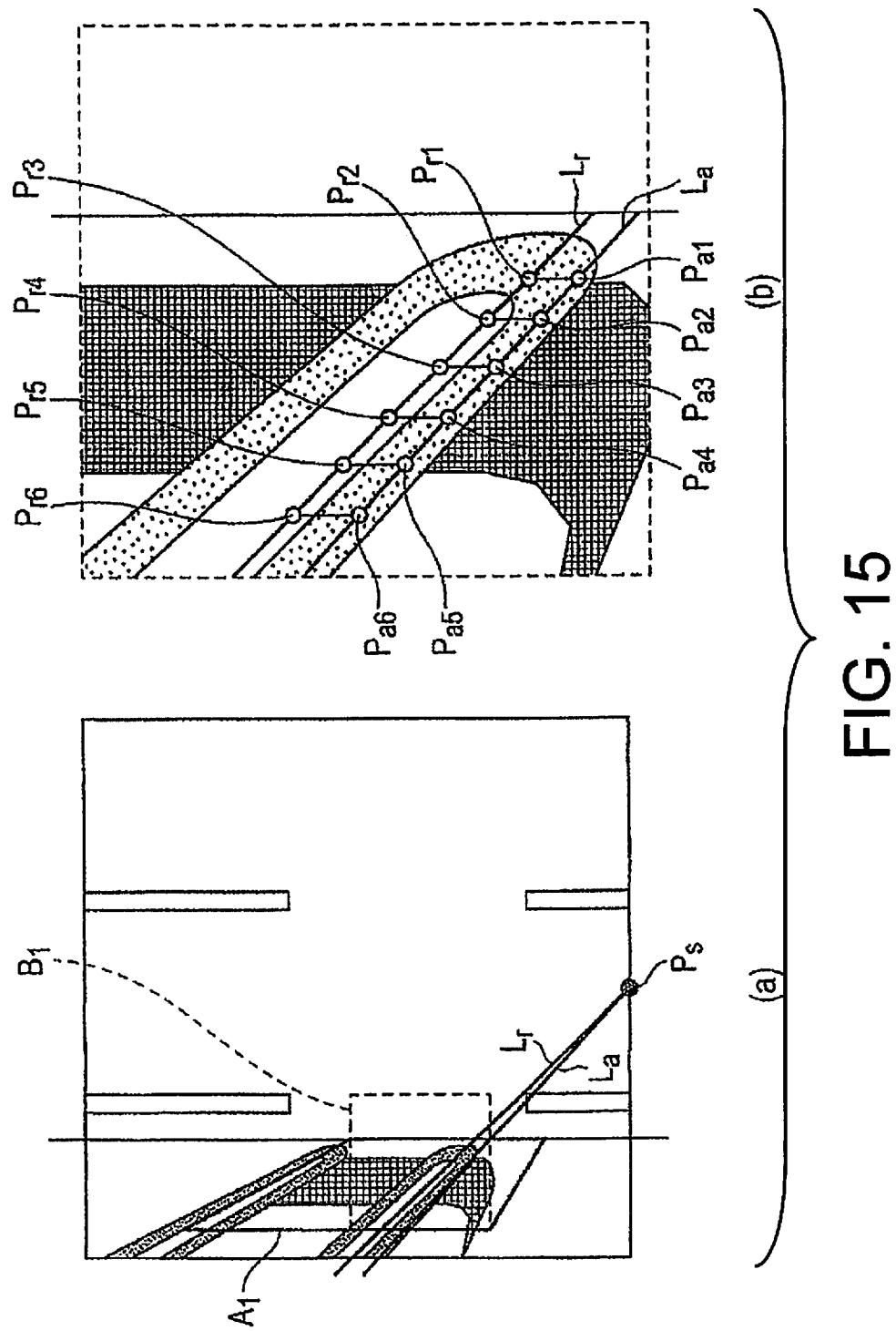
FIG. 15 is a view for describing the detailed operation of the luminance difference calculation unit in FIG. 3, with part (a) of FIG. 15 being a view illustrating the detection area in the bird's-eye view image, and part (b) of FIG. 15 being a view illustrating the positional relationships among the attention line, the reference line, the attention point, and the reference point in the bird's-eye view image.

This feature will be described here in greater detail. FIG. 15 is a view for describing the detailed operation of the luminance difference calculation unit 35. Part (a) of FIG. 15 illustrates a bird's-eye view image in the bird's-eye view state, and part (b) of FIG. 15 is an enlarged view of an area B1 of the bird's-eye view image illustrated in part (a) of FIG. 15. In FIG. 15, only the detection area A1 is illustrated and described, but the luminance difference is calculated using the same procedure for detection area A2 as well.

When another vehicle VX appears in the captured image captured by the camera 10, the other vehicle VX appears in the detection area A1 in the bird's-eye view image, as illustrated in part (a) of FIG. 15. The attention line La is set on a rubber portion of a tire of the other vehicle VX in the bird's-eye view image in part (b) of FIG. 15, as illustrated in the enlarged view of the area B1 in part (a) of FIG. 15. In this state, first, the luminance difference calculation unit 35 sets the reference line Lr. The reference line Lr is set vertically in a position set at a predetermined distance in real space from the attention line La. Specifically, in the three-dimensional object detection device 1 according to the present embodiment, the reference line Lr is set in a position at a distance of 10 cm away in real space from the attention line La. The reference line Lr is thereby set, for example, on the wheel of the tire of the other vehicle VX at a distance that corresponds to 10 cm from the rubber of the tire of the other vehicle VX in the bird's-eye view image.

Next, the luminance difference calculation unit 35 sets a plurality of attention points Pa1 to PaN on the attention line La. In part (b) of FIG. 15, six attention points Pa1 to Pa6 (hereinafter referred to as "attention point Pai" when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same heights as the attention points Pa1 to PaN in real space. The luminance difference calculation unit 35 calculates the luminance difference between attention point Pa and reference point Pr pairs at the same height. The luminance difference calculation unit 35 thereby calculates the luminance difference between two pixels for each of a plurality of positions (1 to N) along virtual vertical lines extending vertically in real space. The luminance difference calculation unit 35 calculates the luminance difference between, for example, a first attention point Pa1 and a first reference point Pr1, and calculates the luminance difference between a second attention point Pa2 and a second reference point Pr2. The luminance difference calculation unit 35 thereby determines the luminance difference in continuous fashion along the attention line La and the reference line Lr. In other words, the luminance difference calculation unit 35 sequentially determines the luminance difference between the third to $N^{th}$ attention points Pa3 to PaN and the third to $N^{th}$ reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space in the direction in which the ground line L1 extends. The luminance difference calculation unit 35, for example, sets the line that was the reference line Lr in the previous process to be the attention line La, sets the reference line Lr in relation to the attention line La, and continues to determine luminance differences in sequence.

Returning to FIG. 3, the edge line detection unit 36 detects the edge line from the continuous luminance difference calculated by the luminance difference calculation unit 35. For example, in the case illustrated in part (b) of FIG. 15, the first attention point Pa1 and the first reference point Pr1 are positioned at the same tire portion, and the luminance difference is therefore small. On the other hand, the second to sixth attention points Pa2 to Pa6 are positioned at the rubber portions of the tire and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 36 is capable of detecting that an edge is present between the second to sixth attention points Pa2 to Pa6 and the second to sixth reference points Pr2 to Pr6, where the luminance difference is high.

Specifically, when an edge line is to be detected, the edge line detection unit 36 first assigns an attribute to the $i^{th}$ attention point Pai from the luminance difference between the $i^{th}$ attention point Pai (coordinates (xi, yi)) and the $i^{th}$ reference point Pri (coordinates (xi', yi')) in accordance with formula 1 below.

$s(xi, yi)=1$ when $I(xi,yi) > I(xi',yi')+t$ $s(xi, yi)=-1$ when $I(xi,yi) < I(xi',yi')-t$ $s(xi, yi)=0$ when the above do not hold true   Formula 1

In formula 1 above, t represents a threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is "1" when the luminance value of the attention point Pai is greater than the luminance value obtained by adding the threshold value t to the reference point Pri. On the other hand, the attribute s(xi, yi) of the attention point Pai is "−1" when the luminance value of the attention point Pai is less than the luminance value obtained by subtracting the threshold value t from the reference point Pri. The attribute s(xi, yi) of the attention point Pai is "0" when the luminance value of the attention point Pai and the luminance value of the reference point Pri are in a relationship other than those mentioned above. The threshold value t may be set in advance or may be changed in accordance with control commands from the controller 39 illustrated in FIG. 3 and described hereinafter.

Next, the edge line detection unit 36 assesses whether the attention line La is an edge line from the continuity c(xi, yi) of the attribute s along the attention line La based on the following formula 2.

$c(xi,yi)=1$ when $s(xi,yi)=s(xi+1,yi+1)$(excluding when 0=0)

$c(xi,yi)=0$ when the above does not hold true.   Formula 2

The continuity c(xi, yi) is "1" when the attribute s(xi, yi) of the attention point Pai and the attribute s(xi+1, yi+1) of the adjacent attention point Pai+1 are the same. The continuity c(xi, yi) is "0" when the attribute s(xi, yi) of the attention point Pai and the attribute s(xi+1, yi+1) of the adjacent attention point Pai+1 are not the same.

Next, the edge line detection unit 36 determines the sum of the continuities c of all the attention points Pa on the attention line La. The edge line detection unit 36 divides the sum of the continuities c thus determined by the number N of attention points Pa to normalize the continuity c. The edge line detection unit 36 determines the attention line La to be an edge line when the normalized value has exceeded a threshold value θ. The threshold value θ is set in advance by experimentation or other means. The threshold value θ may be set in advance or may be changed in accordance with control commands from the controller 39, described hereinafter.

In other words, the edge line detection unit 36 assesses whether the attention line La is an edge line based on formula 3 below. The edge line detection unit 36 then assesses whether all of the attention lines La drawn on the detection area A1 are edge lines.

$\Sigma c(xi,yi)/N > \theta$   Formula 3

Returning to FIG. 3, the three-dimensional object detection unit 37 detects a three-dimensional object based on the quantity of edge lines detected by the edge line detection unit 36. As described above, the three-dimensional object detection device 1 according to the present embodiment detects an edge line extending vertically in real space. Detecting many edge lines extending vertically indicates that there is a high possibility that a three-dimensional object is present in the detection areas A1, A2. Accordingly, the three-dimensional object detection unit 37 detects a three-dimensional object based on the quantity of edge lines detected by the edge line detection unit 36. Further, prior to detecting a three-dimensional object, the three-dimensional object detection unit 37 assesses whether edge lines detected by the edge line detection unit 36 are correct. The three-dimensional object detection unit 37 assesses whether or not the change in luminance on the edge line along the edge line in the bird's-eye view image is greater than a predetermined threshold value. If the change in luminance on the edge line in the bird's-eye view image is greater than the threshold value, the edge line is assessed to have been detected by errant assessment. On the other hand, if the change in luminance on the edge line along the edge line in the bird's-eye view image is not greater than the threshold value, the edge line is assessed to be correct. This threshold value is set in advance by experimentation or the like.

Figure 16:
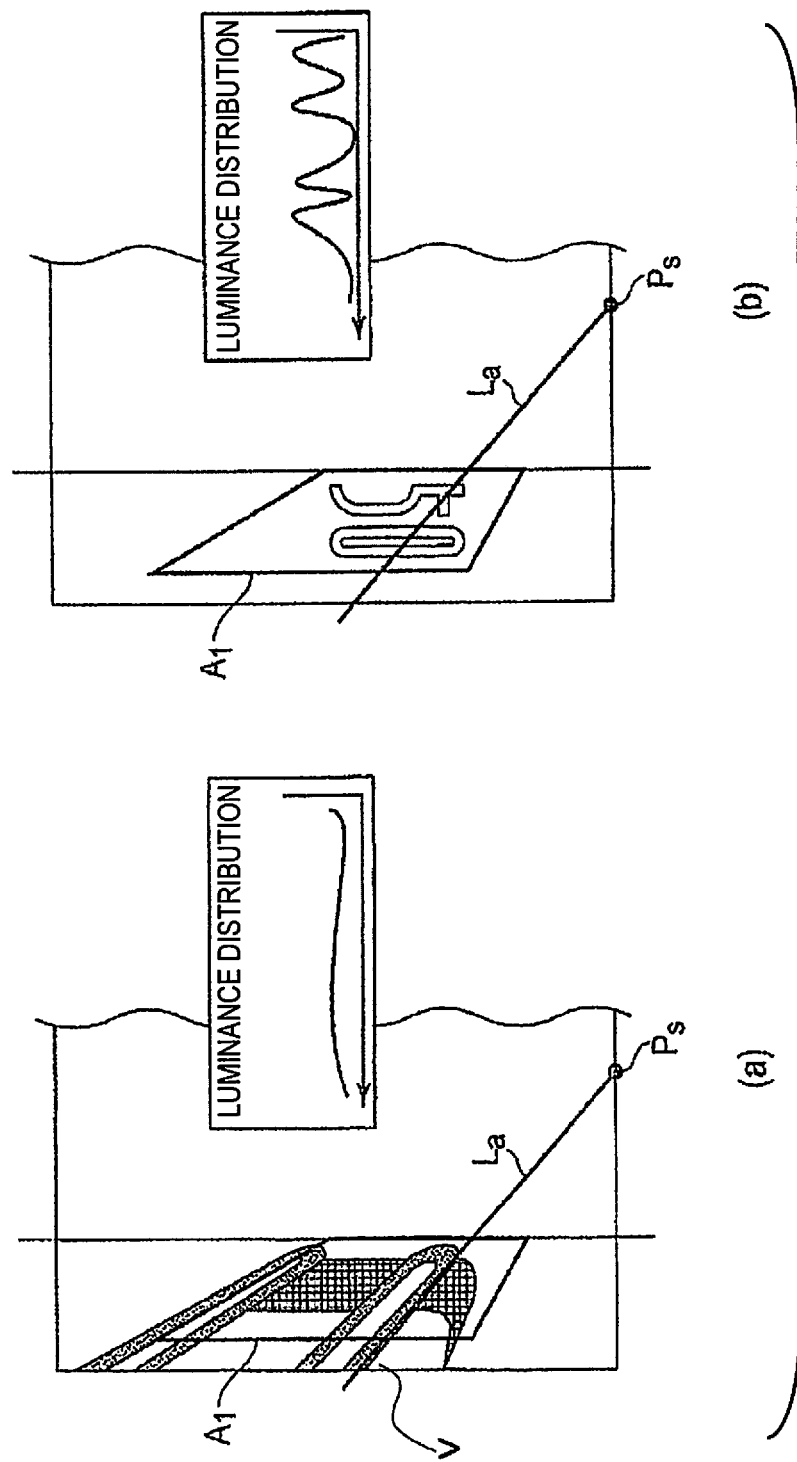
FIG. 16 is a view illustrating the edge line and the luminance distribution on the edge line, with part (a) of FIG. 16 being a view illustrating the luminance distribution when a three-dimensional object (vehicle) is present in the detection area, and part (b) of FIG. 16 being a view illustrating the luminance distribution when no three-dimensional object is present in the detection area.

FIG. 16 is a view illustrating the luminance distribution on the edge line. Part (a) of FIG. 16 illustrates the edge line and the luminance distribution when another vehicle VX as a three-dimensional object is present in the detection area A1, and part (a) of FIG. 16 illustrates the edge line and the luminance distribution when a three-dimensional object is not present in the detection area A1.

As illustrated in part (a) of FIG. 16, it is assumed that it has been assessed that the attention line La set on the tire rubber portion of the other vehicle VX is on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the other vehicle VX is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 16. In this case, the change in luminance on the attention line La in the bird's-eye view image has considerable undulations. This is because portions of low luminance, such as the road and the like are mixed with the portions of high luminance in the white characters on the edge line.

The three-dimensional object detection unit 37 assesses whether or not an edge line has been detected by errant assessment based on discrepancies in luminance distribution on the attention line La such as that described above. The three-dimensional object detection unit 37 assesses that the edge line has been detected by errant assessment when the change in luminance along the edge line is greater than a predetermined threshold value. This edge line is not used in the detection of three-dimensional objects. In this way, a reduction in precision for detecting a three-dimensional object occurring when white characters such as "50" on the road surface, roadside vegetation, and the like are assessed to be edge lines is suppressed.

Specifically, the three-dimensional object detection unit 37 calculates the change in luminance of the edge line using formula 4 or 5 below. The change in luminance of the edge line corresponds to the vertical evaluation value in real space. Formula 4 below evaluates the luminance distribution using the total value of the square of the difference between the $i^{th}$ luminance value $I(xi, yi)$ and the adjacent $i^{th}+1$ luminance value $I(xi+1, yi+1)$ on the attention line La. Formula 5 evaluates the luminance distribution using the total value of the absolute value of the difference between the $i^{th}$ luminance value $I(xi, yi)$ and the adjacent $i^{th}+1$ luminance value $I(xi+1, yi+1)$ on the attention line La.

Evaluation value in vertical equivalent direction=$yi$)
=$\Sigma[\{I(xi+1,yi+1)\}^2]$  Formula 4

Evaluation value in vertical equivalent direction=$\Sigma|I(xi,yi)-I(xi+1,yi+1)|$  Formula 5

No limitation is imposed in the use of formula 5, and it is also possible to binarize an attribute b of an adjacent luminance value using a threshold value t2 and then sum the binarized attribute b for all of the attention points Pa, as in formula 6 below.

Evaluation value in vertical equivalent direction=$\Sigma b(xi,yi)$  Formula 6 where $b(xi, yi)=1$ when $|I(xi, yi)-I(xi+1, yi+1)|>t2$, and $b(xi, yi)=0$ when the above does not hold true.

The attribute $b(xi, yi)$ of the attention point $Pa(xi, yi)$ is "1" when the absolute value of the luminance difference between the luminance value of the attention point Pai and the luminance value of the reference point Pri is greater than a threshold value t2. When the above relationship does not hold true, the attribute $b(xi, yi)$ of the attention point Pai is "0." The threshold value t2 is set in advance by experimentation or other means so that the attention line La is not assessed to be on the same three-dimensional object. The three-dimensional object detection unit 37 then sums the attribute b for all of the attention points Pa on the attention line La and determines the evaluation value in the vertical equivalent direction to assess whether or not an edge line is correct.

Figure 17:
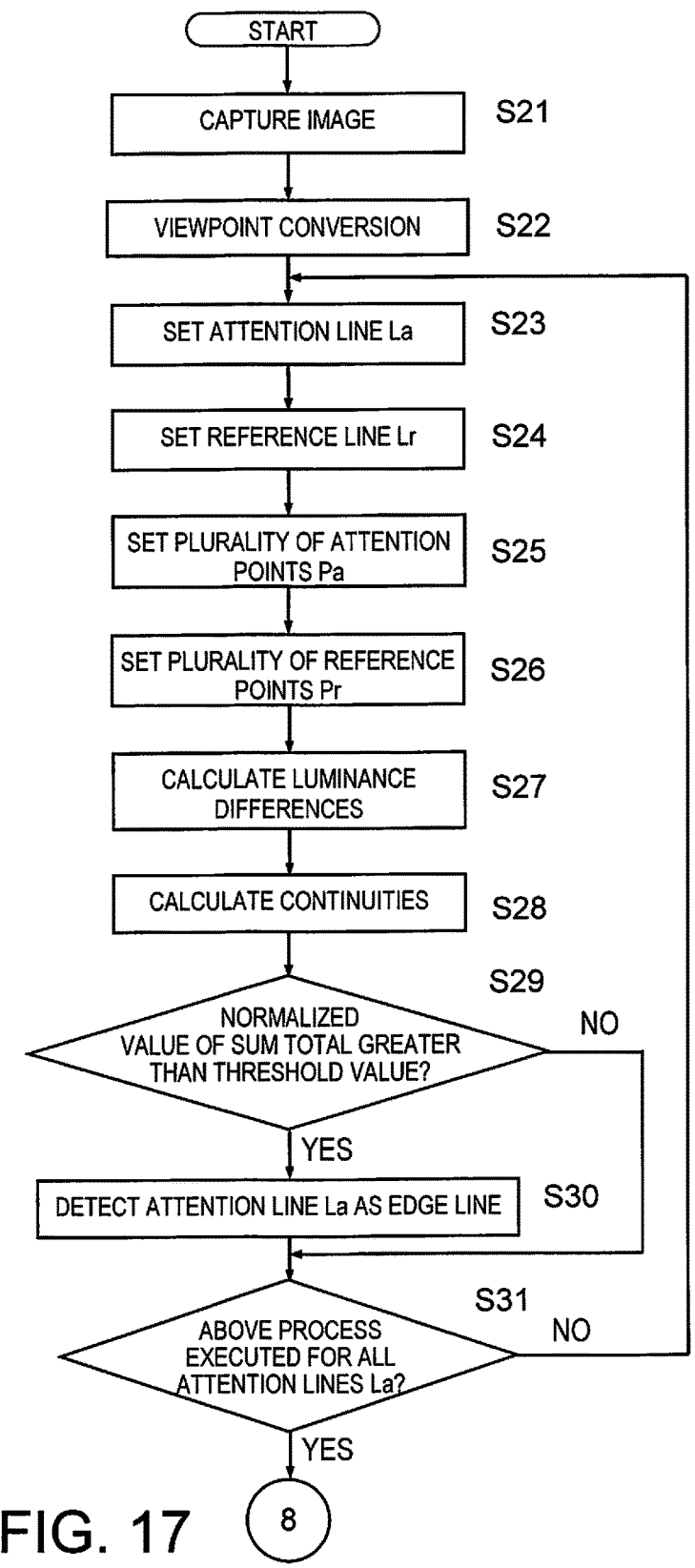
FIG. 17 is a first part of a flowchart illustrating the three-dimensional object detection method using edge information, the method being executed by the viewpoint conversion unit, the luminance difference calculation unit, the edge line detection unit, and the three-dimensional object detection unit in FIG. 3.
Figure 18:
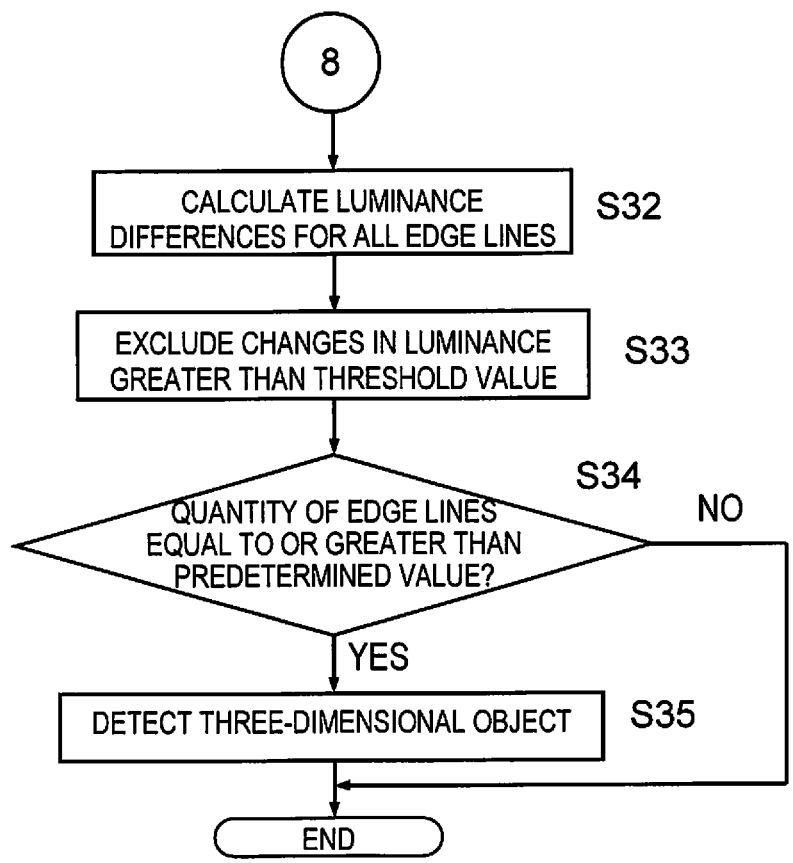
FIG. 18 is a second part of a flowchart illustrating the three-dimensional object detection method using edge information, the method being executed by the viewpoint conversion unit, the luminance difference calculation unit, the edge line detection unit, and the three-dimensional object detection unit in FIG. 3.

Next, the method for detecting a three-dimensional object using edge information according to the present embodiment will be described. FIG. 17 and FIG. 18 are flowcharts illustrating the details of the method for detecting vehicle three-dimensional object according to the present embodiment. In FIG. 17 and FIG. 18, processing involved with detection area A1 will be described for the sake of convenience, but the same processing is executed for the detection area A2 as well.

As shown in FIG. 17, first, in step S21, a predetermined area specified by the view angle a and the attachment position is captured by the camera 10. Next, in step S22, the captured image data captured by the camera 10 in step S21 is inputted into the viewpoint conversion unit 31 and the viewpoint conversion unit 31 performs viewpoint conversion to generate bird's-eye view image data.

Next, in step S23, the luminance difference calculation unit 35 sets the attention line La on the detection area A1. At this time, the luminance difference calculation unit 35 sets a line corresponding to a line extending vertically in real space as the attention line La. In step S24, the luminance difference calculation unit 35 also sets a reference line Lr on the detection area A1. At this time, the luminance difference calculation unit 35 sets, as the reference line Lr, a line that corresponds to a line that extends vertically in real space, is the line being separated by a predetermined distance in real space from the attention line La.

Next, in step S25, the luminance difference calculation unit 35 sets a plurality of attention points on the attention line La. At this time, the luminance difference calculation unit 35 sets attention points Pa in a number that will not cause problems in edge detection by the edge line detection unit 36. In step S26, the luminance difference calculation unit 35 also sets reference points Pr such that the attention points Pa and the reference points Pr are at substantially the same height in real space. The attention points Pa and the reference points Pr thereby substantially line up in the horizontal direction and edge lines extending vertically in real space can be more readily detected.

Next, in step S27, the luminance difference calculation unit 35 calculates the luminance difference between the attention points Pa and the reference points Pr at the same height in real space. The edge line detection unit 36 then calculates the attribute s of the attention points Pa in accordance with formula 1 above. In step S28, the edge line detection unit 36 then calculates the continuity c of the attribute s of the attention points Pa in accordance with formula 2. In step S29, the edge line detection unit 36 then assesses whether or not a value obtained by normalizing the sum of the continuity c is greater than a threshold value θ in accordance with formula 3. If it has been assessed that the normalized value is greater than the threshold value θ (S29: YES), the edge line detection unit 36 detects the attention line La as the edge line in step S30. The process then proceeds to step S31. If it has been assessed that the normalized value is not greater than the threshold value θ (S29: NO), the edge line detection unit 36 does not detect that the attention line La is an edge line, and the process proceeds to step S31. This threshold value θ can be set in advance but also can be changed by the controller 39 in accordance with control commands.

In step S31, the computer 30 assesses whether the processes of steps S23 to S30 have been executed for all the attention lines La that can be set on the detection area A1. If it has been assessed that the above processes have not been carried out for all the attention lines La (S31: NO), the process returns to step S23, a new attention line La is set, and the process is repeated through step S31. On the other hand, if it has been assessed that the processes have been carried out for all the attention lines La (S31: YES), the process proceeds to step S32 in FIG. 18.

In step S32 in FIG. 18, the three-dimensional object detection unit 37 calculates the change in luminance along the edge line for each edge line detected in step S30 in FIG. 17. The three-dimensional object detection unit 37 calculates the change in luminance of edge lines in accordance with formula 4, 5, or 6. Next, in step S33, the three-dimensional object detection unit 37 excludes, from among the edge lines, edge lines in which the change in luminance is greater than a predetermined threshold value. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value is determined by experimentation or other means in advance and is set based on the change in luminance that occurs due to characters on the road surface, roadside vegetation, and the like.

Next, in step S34, the three-dimensional object detection unit 37 assesses whether the quantity of edge lines is equal to or greater than a second threshold value β. Here, the second threshold value β is set in advance by experimentation or other means and can also be changed in accordance with control commands generated by the controller 39 illustrated in FIG. 3, but the details of this will be described later. For example, if a four-wheeled vehicle is set as the three-dimensional object to be detected, the second threshold value β is set in advance based on the number of edge lines of a four-wheeled vehicle appearing within the detection area A1 by experimentation or the like. If it has been assessed that the quantity of edge lines is equal to or greater than the second threshold value β (S34: YES), the three-dimensional object detection unit 37 detects in step S35 that a three-dimensional object is present in the detection area A1. On the other hand, if it has been assessed that the quantity of edge lines is not equal to or greater than the second threshold value β (S34: NO), the three-dimensional object detection unit 37 assesses that there is not a three-dimensional object present in the detection area A1. After this, the processing shown in FIG. 17 and FIG. 18 is concluded. A detected three-dimensional object may be assessed to be another vehicle VX traveling in an adjacent lane next to the lane in which the host vehicle V is traveling, or the speed of the detected three-dimensional object relative to the host vehicle V may be considered to assess whether the three-dimensional object is another vehicle VX traveling in an adjacent lane. The second threshold value β can be set in advance, but the second threshold value β can also be changed according to a control command by the controller 39.

As described above, with the three-dimensional object detection method using edge information of the present embodiment, virtual vertical lines are set as line segments extending vertically in real space in a bird's-eye view image in order to detect three-dimensional objects present in the detection areas A1, A2. Then, for each of a plurality of positions along the virtual vertical lines, the luminance difference between two nearby pixels in each of these positions is calculated and the presence or absence of a three-dimensional object is assessed based on the continuity of these luminance differences.

Specifically, an attention line La corresponding to a line segment extending vertically in real space and a reference line Lr different from the attention line La are set in the detection areas A1, A2 in a bird's-eye view image. Then, the luminance difference between attention points Pa on the attention line La and reference points Pr on the reference line Lr are determined continuously along the attention line La and the reference line Lr. In this way, the luminance difference between the attention line La and the reference line Lr is determined by continuously determining the luminance differences between fellow points. If the luminance difference between the attention line La and the reference line Lr is high, there is a high possibility that the edge of a three-dimensional object is present in the set location on the attention line La. In this way, three-dimensional objects can be detected based on continuous luminance difference. In particular, even if the three-dimensional object is elongated because of the height from the road surface by conversion to a bird's-eye view image in order to compare the luminance of the virtual vertical lines extending vertically in real space, the process of detection of three-dimensional objects is not affected. Consequently, the precision of detection of three-dimensional objects can be improved using the method of the present example.

Moreover, in the present example, the luminance difference between two points of substantially the same height in the vicinity of the virtual vertical lines is determined. Specifically, because the luminance difference is determined from the attention points Pa on the attention line La and the reference points Pr on the reference line Lr having substantially the same height in real space, luminance differences in cases where an edge that extends vertically is present can be accurately detected.

Figure 19:
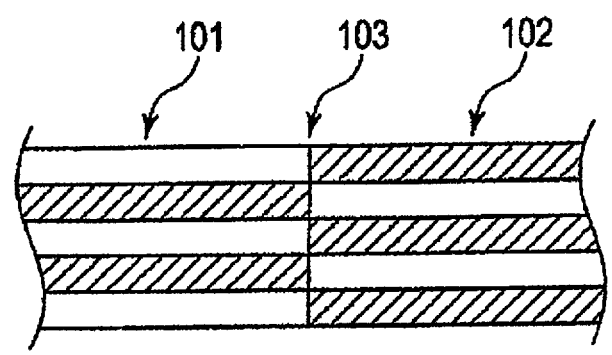
FIG. 19 is a view illustrating an image example for describing edge detection operation.

Furthermore, in the present example, because an attribute is assigned to the attention line Pa based on the luminance differences between the attention points Pa on the attention line La and the reference points Pr on the reference line Lr and an assessment is made as to whether the attention line La is an edge line based on the continuity c of the attribute along the attention line La, a boundary between a high-luminance area and a low-luminance area is detected as an edge and edge detection can be performed in accordance with the natural human senses. This effect will be explained here in detail. FIG. 19 is a view illustrating an example of an image for explaining the processing of the edge line detection unit 36. This image example is an image in which a first striation 101, indicating striation in which high-luminance areas and low-luminance areas are repeated, and a second striation 102, indicating striation in which low-luminance areas and high-luminance areas are repeated, are mutually adjacent. Moreover, in this image example, the high-luminance areas in the first striation 101 and the low-luminance areas in the second striation 102 are mutually adjacent and the low-luminance areas in the first striation 101 and the high-luminance areas in the second striation 102 are mutually adjacent. There is a tendency for the human senses not to detect the site 103 located on the boundary between this first striation 101 and second striation 102 as an edge.

In contrast, because low-luminance areas and high-luminance areas are mutually adjacent, if an edge is detected by luminance difference alone, this site 103 will be identified as an edge. However, the edge line detection unit 36 assesses the site 103 as an edge line only if the attribute of luminance difference is continuous in addition to the luminance difference at the site 103, and therefore the edge line detection unit 36 can suppress errant assessment in which the site 103, which would not be identified as an edge line by the human senses, is identified as an edge line, and therefore edge detection can be performed in accordance with the human senses.

Furthermore, in the present example, if the change in luminance on an edge line detected by the edge line detection unit 36 is greater than a predetermined threshold value, that edge line will be determined to have been errantly assessed. When the captured image taken by the camera 10 is converted to a bird's-eye view image, there is a tendency for a three-dimensional object included in the captured image to appear in the bird's-eye view image in an elongated state. For example, if the tire of another vehicle VX is elongated as described above, the one part of the tire is elongated, and therefore the change in luminance in the bird's-eye view in the direction of elongation tends to be smaller. In contrast, if characters on the road surface or the like are errantly assessed as edge lines, the high-luminance character portions and the low-luminance road surface portions will be mixed in the bird's-eye view image. In this case, in the bird's-eye view image, the change in luminance in the direction of elongation tends to be greater. Consequently, by the assessment of luminance changes in the bird's-eye view image along the edge line as in the present example, edge lines detected by errant assessment can be identified and the precision of detection of three-dimensional objects can be increased.

Final Assessment of Three-Dimensional Object

Returning to FIG. 3, the three-dimensional object detection device 1 of the present example is provided with a three-dimensional object detection unit 33 and/or a three-dimensional object detection unit 37, a three-dimensional object assessment unit 34, a foreign matter detection unit 38, and a controller 39. The three-dimensional object assessment unit 34 assesses finally whether or not a detected three-dimensional object is another vehicle VX present in the detection areas A1, A2 based on the detection results of the three-dimensional object detection unit 33 and/or the three-dimensional object detection unit 37.

The foreign matter detection unit 38 detects the adhesion of foreign matter to the lens 11 of the camera 10 by a method described hereinafter. If foreign matter adhering to the lens is detected by the foreign matter detection unit 38, in order to suppress the assessment of the detected three-dimensional object as another vehicle VX, the controller 39 outputs control signals controlling the constituent parts (including the controller 39) of the computer 30 so that the assessment of the image corresponding to the detected foreign matter as another vehicle VX present in the detection areas A1, A2 is suppressed. This suppression includes the termination or interruption of detection or assessment of other vehicles. This will be described hereinafter.

Foreign Matter Detection Method

Figure 20:
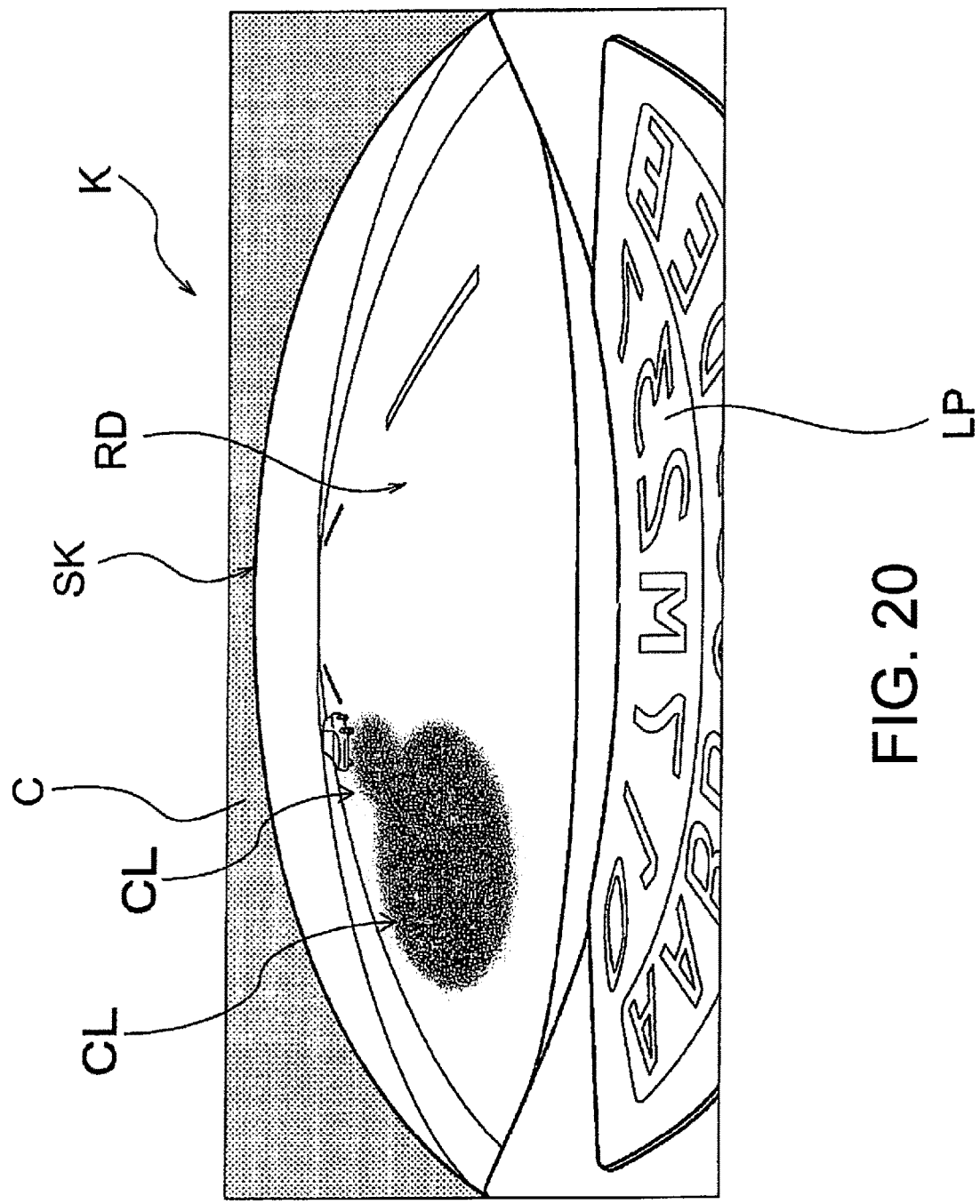
FIG. 20 is a view illustrating an example of a captured image when foreign matter has adhered to the lens.
Figure 21:
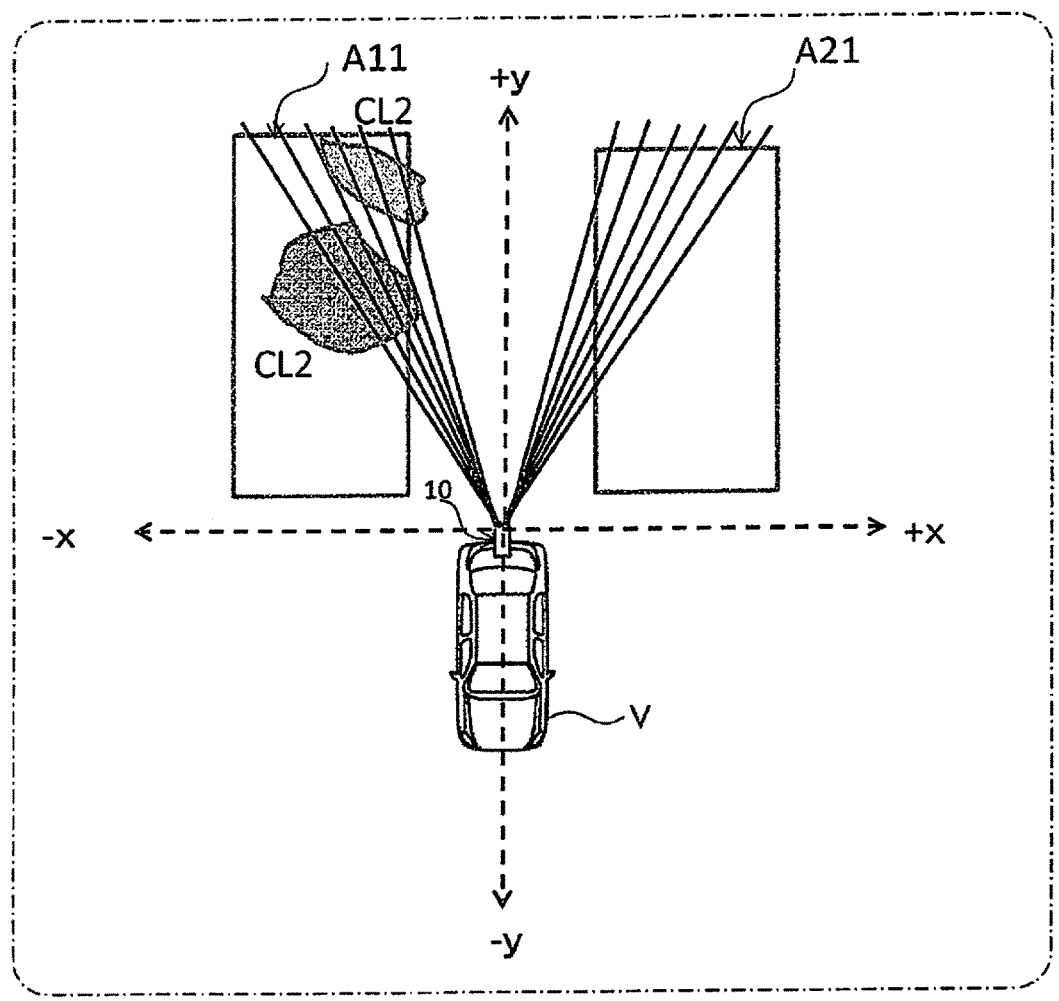
FIG. 21 is a view illustrating an example of the state of the detection area when foreign matter has adhered to the lens.

Next, the detection processing of the foreign matter detection unit 38 will be explained. The foreign matter detection unit 38 acquires image information capturing a rearward view from the host vehicle V captured by the camera 10. An example of the acquired image information K is illustrated in FIG. 20. The image information illustrated in FIG. 20 is captured via a lens 11 to which foreign matter is adhered. The lower part of the video image in FIG. 20 is a license plate LP and the gray area in the upper part is an image of the case C of the camera 10. The image of the area between the license plate LP and the case C changes moment-by-moment with the movement of the host vehicle V. As illustrated in FIG. 20, the image information K for the area between the license plate LP and the case C includes an image of the road surface RD of the road on which the host vehicle V is traveling and an image of the rearward sky SK extending above this road surface RD. Moreover, an image CL of foreign matter adhering to the lens 11 is reflected in the image information K illustrated in FIG. 20. If image conversion processing is carried out using the image information captured through a lens 11 to which foreign matter is adhering, such as that illustrated in FIG. 20, an image CL2 corresponding to the image CL of the foreign matter appears in the detection area A11, as illustrated in FIG. 21. If differential waveform information or edge information is calculated by the procedure described above based on a bird's-eye view image such as this, and three-dimensional object detection processing is carried out, the image CL 2 may be errantly identified as an image of another vehicle VX.

Figure 22:
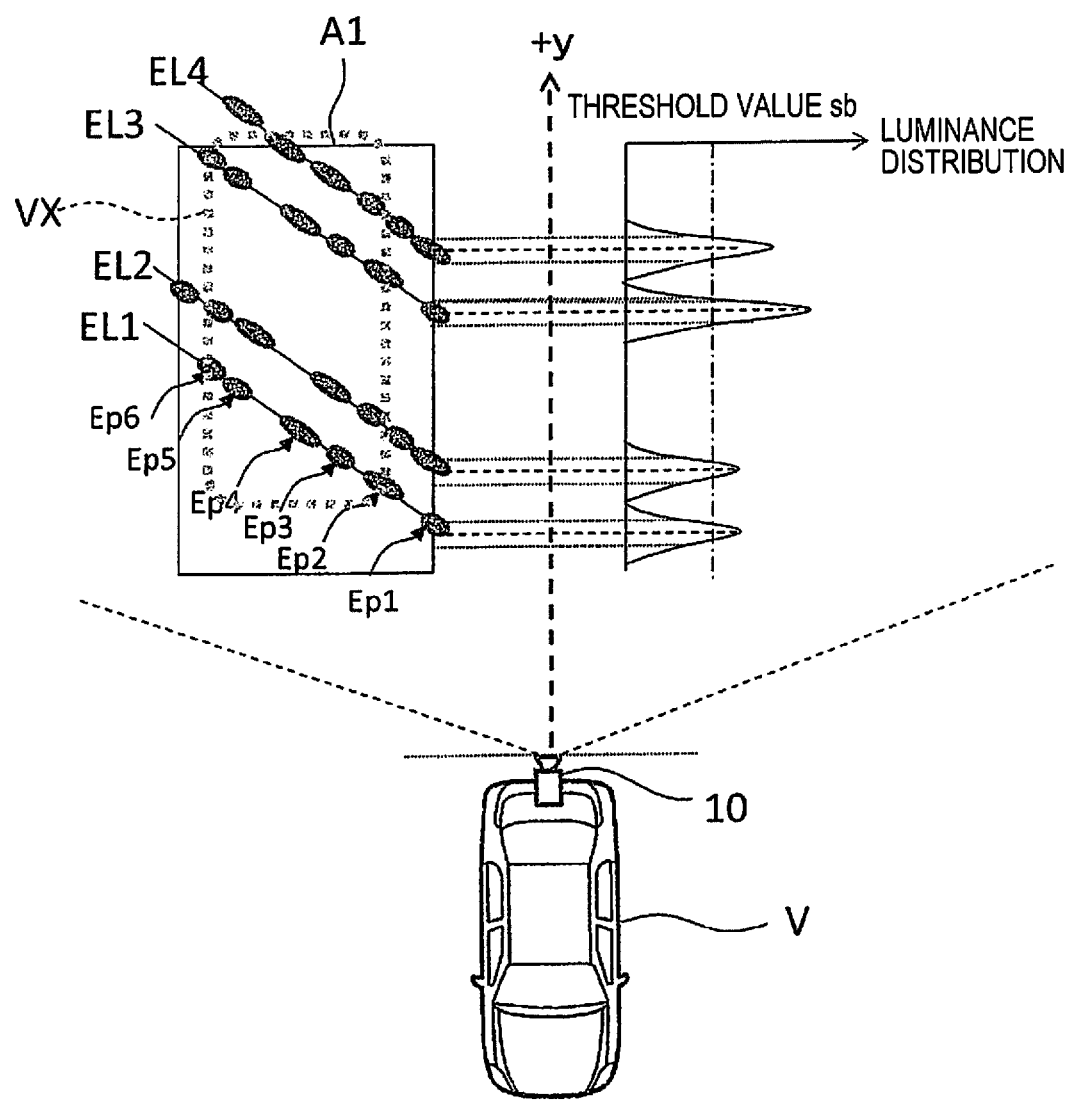
FIG. 22 is a view for explaining an example of edge information if a vehicle is present in the detection area.

Specifically, as shown in FIG. 22, if no foreign matter is adhering to the lens 11, if another vehicle VX is present in the detection area A1, when viewpoint conversion is applied to the bird's-eye view image, the characteristics of the other vehicle VX, for example, pixels for which the differential waveform information (frequency) corresponding to the boundary between the tire and the wheel is equal to or greater than a predetermined threshold value or edge quantities for which the luminance difference is equal to or greater than a predetermined value will be distributed at quantities equal to or greater than threshold values sb along the direction EL1 to EL4 of collapsing of the three-dimensional object. On the other hand, if a case in which foreign matter CL is adhering to the lens 11 is evaluated experimental, even if there is no other vehicle VX or three-dimensional object present in the detection area A1, there is a tendency for frequency distribution of differential waveform information exceeding the threshold value sb and edge quantities having luminance difference equal to or greater than the predetermined value to be detected along the direction EL1 to EL4 of collapsing of a three-dimensional object when the bird's-eye view image is subjected to viewpoint conversion. Pixel information of this kind corresponding to an image caused by foreign matter CL adhering to such a lens 11 causes errant detection of other vehicles VX and other three-dimensional objects.

Accordingly, the three-dimensional object detection device 1 of the present example is provided with a foreign matter detection unit 38 for detecting foreign matter adhering to the lens 11 based on both the change over time in the luminance values of an image capturing element and the change over time in the difference between evaluation values obtained from the differential waveform described above and reference values.

First Foreign Matter Detection Method

Figure 24:
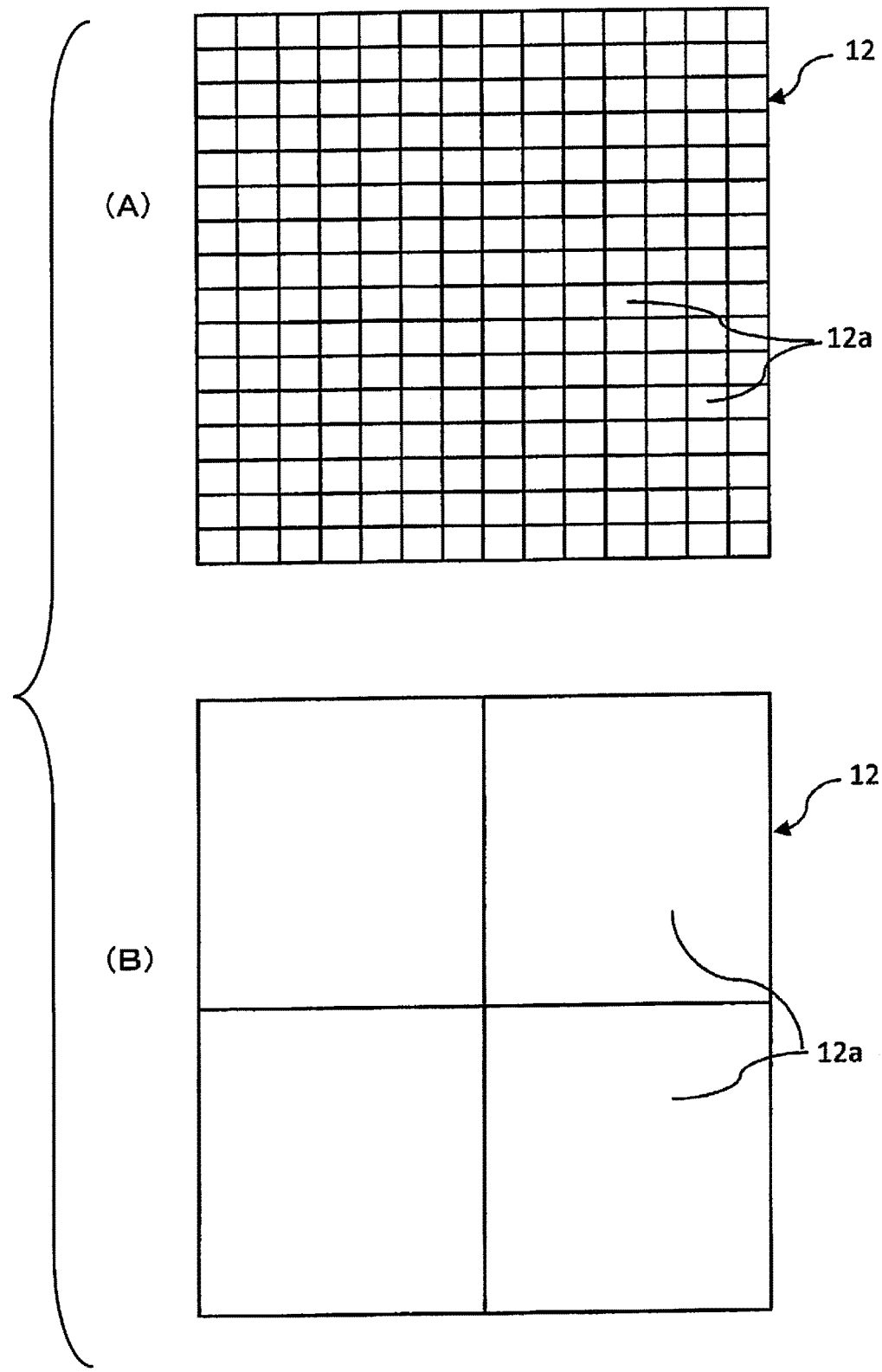
FIG. 24 is a view illustrating pixels in an area corresponding to the detection area in an image capturing element included in the camera in FIG. 3.

First, the first foreign matter detection method, based on the change over time in the luminance values of an image capturing element, will be described. Part (a) and (b) of FIG. 24 illustrate pixels 12 in an area corresponding to the detection areas A1, A2 in an image capturing element (CCD or the like) included in the camera 10. Part (a) of FIG. 24 illustrates an example of a pixel partition when the environmental brightness is greater than a predetermined value, for example, in the daytime, and part (b) of FIG. 24 illustrates an example of a pixel partition when the environmental brightness is lower than a predetermined value, for example, at nighttime. The area of the pixel partitions 12a per unit in the image capturing element illustrated in part (a) of FIG. 24 is set to be smaller than that of the pixels 12 of the image capturing element illustrated in part (a) of FIG. 24. For example, in part (b) of FIG. 24, one of the pixels constituting the image capturing element is made into a pixel partition 12a that forms a single unit and in part (b) of FIG. 24, sixty-three of the pixels that constitute the image capturing element are made into a pixel partition 12a that forms a single unit. However, the number of pixels that constitute a one-unit pixel partition 12a is not limited to these numbers. Because the amount of light received becomes smaller and the amount of noise becomes relatively greater if the environment is dark, it is possible to suppress the effect of such noise by increasing the area of the pixel partition.

Figure 25:
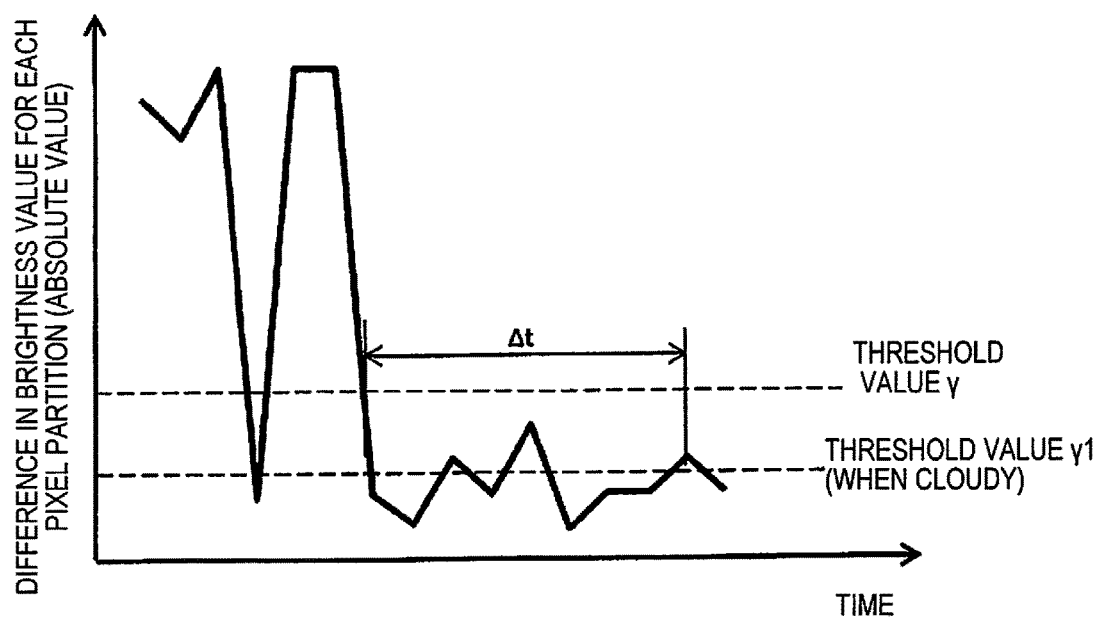
FIG. 25 is a graph illustrating an example of the absolute values of luminance differences in one pixel partition in FIG. 24.

The foreign matter detection unit 38 reads an output signal (corresponding to a luminance value) from each of the pixel partitions 12a at predetermined time intervals and computes the absolute value of the change in luminance value per unit of time. FIG. 25 is a graph illustrating an example of the absolute value of the luminance difference in one pixel partition 12a and the foreign matter detection unit 38 assesses whether or not the change over time in the luminance value over a set period of time Δt is equal to or less than a threshold value γ. If the photographic subject varies, the change over time in the luminance values detected for each pixel of the image capturing element becomes proportionally greater, but if foreign matter adheres to the lens 11, the luminance value of the image detected by the image capturing element tends to be fixed to a constant value, and in the present example, whether there is adhering foreign matter present is assessed using this characteristic.

Figure 26:
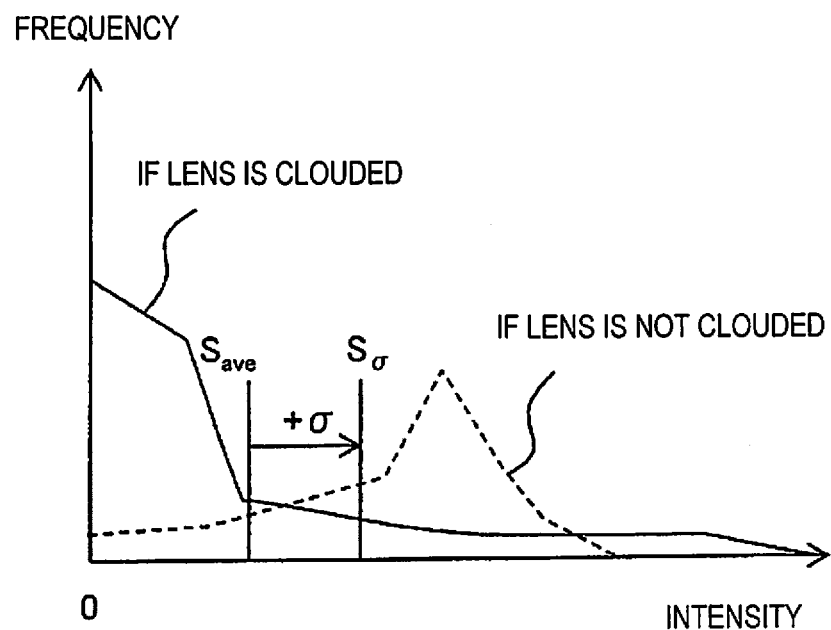
FIG. 26 is a view illustrating an example of a histogram based on edge intensity.

The threshold value γ for assessing whether or not the luminance values detected for each pixel partition 12a are fixed to a constant value can be determined in advance by experiment or simulation, but can also be set in accordance with the cloudiness of the lens 11. Cloudiness can, for example, be calculated as follows. Specifically, when foreign matter such as a water stain adheres to the lens, forming a thin white film on the surface of the lens 11, the degree to which the lens 11 is clouded by this is calculated by first extracting the edge of the photographic subject from the area where edge extraction of a predetermined amount is expected, such as the horizon, the edge of the road, or the like, in the image obtained by the image capturing element, and a histogram is generated based on the strength of the extracted edge. FIG. 26 illustrates an example of a histogram based on edge strength, with the solid line representing the histogram if the lens 11 is clouded and the dashed line the histogram if the lens 11 is not clouded.

If water stains or other foreign matter has adhered to the lens 11, clouding the lens 11, the contour (edge) of the photographic subject is blurred due to blocking, diffuse reflection, or the like of part of the light beams from the photographic subject and, as illustrated in FIG. 26, the strength of the edge extracted from the photographic subject tends to be smaller than if the lens is not clouded. The foreign matter detection unit 38 of the present example computes, using this characteristic, the mean value $S_{ave}$ of the strength of the extracted edge, computes the standard deviation a of the strength of the extracted edge, and calculates the value of the standard deviation a added to the mean value $S_{ave}$ edge strength as the cloudiness Sσ of the lens. The degree of cloudiness is greater the smaller the cloudiness Sσ is and the degree of cloudiness is smaller the greater the cloudiness Sσ is.

Incidental, because the contours of the photographic subject tend to be blurred if the lens 11 is clouded, even if foreign matter has not adhered to the lens 11, the change over time in the luminance value become smaller and misidentification of the adhesion of foreign matter may thereby occur. Accordingly, in the present example, as the cloudiness Sa of the lens 11, determined as described above, falls to or below a predetermined value, i.e., as the degree of cloudiness becomes greater, the greater value to which the threshold value γ illustrated in FIG. 25 is set. In this way, because the change over time in the luminance value due to cloudiness of the lens 11 becomes equal to or less than the threshold value γ, misidentification of the adhesion of foreign matter to the lens 11 can be prevented.

Figure 27:
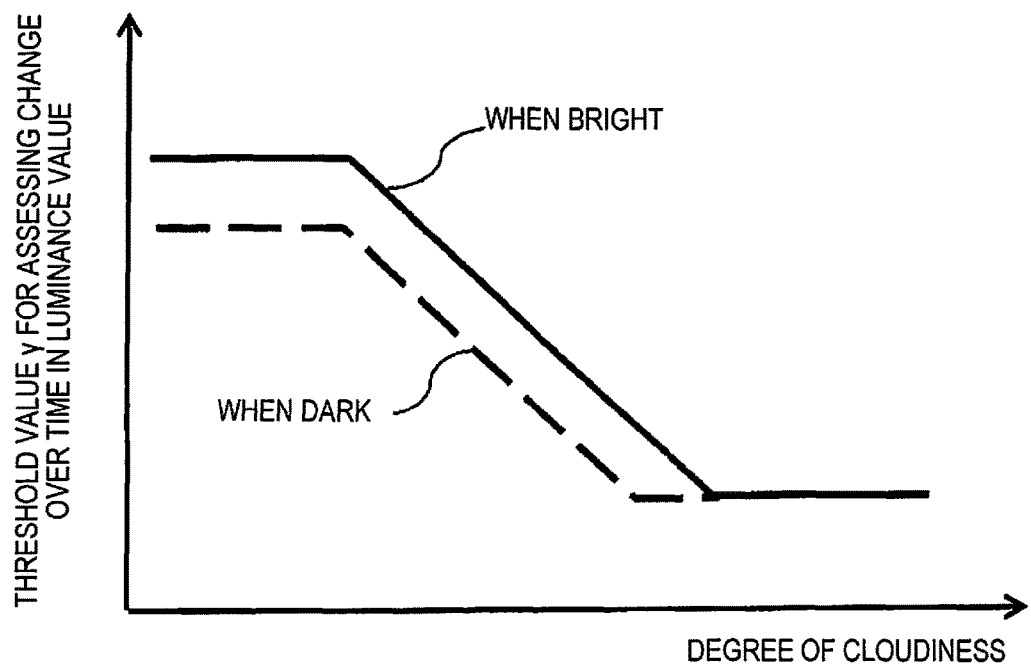
FIG. 27 is a view illustrating a control map relating to an example of setting the threshold value γ according to the degree of cloudiness of the lens.

FIG. 27 illustrates a control map relating to an example of setting the threshold value γ according to the degree of cloudiness of the lens 11. In this graph, the solid line represents a control map for setting the threshold value γ for the degree of cloudiness when the luminance of the environment is greater than a predetermined value, e.g., during the day, and the dashed line represents a control map for setting the threshold value γ for the degree of cloudiness when the luminance of the environment is less than a predetermined value, e.g., at night. The greater the degree of cloudiness of the lens 11, the smaller the value to which the threshold value γ for assessing the change over time in the luminance value is set, and the smaller the degree of cloudiness of the lens 11, the greater the value to which the threshold value γ for assessing changes over time in the luminance value is set ($\gamma \to \gamma_1, \gamma < \gamma_1$). It is thereby possible to prevent misidentification when the change over time in luminance falls to or below the normal threshold value γ due to clouding of the lens 11.

Second Foreign Matter Detection Method

Next, the second method for detecting foreign matter, based on the change over time in the difference between an evaluation value obtained from differential waveform information and a reference value, will be described. The foreign matter detection unit of the present embodiment extracts a first maximum from differential waveform information generated by the three-dimensional object detection unit 33 at one or a plurality of first timings, acquires a reference value based on this first maximum, extracts a second maximum corresponding in position and duration in the bird's-eye view image to the first maximum from differential waveform information newly generated at one or a plurality of second timings after the first timing(s), and acquires an evaluation value based on this second maximum. Then, the foreign matter detection unit 38 detects whether or not foreign matter has adhered to the lens 11 based on the change over time in the difference between this evaluation value and the reference value.

The foreign matter detection unit 38 of the present embodiment extracts a first maximum that is included in the differential waveform information generated at the first timing, acquires an x value (position or duration) and a y value (count value) identifying this first maximum, and obtains a reference value based on the first maximum (y value). The reference value may be a value equal to or less than the first maximum (y value), a predetermined proportion of the first maximum (y value), or a value found by subtracting a predetermined value from the first maximum (y value). Moreover, a maximum that is included in the differential waveform information generated at the second timing is extracted as the second maximum, the maximum corresponding to the x value (position or duration) of the first maximum or having a difference from the x value by a predetermined amount or less. The evaluation value is obtained based on this second maximum (y value). The reference value may be a value equal to or less than the second maximum (y value), a predetermined proportion of the second maximum (y value), or a value found by subtracting a predetermined value from the second maximum (y value). In this procedure, procedures common to the procedure for deriving the reference value from the first maximum may be used.

The foreign matter detection unit 38 acquires differences between these evaluation values and reference values over time and calculates the change over time in the differences acquired at each timing. The foreign matter detection unit 38 of the present embodiment detects whether or not foreign matter has adhered to the lens based on the amount of change over time in the evaluation values, to which position and duration correspond, and the reference values. The foreign matter detection unit 38 determines the degree of deviation (variation) between the evaluation values and the reference values as changes over time associated with the passage of time. If the amount of change in the evaluation values and the reference values is small even when time passes, it can be assessed that the object detected at the first timing and the object detected at the second timing are the same object, i.e., that it is an object (foreign matter) that has adhered to the lens 11.

In order to evaluate changes in the evaluation value and the reference value associated with the passage of time, if the foreign matter detection unit 38 assesses that the degree of change over time in the difference between the evaluation value and the reference value is within a predetermined scope of assessment, it assesses that the image including the pixels corresponding to the evaluation value is an image caused by foreign matter that has adhered to the lens 11 and detects that foreign matter has adhered to the lens 11. Specifically, if a state in which the difference between the evaluation value and the reference value remains within a predetermined value continues for a predetermined duration, the adhesion of foreign matter to the lens 11 is detected, and if the difference between the evaluation value and the reference value exceeds a predetermined value or a state in which the difference between the two is within the predetermined value does not continue for a predetermined duration, no adhesion of foreign matter to the lens 11 is detected.

Figure 23:
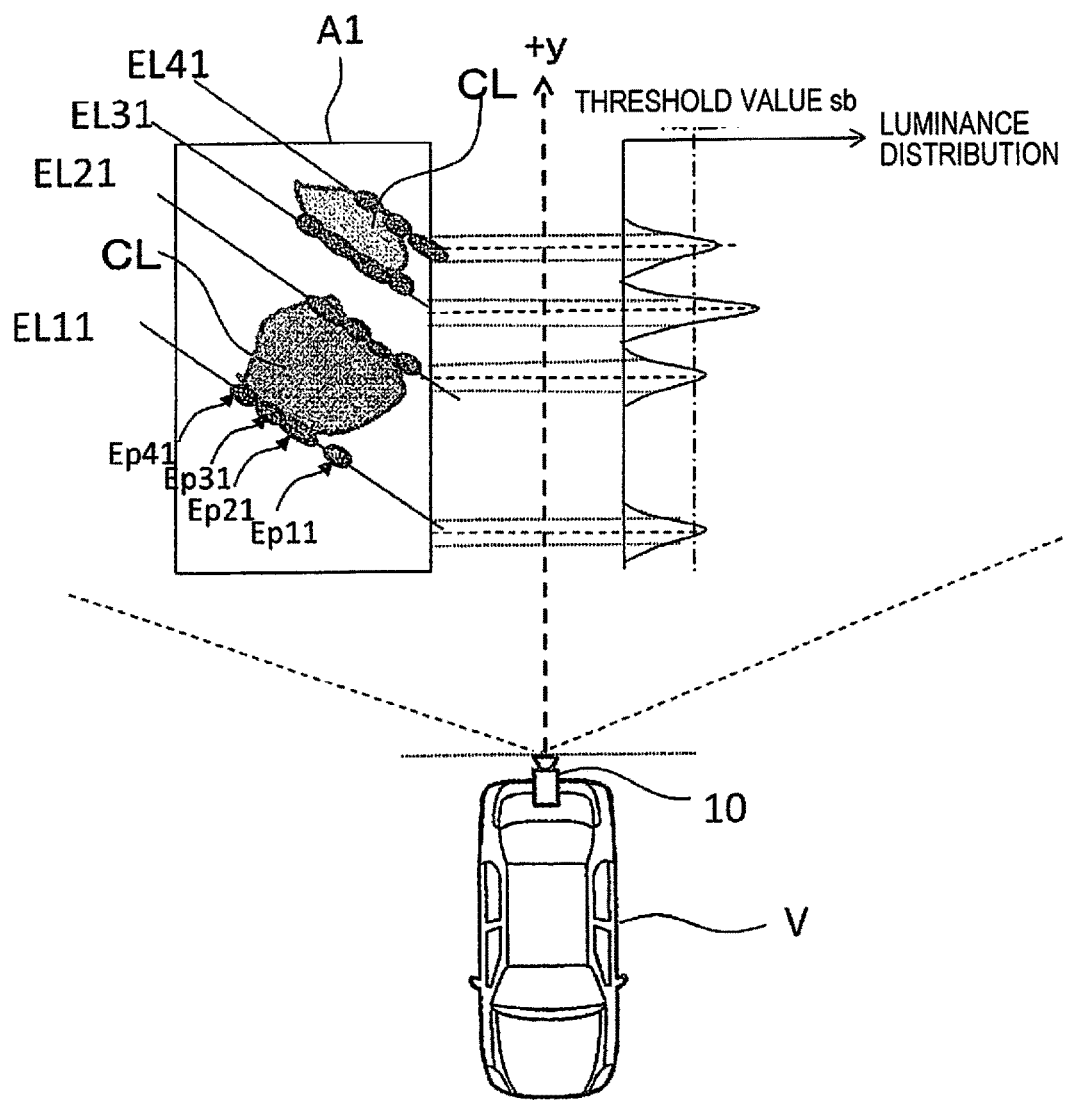
FIG. 23 is a view for explaining an example of edge information if foreign matter has adhered to the lens.

The foreign matter detection unit 38 of the present embodiment performs signal processing using at least a band pass filter on differential waveform information generated by the three-dimensional object detection unit 33 at one or a plurality of first timings. This band pass filter blocks or attenuates the passage of signals of designated frequency bands while allowing signals of a desired frequency band to pass. The band pass filter performs processing in a positional direction, for example, the direction of separation from the camera 10 rearward of the host vehicle V (+y value in FIG. 23), a time direction, or a space direction.

In the present embodiment, a low pass filter (high cut filter) that blocks or attenuates high-frequency components is used as the band pass filter. By signal processing of the differential waveform information using the low pass filter, the differential waveform information can be smoothed, averaged, or gradated. When signal processing using the low pass filter is carried out, small maxima that can be assessed to be noise can be removed, maxima indicating relatively large changes can be made manifest, and characteristics of the acquired image information can be extracted. In this way, maxima in the differential waveform information or maxima in the edge information caused by the presence of foreign matter adhering to the lens 11 can be made manifest and the characteristics of the image information corresponding to foreign matter can be extracted.

Moreover, band pass filters that block or attenuate two or more different types of frequencies can be used in the foreign matter detection unit 38. For example, if the foreign matter detection unit 38 performs signal processing using a low pass filter having a relatively low passing frequency (e.g., 0.3 Hz) and a low pass filter having a relatively high passing frequency (e.g., 1 Hz), values at the same position on horizontal axes of position, time, space, and the like can be compared and the lower value can be chosen (select-low processing). In this way, high-frequency components generated by noise or the light environment are blocked or attenuated while the maxima that are also characteristics of three-dimensional objects such as other vehicles VX are extracted, and therefore the suppression of detection even when another vehicle VX that is to be detected can be prevented while errant detection due to the light environment is suppressed.

The foreign matter detection unit 38 of the present embodiment changes the blocking or attenuation region of the band pass filter in accordance with the results of foreign matter detection. If foreign matter that has adhered to the lens 11 is continuously detected for at least a predetermined duration, the foreign matter detection unit 38 widens the range of frequencies to be blocked or attenuated by the band pass filter. If a low pass filter is used, the upper limit of the frequency band to be blocked or attenuated is changed to be higher. Of course, the lower limit of the frequency band to be blocked or attenuated may also be changed to be lower. That is to say, in the present embodiment, if foreign matter that has adhered to the lens is detected and that foreign matter is present at the same place for at least a predetermined duration, there is assessed to be a high possibility that the foreign matter has adhered to the lens 11 with a relatively strong force and will continue to be detected in the future as well, the frequency band to be blocked or attenuated is widened, and the "maxima of the reference waveform information" and the "reference value" are derived as lower values. In this way, it is possible to lower the threshold value for foreign matter detection, and therefore the assessment that foreign matter has adhered to the lens 11 can be promoted and assessment control of other vehicles VX while the foreign matter is adhering can be made easier to execute.

As a result, responsive detection processing of other vehicles VX can be executed in line with the detection state of foreign matter adhesion.

The foreign matter detection unit 38 of the present embodiment, in addition to the signal processing using the band pass filter described above, executes signal processing using a change rate limiter. By performing signal processing using a change rate limiter, furthermore, the differential waveform information can be made smoother, small maxima that can be assessed to be noise are removed, and characteristics of the image information corresponding to maxima indicating relatively large changes can be extracted. In this way, the characteristics of image information caused by the presence of foreign matter that has adhered to the lens 11 can be extracted.

The foreign matter detection unit 38 of the present embodiment changes the limit change rate of the change rate limiter in accordance with the results of foreign matter detection. If foreign matter that has adhered to the lens 11 is continuously detected for at least a predetermined duration, the foreign matter detection unit 38 makes the limit change rate of the change rate limiter higher. In the present embodiment, as with the processing by the band pass filter described above, if the possibility that foreign matter that has adhered to the lens 11 will continue to be detected in the future as well can be assessed to be high, the "maximum of the reference waveform information" and the "reference value" can be derived as lower values, making assessment control for other vehicles VX while the foreign matter is adhering easier to execute.

A "reference value" is acquired based on the "maximum of the reference waveform information" obtained by signal processing using the band pass filter. A "predetermined assessment range" is defined for the assessment of foreign matter based on the acquired "reference value." For example, the "predetermined assessment range" is defined based on the sum of the reference value and an allowance value and the difference of the reference value and the allowance value, with the "reference value" as the median value.

The foreign matter detection unit 38 of the present embodiment acquires an "evaluation value" based on the maximum of differential waveform information newly generated at one or a plurality of second timings later than the first timing(s) and counts up the number of times the difference between the "evaluation value" and "reference value" shared by the position in the bird's-eye view image is assessed to be within the "predetermined assessment range." This counting up can be carried out within a predetermined evaluation period defined in advance. If the counted number equals or exceeds a predetermined value, the image including the pixels corresponding to the evaluation value from which the results of the counting are derived is assessed by 11 the foreign matter detection unit 38 to have been caused by foreign matter that has adhered to the lens.

The processing by the foreign matter detection unit 38 described above can also be carried out based on edge information. The foreign matter detection unit 38 extracts a first maximum from edge information including information on edge lines generated by the three-dimensional object detection unit 37 one or a plurality of first timings and acquires a reference edge length based on this first maximum. The information on edge lines includes information (including pixel counts) on the lengths of edges that indicate luminance differences at or above a predetermined threshold value and have a predetermined degree of continuity. Moreover, the foreign matter detection unit 38 extracts a second maximum corresponding to this first maximum in the bird's-eye view image from newly generated edge information generated at one or a plurality of second timings later than the first timing(s) and acquires a reference edge length based on this second maximum. Then, the foreign matter detection unit 38 detects whether or not foreign matter has adhered to the lens based on change over time in the difference between the evaluation edge length and the reference edge length. The significance of the "change over time" is the same as the significance of the "change over time" in processing based on differential waveform information.

If it is assessed that the degree of the change over time in the difference between the evaluation edge length and the reference edge length is within a predetermined assessment range, the foreign matter detection unit 38 assesses the image including the pixels corresponding to the evaluation edge length to be an image caused by foreign matter that has adhered to the lens 11.

Specifically, the foreign matter detection unit 38 performs signal processing using at least a band pass filter on edge information that includes information on edge lines generated at a first timing and acquires a "reference edge length" based on the "maximum of the reference edge information" after this signal processing. Then, the foreign matter detection unit 38 acquires an "evaluation edge length" based on the maximum of edge information generated at one or a plurality of second timings later than the first timing(s) and assesses whether the image that includes the pixels corresponding to the evaluation edge length is an image caused by foreign matter that has adhered to the lens 11 based on the number of times the difference between the evaluation edge length and the reference edge length shared by the position in the bird's-eye view image has been assessed to be within the "predetermined assessment range." This assessment can be carried out during a predetermined evaluation period defined in advance. The fact that a low pass filter can be used as the band pass filter and the operation and effect thereof and the fact that the frequency band to be blocked or attenuated by the band pass filter can be changed in accordance with the foreign matter detection state and the operation and effect thereof are shared with the description above, and therefore that description is cited here. The "reference edge information" in foreign matter detection processing based on edge information corresponds to the "reference differential waveform information" mentioned above, the "reference edge length" corresponds to the "reference value" mentioned above, the "evaluation edge length" corresponds to the "evaluation value" mentioned above, and the "predetermined assessment range" for evaluation of the "evaluation edge length" corresponds to the "predetermined assessment range" for evaluating the "evaluation value," in a process using the reference waveform information mentioned above."

Incidentally, because other vehicles VX and the like that are conventional detection objects move independently of the device 1, the value (size) of the maximum of the differential waveform information or the edge information, corresponding to the characteristics of the other vehicle VX, and the position (position within the detection areas A1, A2) change moment-by-moment. However, because foreign matter that has adhered to the lens 11 moves along with the device 1, the change over time in the value (size) of the maximum of the differential waveform information or edge information, which correspond to the characteristics of the foreign matter, and position (position within the detection areas A1, A2) tend to be small. This tendency can be seen prominently with mud or water stains, which have low fluidity.

If the characteristics of an image of foreign matter CL of this kind that has adhered to the lens 11 are taken into consideration, if "evaluation value"/"evaluation edge length" for which the difference from the "reference value"/ "reference edge length" at the same position as the maximum of the differential waveform information or edge information generated at the first timing is within the assessment range is detected a predetermined number of times or more or is detected at a predetermined frequency within the predetermined evaluation period, the maximum of the differential waveform information or edge information at the second timing can be assessed not to be a maximum corresponding to a characteristic of a moving three-dimensional object. To put this another way, it can be assessed that the maximum of the differential waveform information or edge information at the second timing does not have a clear contour (edge) like that of a three-dimensional object and is a characteristic caused by foreign matter that has adhered to the lens 11, which moves along with the device 1. Accordingly, information (differential waveform information, edge information) detected as foreign matter can be assessed not to be information (differential waveform information, edge information) indicating an image of another vehicle VX traveling in a lane adjacent to the host vehicle V.

The three-dimensional object detection device 1 of the present embodiment extracts characteristics distinctive of foreign matter that has adhered to the lens 11 and assesses the presence of foreign matter that has adhered to the lens 11 based on the extracted characteristics, and therefore the state of the lens can be accurately assessed. As a result, the errant assessment of foreign matter that has adhered to the lens 11 as another vehicle VX can be suppressed, and therefore other vehicles VX can be accurately detected.

Furthermore, in the present embodiment, when foreign matter that has adhered to the lens 11 is detected using differential waveform information, the maximum of the values frequency-distributed by counting the pixels indicating a predetermined difference in the differential image was used, but in place of this, it is possible to extract, in a pixel constituting the maximum, a plurality of pixel groups for which the pixel values of adjacent pixels are less than a predetermined value and use the maximum of the number of inversion points among these pixel groups. Pixel groups for which the pixel values of adjacent pixels are less than a predetermined value are bright (or dark) portions corresponding to characteristic points (differences, edges, etc.) to be detected, and between these pixel groups are dark (or light) areas where there is an inversion from bright to dark (or dark to bright). The number of inversions of pixel groups for which the pixel values differ by a predetermined value or more corresponds to characteristic points to be detected, and therefore similar processing can be performed with similar precision as in cases of the results of a count of pixels similarly indicating a predetermined difference.

Specifically, if foreign matter is to be detected based on differential image information, the three-dimensional object detection unit 33 aligns the positions of bird's-eye view images taken at different points in time in a bird's-eye view and extracts a plurality of pixel groups for which the difference between the pixel values of adjacent pixels is less than a predetermined value from among pixels indicating a predetermined difference in the differential image along the direction of collapsing of the three-dimensional object when the bird's-eye view image is subjected to viewpoint conversion. When a plurality of pixels having shared pixel values are grouped, pixels are present between the grouped pixel groups that are less than a predetermined value. That is to say, pixels having low pixel values are present between one pixel group and another pixel group that have been grouped together and there is a bright/dark inversion there. The space between the pixel groups is considered an inversion point and "inversion waveform information" is generated by counting the number of these inversion points and forming a frequency distribution. This "inversion waveform information" corresponds to the "differential waveform information" described above in the foreign matter detection processing of the present embodiment.

The foreign matter detection unit 38 of the present embodiment aligns the positions of bird's-eye view images from different points in time in a bird's-eye view, extracts a plurality of pixel groups for which the difference between the pixel values of adjacent pixels is less than a predetermined value from among pixels indicating a predetermined difference in the differential image along the direction of collapsing of the three-dimensional object when the bird's-eye view image is subjected to viewpoint conversion, and acquires from the three-dimensional object detection unit 33 the inversion waveform information generated by counting inversion points between pixel groups and forming a frequency distribution. This inversion waveform information may also be generated by the foreign matter detection unit 38 based on information acquired from the three-dimensional object detection unit 33.

The foreign matter detection unit 38 extracts a first maximum from inversion waveform information generated at one or a plurality of first timings, acquires a reference inversion count based on this first maximum, and extracts a second maximum corresponding to the first maximum in the bird's-eye view image from inversion waveform information newly generated at one or a plurality of second timings later than the first timing(s). Then, the foreign matter detection unit 38 acquires an evaluation inversion count based on this second maximum and detects whether or not foreign matter has adhered to the lens 11 based on the change over time in the difference between this evaluation inversion count and the reference inversion count.

The foreign matter detection unit 38 extracts a first maximum included in the inversion waveform information generated at the first timing, acquires an x value (position or time) and a y value (number of inversions) identifying this first maximum, and obtains a reference value based on the first maximum (y value). The reference inversion count may be a value equal to or less than the first maximum (y value), a predetermined proportion of the first maximum (y value), or a value found by subtracting a predetermined value from the first maximum (y value). Moreover, a maximum that is a maximum included in the inversion waveform information generated at the second timing and that corresponds to the x value (position or time) of the first maximum or is different from the x value by a predetermined amount or less is extracted as the second maximum. The evaluation inversion number is obtained based on this second maximum (y value). The evaluation inversion number may be a value equal to or less than the second maximum (y value), a predetermined proportion of the second maximum (y value), or a value found by subtracting a predetermined value from the second maximum (y value). In this procedure, procedures common to the procedure for deriving the reference inversion count from the first maximum may be used.

The foreign matter detection unit 38 acquires differences between these evaluation inversion counts and reference inversion counts over time and calculates the change over time in the differences acquired at each timing. The foreign matter detection unit 38 of the present embodiment detects whether or not foreign matter has adhered to the lens based on the amount of change over time in the evaluation inversion counts, to which position and time correspond, and the reference inversion counts. The foreign matter detection unit 38 determines the degree of deviation (variation) between the evaluation inversion counts and the reference inversion counts as the change over time associated with the passage of time. If the amount of change in the evaluation inversion counts and the reference inversion counts is small even when time passes, it can be assessed that the object detected at the first timing and the object detected at the second timing are the same object, i.e., that it is an object (foreign matter) that has adhered to the lens 11.

In order to evaluate changes in the evaluation inversion count and the reference inversion count associated with the passage of time, if the foreign matter detection unit 38 assesses that the degree of change over time in the difference between the evaluation inversion count and the reference inversion count is within a predetermined scope of assessment, the foreign matter detection unit 38 assesses that the image including the pixels corresponding to the evaluation inversion count is an image caused by foreign matter that has adhered to the lens 11 and detects that foreign matter has adhered to the lens 11. Specifically, if a state in which the difference between the evaluation inversion count and the reference inversion count remains within a predetermined value continues for a predetermined duration, the adhesion of foreign matter to the lens 11 is detected, and if the difference between the evaluation inversion count and the reference inversion count exceeds a predetermined value or a state in which the difference between the two is within the predetermined value does not continue for a predetermined duration, no adhesion of foreign matter to the lens 11 is detected.

Specifically, the foreign matter detection unit 38 performs signal processing using at least a band pass filter on "inversion waveform information" from a first timing, acquired from the three-dimensional object detection unit 33, and acquires a "reference inversion count" based on the maximum of the "reference inversion waveform information" after this signal processing. Then, the foreign matter detection unit 38 acquires an "evaluation inversion count" based on the "maximum of the inversion waveform information" generated at one or a plurality of second timings later than the first timings(s). Then the foreign matter detection unit 38 assesses whether the image that includes the pixels corresponding to the "evaluation inversion count" is an image caused by foreign matter that has adhered to the lens 11 based on the number of times the difference between the "evaluation inversion count" and the "reference inversion count" shared by the position in the bird's-eye view image has been assessed to be within the "predetermined assessment range." The processing to detect foreign matter that has adhered to the lens 11 using the inversion waveform information exhibits similar operation and effect to the processing for detecting foreign matter that has adhered to the lens 11 using differential waveform information, described above, and similar modified forms can be applied. The "inversion waveform information" in this processing example corresponds to the "differential waveform information" mentioned above, the "reference inversion count" corresponds to the "reference value" mentioned above, the "evaluation inversion count" corresponds to the "evaluation value" mentioned above, and the "predetermined assessment range" corresponds to the "predetermined assessment range" in the processing using the reference waveform information mentioned above.

The same processing as that described above can be performed using edge information. In this case, the three-dimensional object detection unit 37 extracts a plurality of pixel groups in which the luminance difference of adjacent pixels is less than a predetermined value from among edge components having continuity that are pixels of image areas, adjacent along the direction of collapsing of a three-dimensional object when viewpoint conversion to a bird's-eye view image is performed, having a luminance difference greater than or equal to a threshold value t. When pluralities of pixels having common pixel values are grouped, there are pixels between the grouped pixel groups the luminance difference of which is less than a predetermined value. In other words, there are pixels having low luminance between one pixel group and another pixel group, and here there are bright/dark inversions. Intervals between pixel groups are taken to be inversion points, and by counting the number thereof and forming a frequency distribution, "inversion edge information" is generated. This "inversion edge information" corresponds to the above-described "inversion waveform information" in the foreign matter detection processing of the present embodiment.

Then, the foreign matter detection unit 38 performs signal processing using at least a band pass filter on "inversion edge information" at a first timing, generated by the three-dimensional object detection unit 37 and acquires a "reference inversion count" based on the maximum of "reference inversion edge information" after this signal processing. Then, an "evaluation inversion count" is acquired based on the "maximum of the inversion edge information" newly generated at one or a plurality of second timings later than the first timing(s) and assesses whether the image that includes pixels corresponding to the "evaluation inversion count" generated at the second timing is assessed to be an image caused by matter that has adhered to the lens 11 based on the number of times the difference between the "evaluation inversion count" and the "reference inversion count" that share a position in the bird's-eye view image has been assessed to be within the "predetermined assessment range."

The processing to detect foreign matter that has adhered to the lens 11 using the inversion edge information exhibits similar operation and effect to the processing for detecting foreign matter that has adhered to the lens 11 using inversion waveform information, described above, and similar modified forms can be applied. The "inversion edge information" obtained from the "edge information" in this processing example corresponds to the "inversion waveform information" obtained from the "differential waveform information" mentioned above, the "reference inversion count" in the "reference inversion edge information" corresponds to the "reference inversion count" in the "reference inversion waveform information" mentioned above, the "evaluation inversion count" in the "inversion edge information" corresponds to the "evaluation inversion count" in the "inversion waveform information" mentioned above, and the "predetermined assessment range" corresponds to the "predetermined assessment range" for evaluating the "evaluation inversion count" in the "inversion waveform information."

Moreover, the foreign matter detection unit 38 assesses whether the image that includes pixels corresponding to the evaluation value of the differential waveform information generated at the second timing is an image caused by foreign matter that has adhered to the lens 11 based on the number of times the "evaluation value" has been assessed to be a value equal to or greater than a predetermined proportion of the threshold value α set for the assessment of other vehicles VX. Even in cases where the "evaluation value" can be assessed as being within the assessment range, the possibility that an object corresponding to extremely low pixel values is foreign matter is low. Moreover, if an "evaluation value" equal to or greater than a predetermined proportion of the first threshold value α set for the assessment of other vehicles VX is detected, the possibility arises that the foreign matter will be errantly detected as another vehicle VX. Accordingly, in the present embodiment, if the "evaluation value" is equal to or greater than a predetermined proportion of the first threshold value α, foreign matter detection processing is promoted so that assessment results indicating that the object is foreign matter will be issued. In this way, the probability that foreign matter will be errantly assessed to be another vehicle VX can be reduced.

Similarly, the foreign matter detection unit 38 assesses whether the image that includes pixels corresponding to the evaluation edge length of the edge information generated at the second timing is an image caused by foreign matter that has adhered to the lens 11 based on the number of times the "evaluation edge length" has been assessed to be a value equal to or less than a predetermined proportion of the threshold value θ set for the assessment of other vehicles VX. Even in cases where the "evaluation edge length" can be assessed as being within the assessment range, the possibility that an object corresponding to extremely low evaluation edge length is foreign matter is low. Moreover, if an "evaluation edge length" equal to or greater than a predetermined proportion of the first threshold value θ set for the assessment of other vehicles VX, the possibility arises that the foreign matter will be errantly detected as another vehicle VX. Accordingly, in the present embodiment, if the "evaluation edge length" is equal to or greater than a predetermined proportion of the first threshold value θ, foreign matter detection processing is promoted so that assessment results indicating that the object is foreign matter will be issued. In this way, the probability that foreign matter will be errantly assessed to be another vehicle VX can be reduced.

Figure 29:
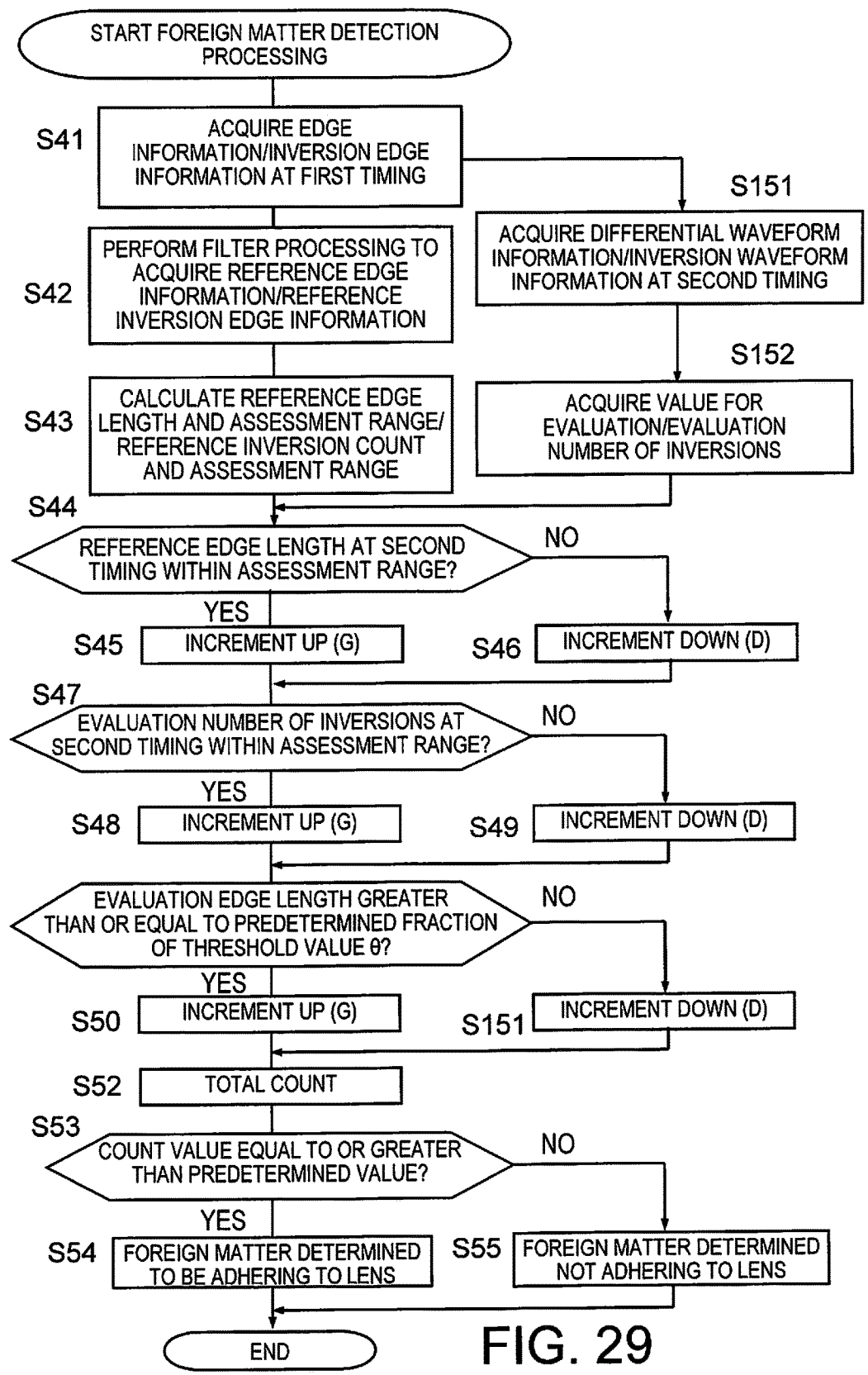
FIG. 29 is a flowchart illustrating the control sequence for assessing whether or not foreign matter has adhered to the lens using edge information.
Figure 30A:
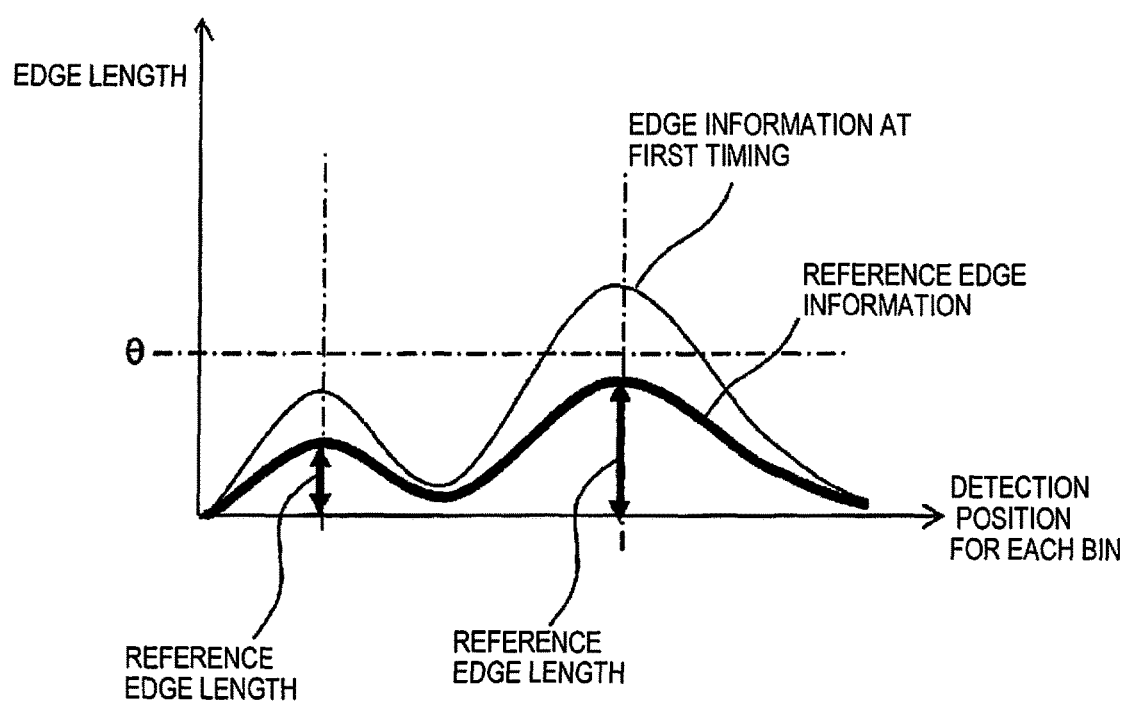
FIG. 30A is a first view for describing the procedure for assessing whether or not foreign matter has adhered to the lens based on edge length.

FIG. 29 is a flowchart showing the control procedure for foreign matter detection processing using edge information. First, in step S41, the foreign matter detection unit 38 acquires "edge information" and/or "inversion edge information" at a first timing, generated by the three-dimensional object detection unit 37. In step S42, the foreign matter detection unit 38 applies signal processing to the "edge information"/"inversion edge information" using a low pass filter to obtain "reference edge information"/"reference inversion edge information." FIG. 30A illustrates a model of "edge information" at the first timing and "reference edge information" to which low pass filter processing has been applied. The "edge information" is edge lengths as quantities of edge components along the direction of collapsing of the three-dimensional object for each detection position (positions in detection areas A1, A2 along the direction of separation from the camera 10) of the direction of collapsing (bin) of each three-dimensional object. The detection position of the maximum of the "edge information" and the detection position of the maximum of the "reference edge information" shown in the same graph are shared. Then, in step S43, the foreign matter detection unit 38 acquires the maximum of the "reference edge information" as "reference edge length." The "reference edge length" may be the result of the multiplication of the maximum by a coefficient or the result of the subtraction of a predetermined value from the maximum.

Figure 30B:
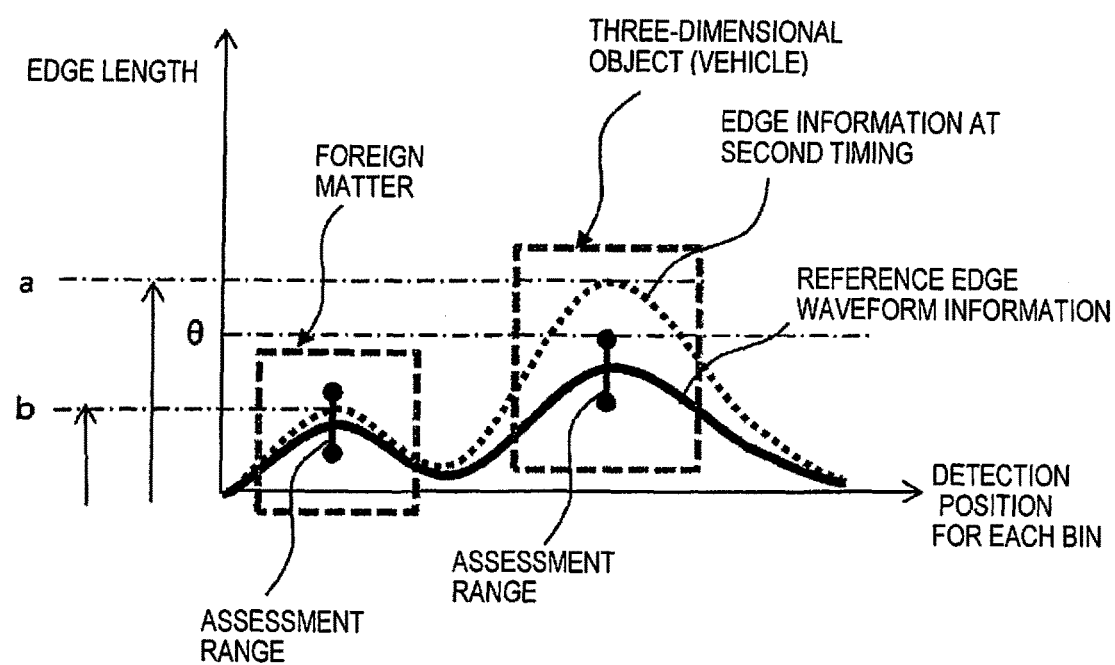
FIG. 30B is a second view for describing the procedure for assessing whether or not foreign matter has adhered to the lens based on edge lengths.
Figure 31A:
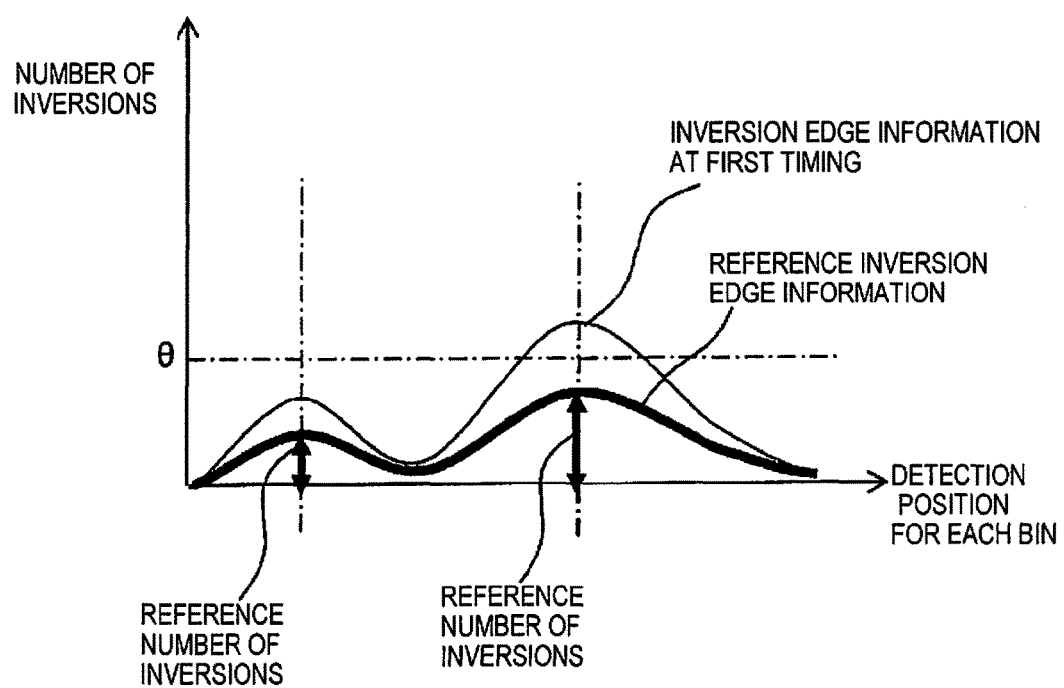
FIG. 31A is a first view for describing the procedure for assessing whether or not foreign matter has adhered to the lens based on the number of edge inversions.
Figure 31B:
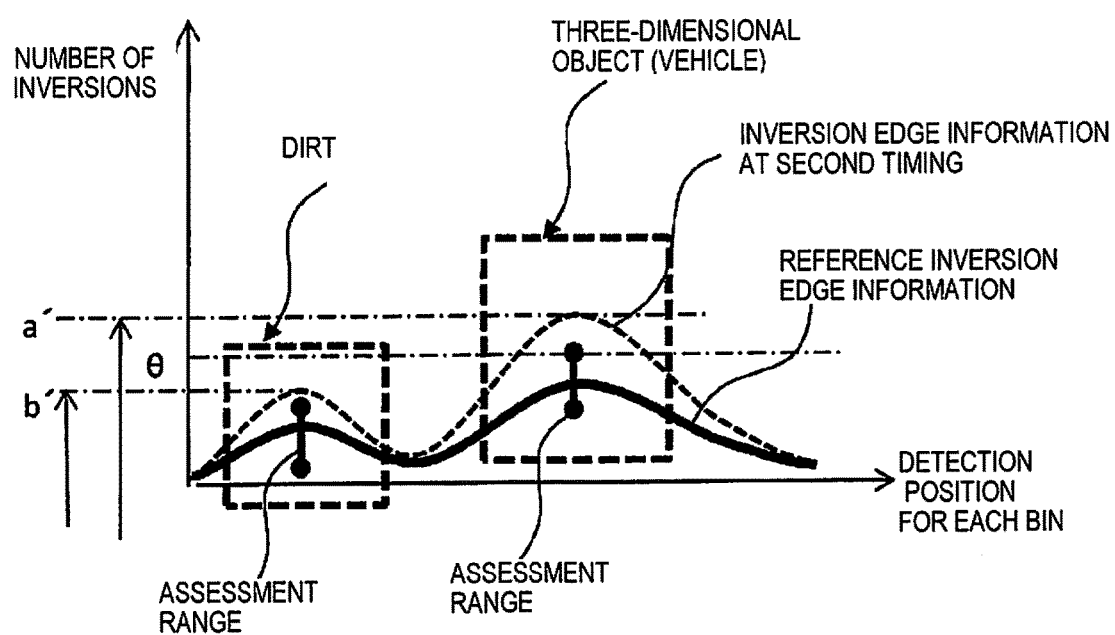
FIG. 31B is a second view for describing the procedure for assessing whether or not foreign matter has adhered to the lens based on the number of edge inversions.

In the same step, the foreign matter detection unit 38 defines the "assessment range" with the "reference edge length" as the median value. An example of the "assessment range" is shown in FIG. 30B. Similarly, the foreign matter detection unit 38 acquires the maximum of the "reference inversion edge information" as the "reference inversion count" and defines the "assessment range" with this "reference inversion count" as the median value. FIG. 31A shows a model of the "inversion edge information" at the first timing, the "reference inversion edge information" subjected to low pass filter processing, and the "reference inversion count" corresponding to the maximum of the reference inversion edge information. Moreover, FIG. 31B shows the "inversion edge information" and the "assessment range" at the second timing.

In parallel, in step S151, the foreign matter detection unit 38 acquires edge information/inversion edge information at a second timing later than the first timing. The second timing may be one or a plurality of timings after the first timing(s). The second timing may be set within the "evaluation period" set as a period necessary to carry out foreign matter detection. The edge information/inversion edge information at the second timing is shown in FIG. 30B by a dashed line. In step S152, the foreign matter detection unit 38 acquires the maximum edge lengths a, b included in the edge information as "evaluation edge lengths."

Moving on to step S44, the foreign matter detection unit 38 assesses whether or not the "evaluation edge lengths" a, b at the second timing are within the assessment range. In the example shown in FIG. 30B, the "evaluation edge length" a, corresponding to the peak on the right, is outside the predetermined range, and therefore the possibility of being foreign matter is low and the possibility of being a three-dimensional object or other vehicle VX is high. On the other hand, the "evaluation edge length" b, corresponding to the left-side peak, is within the predetermined range, and therefore the possibility of being foreign matter can be assessed to be high. If the "evaluation edge lengths" a, b are within the assessment range, the possibility that the object is foreign matter is considered to be high, the process continues to step S45, and a first score G is counted up (incremented). Conversely, if the "evaluation edge lengths" a, b are outside the assessment range, the possibility that the object is foreign matter is low, the process continues to step S46, and a second score D is counted down (decremented).

In the present embodiment, the absolute value of the first score is set to be higher than the absolute value of the second score. In this way, if the "evaluation edge length" is within a predetermined range, a large value is added, and if the "evaluation edge length" is outside the predetermined range, a small value is subtracted, thereby applying a large weighting when it has been assessed that the "evaluation edge length" is within the predetermined range. The results of detection of other vehicles VX in the present embodiment are easily affected by the sun, streetlights, the headlights of following vehicles, and other lights. Even if bright lights that affect the detection results are incident on the lens 11 and the "evaluation edge length" is assessed to be outside the "predetermined range," the possibility that foreign matter has adhered to the lens 11 cannot be ruled out. Accordingly, even if the "evaluation edge length" is assessed to be outside the "predetermined range," the subtracted value is relatively small in order to suppress the effect on the results of detection of other vehicles VX. As a result, it is possible to accurately assess the presence of foreign matter that has adhered to the lens 11.

The relationship between the absolute value G of the first score and the absolute value D of the second score is not particularly limited and can be set as suitable by experimentation or the like. As an example, the values can be set to the order of G (8-12): D (1-3), e.g., G=10 while D=1. This relationship between the absolute value G of the first score and the absolute value D of the second score can be set as suitable in accordance with environmental factors such as time, travel location, climate, and the like.

Next, in step S47, an assessment is made as to whether or not the inversion evaluation count based on the inversion edge information at the second timing, acquired in step S51, is within the assessment range. The assessment procedure is shared with step S44, and therefore the description of that step can be applied as suitable. If the "evaluation inversion counts" a', b' are within the assessment range, the possibility of foreign matter is considered to be high, processing proceeds to step S48, and the first score G is counted up (addition). On the other hand, if the counts are outside the assessment range, the possibility of foreign matter is considered to be low and the second scored D is counted down (decremented).

Next, in step S48, the foreign matter detection unit 38 assesses whether or not the "evaluation edge length" obtained in step S52 is a value equal to or greater than a predetermined proportion of the threshold value θ set for assessment of another vehicle VX, and if the "evaluation edge length" is equal to or greater than a predetermined proportion of the threshold value θ, processing proceeds to step S50 and the first score G is counted up (incremented). On the other hand, if the length is outside the assessment range, processing proceeds to step S51 and the second score D is counted down (decremented).

The first score G in step S45, step S48, and step S50 and the second score D in step S46, step S49, and step S51 may be the same values or different values. In the present embodiment, the first score G in step S48, which fulfills the conditions of step S44 relating to edge length and the conditions of step S47 relating to rotational rate, is set higher than the first score G in step S45.

The foreign matter detection unit 38 in step S52 tallies a count value. In step S53, if the tallied count value is equal to or greater than a predetermined value set in advance, processing proceeds to step S54 and it is assessed that foreign matter has adhered to the lens 11, while if the tallied count value is less than the predetermined value set in advance, processing proceeds to step S55 and it is assessed that no foreign matter has adhered to the lens. The assessment results are sent to the three-dimensional object assessment unit 34 and the controller 39.

Figure 32:
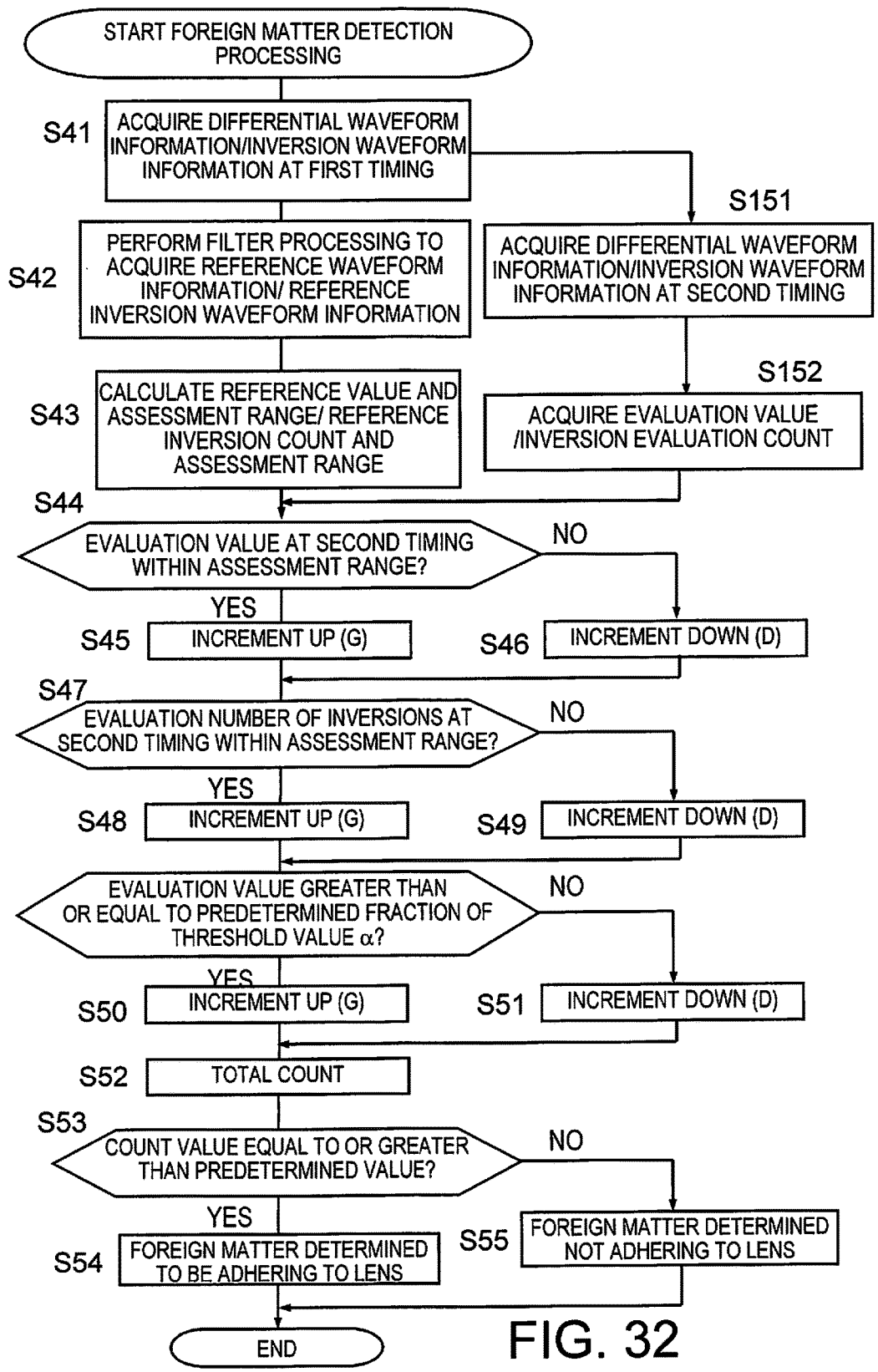
FIG. 32 is a flowchart illustrating the control sequence for assessing whether or not foreign matter has adhered to the lens using differential waveform information.

FIG. 32 is a flowchart showing the control procedure for assessing whether or not foreign matter has adhered to the lens 11 using differential waveform information. The processing in FIG. 32 is shared with the processing in FIG. 29, and therefore the description of the control sequence in FIG. 29 can be applied as suitable and the duplicate description will be omitted here.

Controller 39

Figure 33:
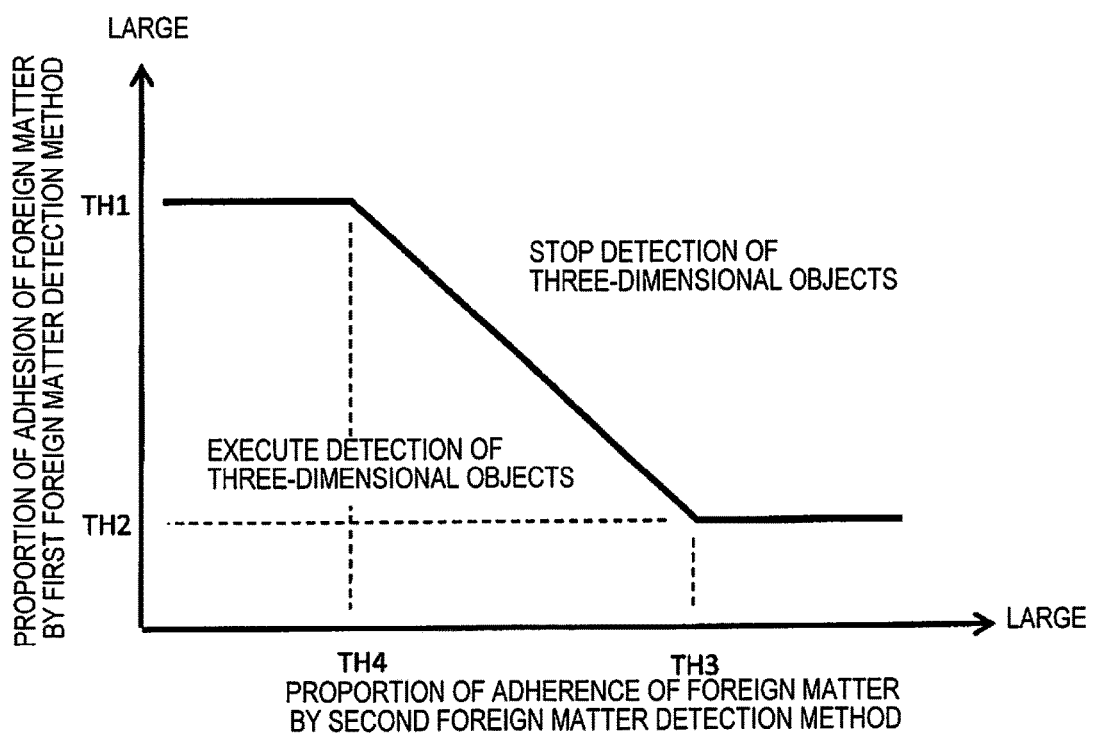
FIG. 33 is a graph illustrating an example of the control map executed by the controller based on the relationship between the foreign matter adherence proportion detected by the first foreign matter detection method and the foreign matter adherence proportion detected by the second foreign matter detection method.

Next, the controller 39 will be described. The detection of three-dimensional object may be controlled based on either the First Foreign Matter Detection Method or the Second Foreign Matter Detection Method described above, but in the present embodiment, the detection of three-dimensional objects is controlled by a combination of these two methods. This will be explained below. FIG. 33 is a graph illustrating an example of the control map executed by the controller 39 from the relationship between the proportion of adherence of foreign matter detected based on the first foreign matter detection method described above and the proportion of adherence of foreign matter detected based on the second foreign matter detection method. The solid line in FIG. 33 is a boundary line indicating the threshold value for stopping execution of three-dimensional object detection, meaning that three-dimensional object detection is stopped above this solid line and three-dimensional object detection is executed below the line.

The proportion of adherence of foreign matter according to the first foreign matter detection method is the area proportion of the predetermined pixels 12a for which the change over time in the luminance values of the image capturing elements is equal to or less than the predetermined threshold value γ to the entirety of the pixels corresponding to the predetermined areas A1, A2. For example, if the number of image capturing elements in the predetermined area A1 is X, and the change over time in the luminance values of 0.8× of these pixels is equal to or less than the threshold value γ, the proportion of adherence of foreign matter is evaluated as 80%. Moreover, the proportion of adherence of foreign matter according to the second foreign matter detection method is the proportion of the bin for which the difference between the evaluation value and the reference value is within the predetermined assessment range to the bins of the entirety of the predetermined areas A1, A2. For example, if the total bin count in the predetermined area A1 is Y and the difference between the evaluation value and the reference value for 0.6Y of these bins is within the assessment range, the proportion of adherence of foreign matter is evaluated as 60%. The same applies to detection based on edge information.

In the controller 39 of the present example, as shown in the control map in FIG. 33, if the proportion of detection of foreign matter by the second foreign matter detection method is smaller than TH4 and the proportion of detection of foreign matter by the first foreign matter detection method is greater than TH1, processing to detect three-dimensional objects or to assess three-dimensional objects as other vehicles VX is stopped. Similarly, if the proportion of detection of foreign matter by the second foreign matter detection method is greater than TH3 and the proportion of detection of foreign matter by the first foreign matter detection method is greater than TH2, processing to detect three-dimensional objects or to assess three-dimensional objects as other vehicles VX is stopped. Moreover, if the proportion of detection of foreign matter by the second foreign matter detection method is between TH3 and TH4 and the proportion of detection of foreign matter by the first foreign matter detection method is between TH2 and TH1, as indicated by the threshold line in the same figure, as the proportion of detection of foreign matter by the second foreign matter detection method becomes greater, processing to detect three-dimensional objects or to assess three-dimensional objects as other vehicles VX is stopped in correlation.

The controller 39 may detect three-dimensional objects uniformly across the area shown in FIG. 33 where three-dimensional object detection is executed, but control may also be applied so as to suppress the assessment of three-dimensional objects as other vehicles VX more the closer the threshold line is approached. This control will be described below.

Specifically, if the foreign matter detection unit 38 detects foreign matter that has adhered to the lens 11, the controller 39 generates a control command for upwardly adjusting the first threshold value α so as to make the detection of three-dimensional objects more difficult and outputs the control command to the three-dimensional object detection unit 33. If the foreign matter detection unit 38 detects foreign matter that has adhered to the lens 11, the controller 39 generates a control command lowering the value determined by counting the number of pixels indicating a predetermined difference in the differential image of the bird's-eye view image and forming a frequency distribution and outputs the control command to the three-dimensional object detection unit 33. In this way, by raising the first threshold value α or outputting the frequency-distributed value at a lower level, the detection of three-dimensional objects is suppressed and as a result the errant detection of foreign matter as another vehicle VX can be prevented.

If the three-dimensional object detection unit 33, which detects three-dimensional objects using differential waveform information, detects a three-dimensional object when the differential waveform information is equal to or greater than the predetermined first threshold value α, the controller 39, if the foreign matter detection unit 38 has detected foreign matter that has adhered to the lens 11, generates a control command changing the first threshold value α to be higher so as to make the detection of three-dimensional objects more difficult and outputs this control command to the three-dimensional object detection unit 33.

Similarly, if the three-dimensional object detection unit 33 detects a three-dimensional object when the differential waveform information is equal to or greater than the predetermined first threshold value α, the controller, if the foreign matter detection unit 38 has detected foreign matter that has adhered to the lens 11, generates a control command causing the value determined by counting the number of pixels indicating a predetermined difference in the differential image in the bird's-eye view image and forming a frequency distribution to be changed to be outputted as a lower value and outputs this control command to the three-dimensional object detection unit 33.

Moreover, if the three-dimensional object detection unit 33, which detects three-dimensional objects using differential waveform information, extracts the number of pixels showing pixel values equal to or greater than the threshold value p as the number of pixels indicating the predetermined difference, the controller 39, if the foreign matter detection unit 38 has detected foreign matter that has adhered to the lens 11, generates a control command for upwardly adjusting the first threshold value p so as to make the detection of three-dimensional objects more difficult and outputs this control command to the three-dimensional object detection unit 33.

Similarly, if the three-dimensional object detection unit 33 extracts the number of pixels indicating pixel values equal to or greater than the threshold value p as the number of pixels indicating the predetermined difference, the controller 39, if the foreign matter detection unit 38 has detected foreign matter that has adhered to the lens 11, generates a control command to change the number of pixels extracted in the differential image along the direction of collapsing of the three-dimensional object when viewpoint conversion of the bird's-eye view is performed to be outputted at a lower value and outputs this control command to the three-dimensional object detection unit 33.

If the three-dimensional object detection unit 37, which detects three-dimensional objects using edge information, extracts an edge line based on pixels that indicate a luminance difference at or above the predetermined threshold value t, the controller 39, if the foreign matter detection unit 38 has detected foreign matter that has adhered to the lens 11, generates a control command changing the predetermined threshold value t to be higher so as to make the detection of three-dimensional objects more difficult and outputs this control command to the three-dimensional object detection unit 37.

If the three-dimensional object detection unit 37, which detects three-dimensional objects using edge information, extracts edge information based on pixels indicating a luminance difference at or above the predetermined threshold value t, the controller 39, if the foreign matter detection unit 38 has detected foreign matter that has adhered to the lens 11, generates a control command to change the pixel luminance values to be outputted at a lower value and outputs this control command to the three-dimensional object detection unit 37.

If the three-dimensional object detection unit 37, which detects three-dimensional objects using edge information, detects a three-dimensional object based on an edge line having a length equal to or greater than the threshold value θ included in the edge information, the controller 39, if the foreign matter detection unit 38 has detected foreign matter that has adhered to the lens 11, generates a control command changing the threshold value θ to be higher so as to make the detection of three-dimensional objects more difficult and outputs this control command to the three-dimensional object detection unit 37.

Similarly, if the three-dimensional object detection unit 37, which detects three-dimensional objects using edge information, detects a three-dimensional object based on an edge line having a length equal to or greater than the threshold value θ included in the edge information, the controller 39, if the foreign matter detection unit 38 has detected foreign matter that has adhered to the lens 11, generates a control command to change the value of the length of the edge line in the detected edge information to be lower and outputs this control command to the three-dimensional object detection unit 37.

If the three-dimensional object detection unit 37, which detects three-dimensional objects using edge information, detects a three-dimensional object based on an assessment of whether or not the number of edge lines having lengths equal to or less than a predetermined length included in the edge information, e.g., edge lines having length equal to or greater than the threshold value θ, is equal to or greater than the second threshold value β, the controller 39, if the foreign matter detection unit 38 has detected foreign matter that has adhered to the lens 11, generates a control command to change the second threshold value β to be higher so as to make the detection of three-dimensional objects more difficult and outputs this control command to the three-dimensional object detection unit 37.

If the three-dimensional object detection unit 37, which detects three-dimensional objects using edge information, detects a three-dimensional object based on an assessment of whether or not the number of edge lines having lengths equal to or less than a predetermined length included in the edge information, e.g., edge lines having length equal to or greater than the threshold value θ, is equal to or greater than the second threshold value β, the controller 39, if the foreign matter detection unit 38 has detected foreign matter that has adhered to the lens 11, generates a control command to output a lower value for the number of detected edge lines of a predetermined length or greater and outputs this control command to the three-dimensional object detection unit 37.

If the three-dimensional object assessment unit 34, when the traveling speed of a detected three-dimensional object is equal to or greater than a predetermined speed set in advance, assesses that this three-dimensional object is another vehicle, the controller 39, if the foreign matter detection unit 38 has detected foreign matter that has adhered to the lens 11, generates a control command to change the predetermined speed that is the lower limit for assessment of three-dimensional objects as other vehicles to be higher so as to make the detection of three-dimensional objects more difficult and outputs this control command to the three-dimensional object assessment unit 34.

Similarly, if the three-dimensional object assessment unit 34, when the traveling speed of a detected three-dimensional object is equal to or greater than a predetermined speed set in advance, assesses that this three-dimensional object is another vehicle, the controller 39, if the foreign matter detection unit 38 has detected foreign matter that has adhered to the lens 11, generates a control command to change the traveling speed of the three-dimensional object compared with the predetermined speed that is the lower limit for assessment of three-dimensional objects as other vehicles to be output at a lower value and outputs this control command to the three-dimensional object assessment unit 34.

Moreover, if the three-dimensional object assessment unit 34, when the traveling speed of a detected three-dimensional object is less than a predetermined speed set in advance, assesses that this three-dimensional object is another vehicle, the controller 39, if the foreign matter detection unit 38 has detected foreign matter that has adhered to the lens 11, generates a control command to change the predetermined speed that is the upper limit for assessment of three-dimensional objects as other vehicles to be lower and outputs this control command to the three-dimensional object assessment unit 34.

Moreover, if the three-dimensional object assessment unit 34, when the traveling speed of a detected three-dimensional object is less than a predetermined speed set in advance, assesses that this three-dimensional object is another vehicle, the controller 39, if the foreign matter detection unit 38 has detected foreign matter that has adhered to the lens 11, generates a control command to change the traveling speed of the three-dimensional object compared with the predetermined speed that is the upper limit for assessment of three-dimensional objects as other vehicles to be higher and outputs this control command to the three-dimensional object assessment unit 34.

Here, "traveling speed" includes the absolute speed of the three-dimensional object and the relative speed of the three-dimensional object with respect to the host vehicle. The absolute speed of the three-dimensional object may be calculated from the relative speed of the three-dimensional object or the relative speed of the three-dimensional object may be calculated from the absolute speed of the three-dimensional object.

Furthermore, the controller 39, in order to suppress (including stopping or interrupting) detection results indicating that a three-dimensional object is present from the three-dimensional object detection unit 33 and/or the three-dimensional object detection unit 37 or assessment results finally indicating that the three-dimensional object is another vehicle VX from the three-dimensional object assessment unit 34, partially masks the detection areas A1, A2 or adjusts the threshold values or output values used for detection or assessment.

Specifically, the controller 39 designates position information (image coordinate information) for part of the detection areas A1, A2 corresponding to the position of the foreign matter CL that has adhered to the lens 11, generates a control command to not perform detection processing of three-dimensional objects in the masked area or assess whether or not three-dimensional objects are other vehicles VX and a control command to output results to the effect that three-dimensional objects are undetected in the masked area or three-dimensional objects in the masked area are not other vehicles VX, and sends the control commands to the three-dimensional object detection unit 33 and/or the three-dimensional object detection unit 37 or the three-dimensional object assessment unit 34. The control command to output results to the effect that three-dimensional objects are undetected in the masked area or three-dimensional objects in the masked area are not other vehicles VX includes a command designating image data of the mask area and a command to change threshold values or output values as described above.

In this way, the controller 39 generates control commands to change threshold values or output values, control commands to stop three-dimensional object detection processing or assessment of whether or not three-dimensional objects are other vehicles VX, and control commands to output results to the effect that three-dimensional objects are undetected in the masked area or three-dimensional objects in the masked area are not other vehicles VX and outputs the control commands to the three-dimensional object detection unit 33 and/or the three-dimensional object detection unit 37 or the three-dimensional object assessment unit 34.

The three-dimensional object detection unit 33 and/or the three-dimensional object detection unit 37 of the present embodiment, in accordance with the control commands of the controller 39, exclude part of the image information, differential waveform information, and edge information from the information to be processed, adjust the threshold values or output values, perform detection of three-dimensional objects under strict criteria, execute processing to output detection results to the effect that three-dimensional objects are undetected, or stops the three-dimensional object detection processing itself. Similarly, the three-dimensional object assessment unit 34, in accordance with the control commands of the controller 39, adjusts the threshold values or output values, performs assessment of whether or not three-dimensional objects detected under strict criteria are other vehicles VX, outputs assessments to the effect that three-dimensional objects are not other vehicles VX, or stops the three-dimensional object assessment processing itself. The control processing pertaining to the three-dimensional object assessment described above is carried out if a state in which foreign matter has adhered to the lens 11, which receives images of the detection areas A1, A2, is detected by the foreign matter detection unit 38.

Figure 28:
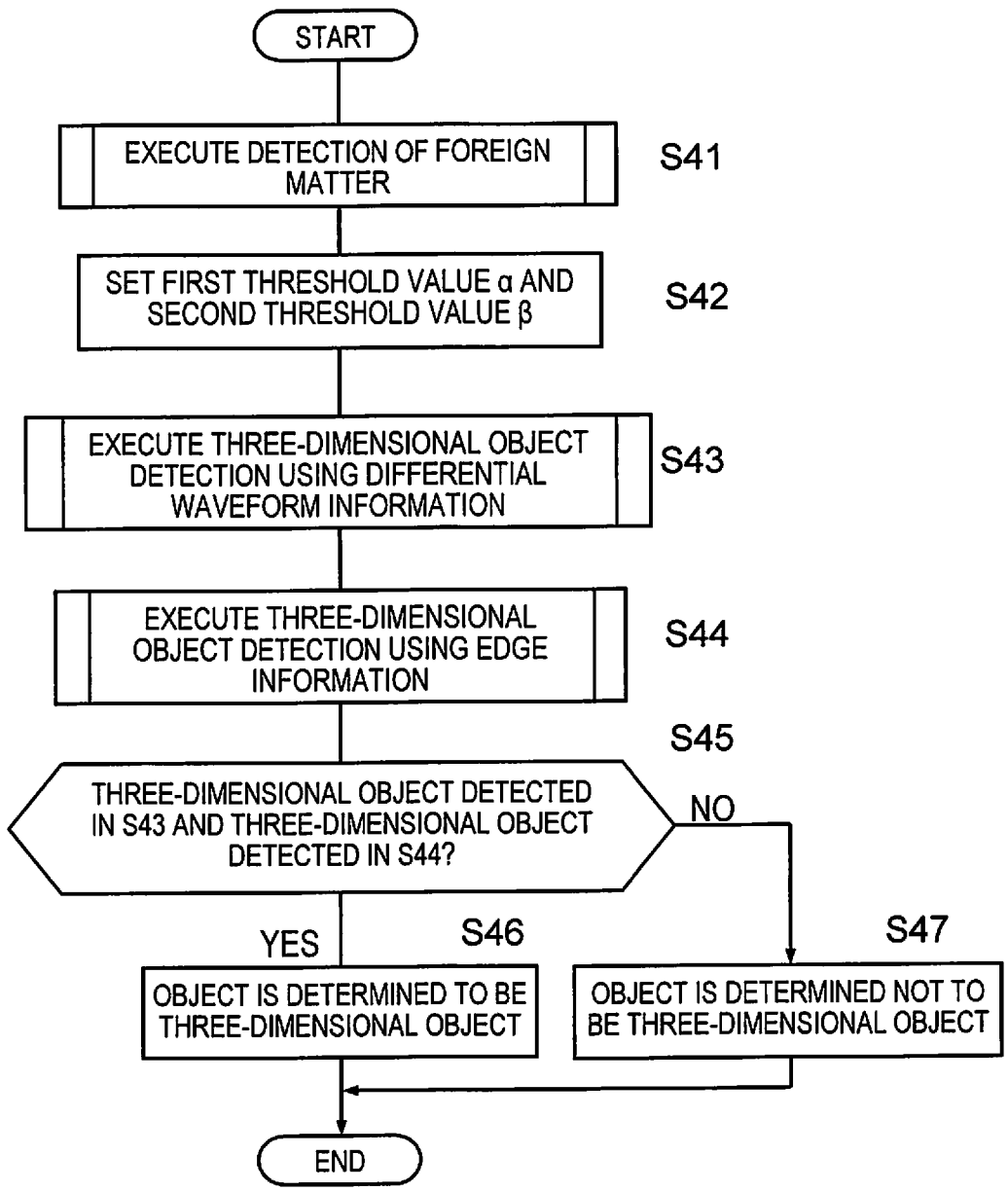
FIG. 28 is a flowchart illustrating the operation of the three-dimensional object assessment unit and controller in FIG. 3.

Next, with reference to FIG. 28, the operation of the three-dimensional object assessment unit 34 and the controller 39 will be described. First, in step S41, the state of adherence of foreign matter to the lens 11 is detected by the foreign matter detection unit 38 using both the first foreign matter detection method and the second foreign matter detection method described above and the results are outputted to the controller 39. In step S42, the controller 39, using the detected state of adherence of foreign matter and the control map in FIG. 33, which is stored in advance, computes the degree of suppression of detection of three-dimensional objects, specifically, the first threshold value α and the second threshold value β and outputs the values to the three-dimensional object detection units 33, 37.

In step S43, the detection of three-dimensional objects by differential waveform information is executed with the sequence described above. Moreover, in step S44, the detection of three-dimensional objects by edge information is executed with the sequence described above. For the detection of three-dimensional objects by difference information and the detection of three-dimensional objects by edge information, the first threshold value α and the second threshold value β are set for the three-dimensional object detection units 33, 37, respectively, in accordance with the raindrop adherence state.

In step S45, an assessment is made as to whether or not a three-dimensional object was detected in step S43 or a three-dimensional object was detected in step S44 and, if a three-dimensional object was detected in either step S43 or S44, processing proceeds to step S46 and a final assessment is made that there is a three-dimensional object. If no three-dimensional object is detected in either step S43 or S44, processing proceeds to step S47 and a final assessment is made that there is not a three-dimensional object.

The three-dimensional object detection device 1 of the present embodiment of the present invention, which is configured and operates as described above, exhibits the following effects.

(1) The three-dimensional object detection device 1 of the present embodiment extracts characteristics distinctive of foreign matter that has adhered to the lens 11 and assesses the presence of foreign matter that has adhered to the lens 11 based on the extracted characteristics, and therefore the state of the lens can be accurately assessed. As a result, the errant detection of foreign matter that has adhered to the lens 11 as another vehicle VX can be suppressed, and therefore other vehicles VX can be accurately detected. The actions and effects described below can be similarly achieved when detecting another vehicle VX using differential image information and when detecting another vehicle VX when using edge information.

(2) The three-dimensional object detection device 1 of the present embodiment detects whether or not foreign matter is present based, on the change over time in the luminance value of each predetermined pixel in an image capturing element and the change over time in the difference between the evaluation value obtained from the differential waveform information and the reference value, and therefore the detection precision of foreign matter is improved, whatever the time of day or night, and, as a result, errant detection as other vehicles can be prevented.

(3) In the three-dimensional object detection device 1 of the present embodiment, the threshold value γ for assessing the change over time in luminance value becomes bigger as the degree of cloudiness of the lens of the camera becomes greater, and therefore the errant detection of small changes over time in luminance values due to lens cloudiness as the adherence of foreign matter can be prevented.

(4) In the three-dimensional object detection device 1 of the present embodiment, when changes over time in luminance values are detected, the pixel partition of the image capturing element is made larger if the environment is dark, and luminance noise being great can therefore be relatively suppressed, as at night, and, as a result, the detection precision of the change over time in luminance values is improved.

The abovementioned camera 10 corresponds to the image capturing means of the present invention, the abovementioned lens 11 corresponds to the lens of the present invention, the abovementioned viewpoint conversion unit 31 corresponds to the image conversion means of the present invention, the abovementioned alignment unit 32 and three-dimensional object detection unit 33 correspond to the three-dimensional object detection means of the present invention, the abovementioned luminance difference calculation unit 35, edge line detection unit 36, and three-dimensional object detection unit 37 correspond to the three-dimensional object detection means of the present invention, the abovementioned three-dimensional object assessment unit 34 corresponds to the three-dimensional object assessment means, the aforementioned foreign matter detection unit 38 corresponds to the first foreign matter detection means and the second foreign matter detection means, and the aforementioned controller corresponds to the control means.

In this specification, an example in which foreign matter that has adhered to the lens 11 is detected based on differential waveform information when three-dimensional objects are detected based on differential waveform information and an example in which foreign matter that has adhered to the lens 11 is detected based on edge information when three-dimensional objects are detected based on edge information were described, but foreign matter that has adhered to the lens 11 may be detected based on edge information when three-dimensional objects are detected based on differential waveform information and foreign matter that has adhered to the lens 11 may be detected based on differential waveform information when three-dimensional objects are detected based on edge information.

Moreover, the alignment unit 21 of the present embodiment aligns the positions of bird's-eye view images from different points in time in a bird's-eye view and obtains the aligned bird's-eye view images, but this "alignment" processing can be carried out at a precision corresponding to the type of detection subject and the detection precision demanded. The processing may be strict alignment processing in which alignment is performed using identical times and identical positions as criteria and it may be relaxed alignment processing of a degree that allows the coordinates of the bird's-eye view images to be ascertained.

The invention claimed is:

1. A three-dimensional object detection device comprising:
an image capturing device mounted in a vehicle, and provided with a lens and an image capturing element, the image capturing device forming a video image of a predetermined area;
an image conversion unit programmed to perform viewpoint conversion of captured images obtained by the image capturing device into bird's-eye view images;
a three-dimensional object detection unit programmed to detect a presence of the three-dimensional object based on differential waveform information in which the differential waveform information is generated by aligning, in a bird's-eye view, positions of bird's-eye view images from different points in time obtained by the image conversion unit, and counting a number of pixels indicating a predetermined difference in a differential image of aligned bird's-eye view images along a direction of collapsing of a three-dimensional object when viewpoint conversion of the bird's-eye view images has been performed to form a frequency distribution;

a three-dimensional object assessment unit programmed to access whether or not a three-dimensional object detected by the three-dimensional object detection unit is another vehicle;

a first foreign matter detection unit programmed to detect whether or not foreign matter has adhered to the lens based on a change over time in luminance values for each predetermined pixel in the image capturing element;

a second foreign matter detection unit programmed to extract a first maximum from differential waveform information generated at at least one first timing by the three-dimensional object detection unit, programmed to acquire a reference value based on the first maximum that was extracted, programmed to extract a second maximum corresponding to the first maximum in the bird's-eye view image from the differential waveform information newly generated at at least one second timings after the at least one first timing, programmed to acquire an evaluation value based on the second maximum, and programmed to detect whether or not foreign matter has adhered to the lens based on a change over time in a difference between the evaluation value and the reference value; and a controller programmed to suppress, suppresses the detection of the three-dimensional object from an image of the predetermined area and the assessment that the three-dimensional object is the other vehicle, when the first foreign matter detection unit and the second foreign matter detection unit have detected foreign matter that has adhered to the lens.

2. The three-dimensional object detection device according to claim 1, wherein the controller is further programmed to suppress means suppresses the detection of the three-dimensional object from an image of the predetermined area and the assessment that the three-dimensional object is the other vehicle to a degree that increases correspondingly with respect to an increase in the proportion of foreign matter adherence detected by the second foreign matter detection unit.

3. The three-dimensional object detection device according to claim 1, wherein the controller is further programmed to suppress the detection of the three-dimensional object from an image of the predetermined area and the assessment that the three-dimensional object is the other vehicle to a degree that increases correspondingly with respect to an increase in the proportion of the area of predetermined pixels for which the change over time in the luminance value is equal to or less than a predetermined threshold value $\gamma$ to the entirety of the pixels constituting the predetermined area.

4. The three-dimensional object detection device according to claim 3, wherein the controller is further programmed to stop processing for detecting three-dimensional objects from the image and processing for assessing whether or not three-dimensional objects are vehicles when the proportion of the area of predetermined pixels for which the change over time in the luminance value is equal to or less than a predetermined threshold value $\gamma$ to the entirety of the pixels constituting the predetermined area is equal to or greater than a predetermined value.

5. The three-dimensional object detection device according to claim 1, wherein the first foreign matter detection unit is further programmed to set the area of the predetermined pixels to be smaller in correspondence to a higher level of brightness in the environment and programmed to set the area of the predetermined pixels to be greater in correspondence to a lower level of brightness in a surrounding environment.

6. The three-dimensional object detection device according to claim 1, wherein the three-dimensional object detection unit is further programmed to detect a three-dimensional object in the event that the differential waveform information is equal to or greater than a predetermined first threshold value $\alpha$; and when the first foreign matter detection unit and the second foreign matter detection unit have detected foreign matter that has adhered to the lens, the controller is further programmed to generate a control command for upwardly adjusting the first threshold value a so as to make the detection of the three-dimensional objects more difficult, and programmed to output the control command to the three-dimensional object detection unit.

7. The three-dimensional object detection device according to claim 1, wherein the three-dimensional object detection unit is further programmed to detect the presence of the three-dimensional object in an event that the differential waveform information is equal to or greater than a predetermined first threshold value $\alpha$; and when the first foreign matter detection unit and the second foreign matter detection unit have detected foreign matter that has adhered to the lens, the controller is further programmed to generate a control command for lowering the value determined by counting the number of pixels indicating a predetermined difference in the differential image in the bird's-eye view image to form the frequency distribution, and programmed to output the control command to the three-dimensional object detection unit.

8. The three-dimensional object detection device according to claim 1, wherein the three-dimensional object detection unit is further programmed to extract the number of pixels showing pixel values equal to or greater than the threshold value p as the number of pixels showing the predetermined difference; and when the first foreign matter detection unit and the second foreign matter detection unit have detected foreign matter that has adhered to the lens, the controller is further programmed to generate a control command for upwardly adjusting the threshold value p so as to make the detection of the three-dimensional objects more difficult and programmed to output the control command to the three-dimensional object detection unit.

9. The three-dimensional object detection device according to claim 1, wherein the three-dimensional object detection unit is further programmed to extract the number of pixels showing pixel values equal to or greater than the threshold value p as the number of pixels showing the predetermined difference; and when the first foreign matter detection unit and the second foreign matter detection unit have detected foreign matter that has adhered to the lens, the controller is further programmed to generate a control command for outputting a downwardly adjusted number of pixels extracted in the differential image in the direction of collapsing of the three-dimensional object when viewpoint conversion of the bird's-eye view is performed, and programmed to output the control command to the three-dimensional object detection unit.

10. A three-dimensional object detection device comprising:
an image capturing device mounted in a vehicle, and provided with a lens and an image capturing element, the image capturing device forming a video image of a predetermined area;
an image conversion unit programmed to perform viewpoint conversion of captured images obtained by the image capturing device into bird's-eye view images;
a three-dimensional object detection unit programmed to detect a presence of the three-dimensional object based on edge information, including information of an edge line detected based on an edge component which has continuity and for which a luminance difference of pixels of image areas is a predetermined threshold value t or greater, where the luminance difference of pixels of image areas are mutually adjacent along a direction of collapsing of the three-dimensional object when viewpoint conversion to the bird's-eye view images is performed by the image conversion unit;
whether or not a three-dimensional object detected by the three-dimensional object detection unit is another vehicle;
a first foreign matter detection unit programmed to detect whether or not foreign matter has adhered to the lens based on a change over time in luminance values for each predetermined pixel in the image capturing element;
a second foreign matter detection unit programmed to extract a first maximum from edge information including information on the edge lines generated at at least one first timing by the three-dimensional object detection unit, programmed to acquire a reference edge length based on the first maximum, programmed to extract a second maximum corresponding to the first maximum in the bird's-eye view images from edge information newly generated at at least one or a plurality of second timings after at least one first timing, programmed to acquire an evaluation edge length based on the second maximum, and programmed to detect whether or not foreign matter has adhered to the lens based on a change over time in a difference between the evaluation edge length and the reference edge length; and
a controller programmed to suppress the detection of the three-dimensional object from an image of the predetermined area and the assessment that the three-dimensional object is the other vehicle, when the first foreign matter detection unit and the second foreign matter detection unit have detected foreign matter that has adhered to the lens.

11. The three-dimensional object detection device according to claim 10, wherein
the controller is further programmed to suppress the detection of the three-dimensional object from an image of the predetermined area and the assessment that the three-dimensional object is the other vehicle to a degree that increases correspondingly with respect to an increase in the proportion of foreign matter adherence detected by the second foreign matter detection unit.

12. The three-dimensional object detection device according to claim 11, wherein
the first foreign matter detection means detects that foreign matter has adhered to the lens if the change over time in luminance values is equal to or less than a predetermined threshold value $\gamma$.

13. The three-dimensional object detection device according to claim 12, wherein
the first foreign matter detection unit is further programmed to extract an edge from the image in an edge extraction area that includes a ground line or a road surface edge and detects the degree of cloudiness of the lens based on a strength distribution of the edge that was extracted; and
a higher degree of cloudiness corresponds to a lower predetermined threshold value for the change over time in the luminance value set in relation to cases in which the degree of cloudiness is small.

14. The three-dimensional object detection device according to claim 12, wherein
the first foreign matter detection unit is further programmed to set the predetermined threshold value $\gamma$ for the change over time in the threshold value to be relatively greater when the environment is bright than when the environment is dark.

15. The three-dimensional object detection device according to claim 10, wherein
the three-dimensional object detection unit is further programmed to extract an edge line based on pixels that show a luminance difference at or above a predetermined threshold value t; and
when the first foreign matter detection unit and the second foreign matter detection unit have detected foreign matter that has adhered to the lens, the controller is further programmed to generate a control command for upwardly adjusting the predetermined threshold value t so as to make the detection of three-dimensional objects more difficult, and programmed to output the control command to the three-dimensional object detection unit.

16. The three-dimensional object detection device according to claim 10, wherein
the three-dimensional object detection unit is further programmed to extract an edge line based on pixels that show a luminance difference at or above a predetermined threshold value t; and
when the first foreign matter detection unit and the second foreign matter detection unit have detected foreign matter that has adhered to the lens, the controller is further programmed to generate a control command for lowering the luminance values of the pixels, and programmed to output the control command to the three-dimensional object detection unit.

17. The three-dimensional object detection device according to claim 10, wherein
the three-dimensional object detection unit is further programmed to detect a three-dimensional object based on the edge line having a length equal to or greater than a threshold value $\theta$ included in the edge information; and
when the first foreign matter detection unit and the second foreign matter detection unit have detected foreign matter that has adhered to the lens, the controller is further programmed to generate a control command upwardly adjusting the threshold value $\theta$ so as to make the detection of the three-dimensional objects more difficult, and programmed to output the control command to the three-dimensional object detection unit.

18. The three-dimensional object detection device according to claim 10, wherein
the three-dimensional object detection unit is further programmed to detect a three-dimensional object based on the edge line with a length equal to or greater than a threshold value θ included in the edge information; and
when the first foreign matter detection unit and the second foreign matter detection unit have detected foreign matter that has adhered to the lens, the controller is further programmed to generate a control command for outputting a reduced value of the length of the edge line in the detected edge information, and programmed to output the control command to the three-dimensional object detection unit.

19. The three-dimensional object detection device according to claim 10, wherein
the three-dimensional object detection unit is further programmed to detect a three-dimensional object based on an assessment of whether or not the number of edge lines having lengths equal to or greater than a predetermined length included in the edge information is equal to or greater than a second threshold value β; and
when the first foreign matter detection unit and the second foreign matter detection unit have detected foreign matter that has adhered to the lens, the controller is further programmed to generate a control command for upwardly adjusting the second threshold value β so as to make the detection of three-dimensional objects more difficult, and programmed to output the control command to the three-dimensional object detection unit.

20. The three-dimensional object detection device according to claim 10, wherein
the three-dimensional object detection unit is further programmed to detect a three-dimensional object based on an assessment of whether or not the number of edge lines having lengths equal to or greater than a predetermined length included in the edge information is equal to or greater than a second threshold value β; and
when the first foreign matter detection unit and the second foreign matter detection unit have detected foreign matter that has adhered to the lens, the controller is further programmed to generate a control command for outputting a reduced value for the number of the detected edge lines of the predetermined length or greater and programmed to output the control command to the three-dimensional object detection unit.

21. The three-dimensional object detection device according to claim 10, wherein
the three-dimensional object assessment unit is further programmed to access the three-dimensional object to be another vehicle, upon determining the traveling speed of the three-dimensional object is equal to or greater than a predetermined speed set in advance; and
when the first foreign matter detection unit and the second foreign matter detection unit have detected foreign matter that has adhered to the lens, the controller is further programmed to generate a control command for increasing the predetermined speed that is the lower limit for assessment of three-dimensional objects as other vehicles so as to make the detection of three-dimensional objects more difficult, and programmed to output the control command to the three-dimensional object assessment unit.

22. The three-dimensional object detection device according to claim 10, wherein
the three-dimensional object assessment unit is further programmed to access the three-dimensional object to be another vehicle, upon determining the traveling speed of the detected three-dimensional object is equal to or greater than a predetermined speed set in advance; and
when the first foreign matter detection unit and the second foreign matter detection unit have detected foreign matter that has adhered to the lens, the controller is further programmed to generate a control command for outputting a lower traveling speed of the three-dimensional object compared with the predetermined speed that is the lower limit for assessment of three-dimensional objects as other vehicles, and programmed to output the control command to the three-dimensional object assessment unit.

23. The three-dimensional object detection device according to claim 10, wherein
the three-dimensional object assessment unit is further programmed to access the three-dimensional object to be another vehicle, upon determining the traveling speed of the detected three-dimensional object is less than a predetermined speed set in advance; and
when the first foreign matter detection unit and the second foreign matter detection unit have detected foreign matter that has adhered to the lens, the controller is further programmed to generate a control command for downwardly adjusting the predetermined speed that is the upper limit for assessment of three-dimensional objects as other vehicles and programmed to output the control command to the three-dimensional object assessment unit.

24. The three-dimensional object detection device according to claim 10, wherein
the three-dimensional object assessment unit is further programmed to access the three-dimensional object to be another vehicle, upon determining the traveling speed of the detected three-dimensional object is less than a predetermined speed set in advance; and
when the first foreign matter detection unit and the second foreign matter detection unit have detected foreign matter that has adhered to the lens, the controller is further programmed to generate a control command for upwardly adjusting the traveling speed of the three-dimensional object compared with the predetermined speed that is the upper limit for assessment of three-dimensional objects as other vehicles, and programmed to output the control command to the three-dimensional object assessment unit.

25. A foreign matter detection device comprising:
an image capturing device mounted in a vehicle, and provided with a lens and an image capturing element, the image capturing device forming a video image of a predetermined area;
an image conversion unit programmed to perform viewpoint conversion of captured images obtained by the image capturing device into bird's-eye view images;
a three-dimensional object detection unit programmed to detect a presence of the three-dimensional object based on distribution information for pixels by viewpoint conversion into the bird's-eye view images by the image conversion unit, in which the distribution information for the pixels having a luminance difference that is equal to or greater than a predetermined first threshold value in a direction of collapsing of a three-dimensional object when viewpoint conversion into the bird's-eye view image is performed; and, when the degree of distribution of the pixels in the direction of collapsing of the three-dimensional object is equal to or greater than a predetermined second threshold value the three-dimensional object is detected;

a first foreign matter detection unit programmed to detect whether or not foreign matter has adhered to the lens based on a change over time in luminance values for each predetermined pixel in the image capturing element;

a second foreign matter detection unit programmed to extract a first maximum from pixel distribution information generated at at least one first timing by the three-dimensional object detection unit, programmed to acquire a reference value based on the extracted first maximum, programmed to extract a second maximum corresponding to the first maximum in the bird's-eye view images from pixel distribution information newly generated at least one second timings after the at least one first timing, programmed to acquire an evaluation value based on the second maximum, and programmed to detect whether or not foreign matter has adhered to the lens based on a change over time in a difference between the evaluation value and the reference value; and a determination unit programmed to determine that foreign matter has adhered to the lens when the foreign matter is detected by both the first foreign matter detection unit and the second foreign matter detection unit.

26. The foreign matter detection device according to claim 25, wherein the determination unit is programmed to suppress the detection of the three-dimensional objects by changing the first threshold value and the second threshold value when an assessment is made by the determination unit that foreign matter has adhered to the lens.

* * * * *